United States Patent
Grey et al.

(10) Patent No.: US 6,577,981 B1
(45) Date of Patent: Jun. 10, 2003

(54) TEST EXECUTIVE SYSTEM AND METHOD INCLUDING PROCESS MODELS FOR IMPROVED CONFIGURABILITY

(75) Inventors: James Grey, Cedar Park, TX (US); Erik Crank, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/259,161

(22) Filed: Feb. 26, 1999

Related U.S. Application Data

(60) Provisional application No. 60/097,391, filed on Aug. 21, 1998.

(51) Int. Cl.[7] .................. G01R 27/28; G01R 31/00; G01R 31/14
(52) U.S. Cl. .................. 702/119; 702/118; 702/120; 702/123
(58) Field of Search ........................... 702/118, 119, 702/120, 121, 108, 117, 123, 183, 184; 714/733

(56) References Cited

U.S. PATENT DOCUMENTS

| | | | | |
|---|---|---|---|---|
| 4,819,233 A | * | 4/1989 | Delucia et al. | 371/19 |
| 5,212,443 A | * | 5/1993 | West et al. | 324/73.1 |
| 5,357,519 A | * | 10/1994 | Martin et al. | 702/119 |
| 5,390,194 A | * | 2/1995 | Mannle | 324/73.1 |
| 5,764,545 A | * | 6/1998 | Cannata et al. | 700/81 |
| 5,781,720 A | * | 7/1998 | Parker et al. | 395/183.14 |
| 5,905,856 A | * | 5/1999 | Ottensooser | 395/183.14 |
| 6,002,868 A | * | 12/1999 | Jenkins et al. | 345/769 |
| 6,134,674 A | * | 10/2000 | Akasheh | 714/33 |
| 6,205,407 B1 | * | 3/2001 | Testa et al. | 702/119 |

OTHER PUBLICATIONS

National Instruments, LabView, "Test Executive Reference Manual", Aug. 1997.*

(List continued on next page.)

*Primary Examiner*—Marc S. Hoff
*Assistant Examiner*—Manuel L. Barbee
(74) *Attorney, Agent, or Firm*—Meyertons Hood Kivlin Kowert & Goetzel, P.C.; Jeffrey C. Hood

(57) ABSTRACT

A test executive program which provides greatly improved configurability and modularity, thus simplifying the creation, modification and execution of test sequences. The test executive program includes process models for improved flexibility, modularity and configurability. Process models provide a modular and configurable entity for encapsulating operations and functionality associated with a class of test sequences. The process model thus encapsulates a "testing process" for a plurality of test sequences. The process model enables the user to write different test sequences without repeating standard testing operations in each sequence. The test executive program also includes step types for improved configurability. A step type is a modular, identifiable unit configured by the user which defines common properties and/or operations associated with a plurality of steps. Instances of the step type incorporate this common functionality and/or properties from the step type, and thus the user is not required to hard code that functionality and/or properties in each instance or step. The test executive program also provides distributed type storage and conflict resolution. When the user loads a file which includes a stored type, the method performs conflict resolution, including determining if the loaded type conflicts with one or more previously loaded/registered types. If the types do conflict, then the test executive or user selects a type, preferably using the version data associated with each type. The test executive system also performs automatic result collection to automatically collect the results of each step. The user can enable or disable result collection for a particular sequence or for the entire test station.

103 Claims, 32 Drawing Sheets

OTHER PUBLICATIONS

National Instruments, LabView, "Test Executive Reference Manual", Aug. 1997.*

National Instruments, LabView, "Test Executive Reference Manual", Aug. 1997.

National Instruments Corporation Catalog, Test Management Software Overview, Instrumentation Software, Jan. 1998, pp. 113–115.

TestExpert, The Test Management System, Introducing TestExpert, © 1997 Silicon Valley Networks, Inc., BRO1113–C, 1/98 (4 pg. brochure) © 1997.

TestExpert, The Test Management System, © 1997 Silicon Valley Networks, Inc., DSO1313–A, 1/98 (4 pg. Brochure) © 1997.

"Instant Instrument Control Proven, Robust Framework Automate Tests (coding optional)," ATEngine™, Vektrex™, © Copyright 1998 (2 pg. Brochure).

"TeraView, Teradyne–Raytheon, Team Pursues New Open Architecture Test Technologies," A Teradyne Quarterly Newsletter about Assembly Test, 1998 Summer, pp. 1–3. 8, 10, 11.

Teradyne Presentation, Sep. 9, 1997, pp. 18–25.

Web–based ATE Operating Environment, Circuit Board Test & Test Development, http://www/teradyne,com/prods/cbt/prodctr.teststudio.html, 4 pages © 1997, printed Apr. 29, 1999.

AtEasy™, Text Excutive, Geotest, Inc., PC–Based, Test Solutions Source Book, pp. 13–16.

* cited by examiner

Test UUTs entry point sequence in the default TestStand process model

| Step | Description | Execution Flow | Comment |
|---|---|---|---|
| Check For Proper Use | "Error" | pre, post | In case someone accidently tries to execut... |
| Clear Report | Call SetReport (modelsupport.dll) | | Clear the report in case we are restarting a ... |
| PreUUTLoop Callback | Call PreUUTLoop (<Current File>) | | |
| Configure Report Options | Call ConfigureReportOptions (<Current File>) | | |
| Include Limits in Results | Call AddExtraResult (modelsupport.dll) | pre | |
| Include Comparison Type in Results | Call AddExtraResult (modelsupport.dll) | pre | |
| Next UUT | | | |
| Increment UUT Index | Locals.UUT.UUTLoopIndex++ | | UUT index starts at 1 |
| PreUUT Callback | Call PreUUT (<Current File>) | | Display UUT Dialog |
| Goto End of UUT Loop If No More UUTs | Goto 'End of UUT Loop' | pre, post | |
| Determine Report File Path | Call DetermineReportFilePathName (modelsuppo... | pre | |
| Put 'Test In Progress' In Report | Call SetReport (modelsupport.dll) | | |
| Clear Results List | SetNumElements(Locals.ResultList, 0) | | |
| Clear Report Local Variable | Locals.Report = "" | | |
| MainSequence Callback | Call MainSequence (<Current File>) | | |
| PostUUT Callback | Call PostUUT (<Current File>) | | |
| Clear Report | Call SetReport (modelsupport.dll) | | Clear the report so the "Testing in progress... |
| TestReport Callback | Call TestReport (<Current File>) | pre | |
| SetReport | Call SetReport (modelsupport.dll) | | |
| Write UUT Report | Call WriteReport (modelsupport.dll) | | |
| Log To Database Callback | Call LogToDatabase (<Current File>) | pre | |
| Goto Next UUT | Goto 'Next UUT' | post | |
| End of UUT Loop | | | |
| PostUUTLoop Callback | Call PostUUTLoop (<Current File>) | | |
| Read Entire Report | Call ReadReport (modelsupport.dll) | pre | Read entire report file so that the user can ... |

Fig. 4

List of all sequences in TestStand Process model file.

| Sequence | Comment |
|---|---|
| Test UUTs | This sequence assumes that results are disabled for all steps within it... |
| Single Pass | This sequence assumes that results are disabled for all steps within it... |
| Edit Report Options | |
| MainSequence | |
| PreUUT | |
| PostUUT | |
| PreUUTLoop | |
| PostUUTLoop | |
| ReportOptions | |
| TestReport | |
| ModifyReportHeader | |
| ModifyReportEntry | |
| ModifyReportFooter | |
| LogToDatabase | |
| Configure Report Options | |

Fig. 5

| Sequence | Comment |
|---|---|
| Test UUTs | If you insert a new step in this sequence, disable the Record Results option for the... |
| Single Pass | If you insert a new step in this sequence, disable the Record Results option for the... |
| Configure Report Options | Appears as Report Options in the Configure menu. |
| Configure Database Options | Appears as Database Options in the Configure menu. |
| MainSequence | Override this in the client file with a sequence that performs tests on the UUT. |
| PreUUT | Displays a dialog box in which the operator enters the UUT serial number. Override... |
| PostUUT | Displays a pass, fail, error, or terminated banner. Override this in client file to chang... |
| PreUUTLoop | Test UUTs calls this before looping on UUTs. Is empty in model file. Override this... |
| PostUUTLoop | Test UUTs calls this after looping on UUTs. Is empty in model file. Override this in... |
| ReportOptions | GetReportOptions calls this after reading the report options from disk. Override it to... |
| DatabaseOptions | GetDatabaseOptions calls this after reading the report options from disk. Override i... |
| TestReport | Generates the contents of the test report for one UUT. Override in client file to ch... |
| ModifyReportHeader | TestReport calls this. Override it to modify the header that TestReport generates. |
| ModifyReportEntry | TestReport calls this for each result in result list. Override it to modify the report se... |
| ModifyReportFooter | TestReport calls this. Override it to modify the footer text that TestReport generates. |
| LogToDatabase | Execution entry points call this after writing a test report to disk. Override to log res... |
| Get Report Options | Reads test station report options from disk and calls ReportOptions callback. |
| Get Database Options | Reads test station database options from disk and calls DatabaseOptions callback. |

TEST EXECUTIVE SYSTEM AND METHOD INCLUDING PROCESS MODELS FOR IMPROVED CONFIGURABILITY

PRIORITY DATA

This application claims benefit of priority of provisional application Serial No. 60/097,391 Provisional application expired titled "Test Executive System and, Method with Improved Configurability" filed on Aug. 21, 1998 whose inventors were James Grey, Erik Crank, Ronald Byrd and Jon Bellin.

FIELD OF THE INVENTION

The present invention relates to test executive software for organizing and executing test sequences to control instrumentation systems.

DESCRIPTION OF THE RELATED ART

A test executive is a program that allows a user to organize and execute sequences of reusable test modules to control a test involving one or more instruments. The test modules often have a standard interface and typically can be created in a variety of programming environments. The test executive software operates as the control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature.

Code Module—A program module, such as a Windows Dynamic Link Library (.dll) or LabVIEW VI (.vi), that contains one or more functions that perform a specific test or other action.

Test Module—A code module that performs a test.

Step—Any action, such as calling a test module to perform a specific test, that the user can include within a sequence of other actions.

Step Module—The code module that a step calls.

Sequence—A series of steps that the user specifies for execution in a particular order. Whether and when a step is executed can depend on the results of previous steps.

Subsequence—A sequence that another sequence calls. The user specifies a subsequence call as a step in the calling sequence.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, or Microsoft Visual C, in which the user can create test modules and run-time operator interfaces.

Unit Under Test (UUT)—The device or component that is being tested.

Prior art test executive programs are generally hard-coded programs with little flexibility, modularity or configurability. Prior art systems generally include executive code, sequence code, test modules, and then instrument drivers. The executive code typically includes functionality such as UUT identification, operator notification, test report generation, and logging results. The vendor may or may not provide source code for the executive code to the end-user. If the vendor did provide source code for the executive code, the above-mentioned functionality would be subsumed in that source code but it would not be in a format which is easily configurable. In other words, this functionality was not separated out as a single configurable entity. Therefore, if the user desired to modify this functionality, the user would have to hunt through the source code to find and edit the code, which is a tedious process. Thus, in prior art, the user would be required to enter the programming language to change this functionality. This was tedious and difficult.

Therefore, an improved test executive program is desired which provides improved flexibility, modularity and configurability.

Prior art test executive programs also do not easily allow user configuration of steps. In general, step functionality was hard-coded with little flexibility, modularity or configurability. Therefore, an improved test executive program is also desired which provides improved configurability of steps.

An improved test executive program is further desired which provides improved type conflict resolution and improved automatic result collection.

SUMMARY OF THE INVENTION

The present invention comprises an improved test executive program which provides process model and step type functionality for improved flexibility, modularity and configurability. The test executive program of the present invention also provides distributed type storage and conflict resolution, as well as automatic result collection.

The test executive of the present invention, referred to as the TestStand test executive software, is a flexible, powerful test executive framework which provides a number of novel features. In particular, the test executive software of the present invention provides greatly improved configurability and modularity, thus simplifying the creation, modification and execution of test sequences. The test executive software provides numerous ways for the user to modify the default configuration and components or to add new components. These extensibility mechanisms enable the user to create the test executive that meets the user's particular requirements without modifying the TestStand test execution engine.

The test executive software expands on the traditional test executive concepts and introduces many new ones. The test executive software of the present invention includes new concepts and features, including step types, step properties, sequence variables, sequence parameters, module adapters, and process models.

The TestStand test executive software architecture includes operator interface programs for interfacing to various software programs. The TestStand test executive software also includes a sequence editor for editing sequences.

The sequence editor and the operator interface programs interface to the test executive engine, referred to as the TestStand Engine. One or more process models couple to the TestStand Engine. The TestStand Engine interfaces through an adapter interface to one or more adapters. The adapters in turn interface to code modules and sequence files.

The TestStand Engine plays a pivotal role in the TestStand architecture. The TestStand Engine executes sequences, wherein sequences contain steps that can call external code modules. By using module adapters that have the standard adapter interface, the TestStand Engine can load and execute different types of code modules. TestStand sequences can call sub-sequences through the common adapter interface. TestStand uses a special type of sequence called a process model to direct the high-level sequence flow. The TestStand Engine exports an ActiveX Automation API used by the TestStand sequence editor and run-time operator interfaces.

Types—Conflict Resolution

The TestStand test executive system of the present invention includes various types, including step types, custom named data types, and standard named data types. A type can thus be a data type or step type. For each type that a file uses, the TestStand system stores the definition of the type in the file. More specifically, when a user creates a type in the test executive system, the user creates the type using a graphical user interface (GUI) and assigns a name to the type. The user may also assign version data to the type and/or the system may apply a timestamp or other version data to the type. When the user later stores a step or data of the at least one type in a file, the TestStand Engine automatically stores a type definition of the type in the file in response. The user can also specify that a file always saves the definition for a type, even if the file does not currently use the type. Because many files can use the same type, many files can contain definitions for the same type.

The TestStand system allows only one definition for each type to exist in memory. If the user modifies the type in one view, the type is updated in all views. However, problems can arise if there is not a single definition of a type in the system. For example, when the user creates a step type, and then the user stores an instance of the step type in the sequence file, the type definition of the step type is stored in the file. If someone later changes the contents of the step type, and then reloads the sequence which is based on the original step type, there will be a conflict. This conflict can also occur when the user moves a sequence file from a first computer to a second computer, wherein the second computer includes a different type definition for the respective type name.

When the user loads a file which includes a stored type, the method of the present invention executes to perform conflict resolution. Here presume that the user loads a file with at least one type wherein the file preferably stores a type definition of the loaded type, e.g., a data type or step type. In response to the user loading the file, the TestStand Engine automatically determines the type being loaded, and then automatically determines if the loaded type conflicts with one or more previously loaded/registered types. This determination includes comparing the type being loaded with the previously loaded/registered types in the system. In the preferred embodiment, the determination of a type conflict comprises determining if the name of the loaded type conflicts with the name of any of the previously loaded/registered types.

If the types do not conflict, then the TestStand Engine registers the type in the system. Thus, since there is no type conflict, the type can be safely registered in the system. If the types do conflict, then the TestStand Engine selects a type in response to determining the type conflict, preferably using the version data associated with each type. In the preferred embodiment, the TestStand Engine selects the type with the version data indicating the most recent version, e.g., the one with the most recent version number.

In one embodiment, the TestStand Engine requests user input regarding selection of a type in response to determining a type conflict, and this user input is used in selecting the-type. In other words, when the TestStand Engine detects a type conflict, the Engine displays a dialog informing the user of the conflict and requesting the user to decide which type-should be used. The dialog also preferably displays the version data from each of the types to aid the user in the selection. The user then selects the type to be used.

After selection of the type, the TestStand Engine conforms existing instances of one or more non-selected types with the selected type. This conforming comprises modifying the data structure of the one or more non-selected types to conform to the data structure of the selected type. This conforming also includes preserving at least a portion of the old data-of the one or more non-selected types.

The conflict-resolution performed according to the present invention is especially important, for example, where the user creates and stores the type in a first computer, and then later loads the file in a second computer. For example, the second computer may include a different type which includes the same name as the type created and stored in the first computer, thereby creating a conflict.

Step Types

A sequence comprises a series of steps, wherein a step is typically a test performed on an instrument. The present invention includes step types which allow more modular and configurable steps while minimizing user coding and effort.

In a test sequence with a number of steps, in many instances the user will desire a number of steps that have some commonality of functionality and/or properties. A primary purpose of a step type is to define common properties and/or operations associated with a plurality of steps in a single location, referred to as the step type, thereby eliminating the need for the user to define these common properties and/or operations with each of the respective steps. Instances of the step type incorporate this common functionality and/or properties from the step type, and thus the user is not required to hard code that functionality and/or properties in each instance or step. The functionality and/or properties defined by a step type is generally peripheral or associated with the actual test or the step being performed.

A step type thus essentially comprises a custom set of properties and/or operations associated with a step. Stated another way, a step type defines common operations and/or data that are associated with a test module in a similar way that a process model defines functionality associated with calling the main sequence file of a test. The test module is hard coded, and the step type represents operations and/or properties associated with calling this test module. A step type is a modular, identifiable unit configured by the user, preferably through a graphical user interface, e.g., dialogs.

Step types define common functionality by defining an edit sub-step and pre and post sub-steps. The pre and post sub-steps execute before and after, respectively, a step. The edit sub-step is used to configure the peculiarities of a particular instance of a step type. For instance the edit sub-step can be configured to display a message or dialog to request user. This message is typically displayed at configuration time, not run time. Step types also include pre and post expressions and status expressions for configurability. These expressions are executed at run time.

A step type has similar functionality to a type definition, meaning that once the user has configured a step type and used it throughout different steps of the sequence, if the user later changes that step type, those changes propagate through all of the steps which are based on that step type. This type definition functionality is not performed through copying or propagating changes. Rather, the information is held within the step type, and during run time the sequence examines the step type to determine the step type parameters for execution of the step.

In prior art test executives, the functionality performed by the step type of the present invention was hard coded in the test executive itself and was not easily changeable. Further, this functionality was not in a modular form which could be reused or applied to a plurality of steps. The step type of the present invention embodies this functionality, e.g., the pre and post operations in a typical test, and places this in a configurable and reusable form. Step types of the present invention are modular and user configurable and provide tremendous savings in developer effort.

Step types are generally configured and used as follows. First, the user configures a first step type. As discussed above, the first step type defines common functionality and common data for steps (instances) of the first step type. The common functionality preferably includes one or more of a common editing interface, pre-step functionality and post-step functionality. The common functionality is preferably specified by the user as one or more sub-steps that call code modules written in any of various programming languages. The common data includes one or more property values organized in a user-defined hierarchy. Configuration of the first step type also optionally includes creating one or more code templates, wherein the code templates are useable in creating a code module called by instances of the first step type.

The user then creates a test sequence file for testing the unit under test. The test sequence file includes at least one sequence comprising a plurality of steps, wherein one or more of the steps are of the first step type (instances of the first step type).

The test sequence file is then executed to test the unit under test. Execution of the test sequence file includes executing each of the plurality of steps in the at least one sequence. When steps of the first step type are executed, execution includes executing the common functionality for the one or more of the steps which are of the first step type and also includes utilizing the common data for the one or more of the steps which are of the first step type. More specifically, for a step of the first step type, i.e., an instance of the first step type, execution of the step includes:

executing the pre-step functionality;

executing a code module referenced by the step after executing the pre-step functionality; and executing the post-step functionality after executing the code module.

Process Models

The present invention includes process models which provide a modular and configurable entity for encapsulating operations and functionality associated with a class of test sequences. The process model thus encapsulates a "testing process" for a plurality of test sequences. The "testing process" includes common operations required to be performed before and after the test executive executes the sequence that performs the tests. Common operations include identifying the UUT, notifying the operator of pass/fail status, generating a test report, and logging results.

The process model enables the user to write different test sequences without repeating standard testing operations in each sequence. The process model is also user-modifiable. This is important because the testing process can vary based on the production line, the production site, or the systems and practices of the company in which the test executive is used. The process model thus provides tremendous savings in user development time.

TestStand provides a mechanism for defining a process model. A process model is in the form of a sequence file. The user can edit a process model just as he/she edits other sequences. TestStand ships with a fully functional default process model. The user can write his/her own process model, or the user can copy the default process model and then modify it.

Process models are used in the creation of a test system as follows. First the user configures a process model, or alternatively selects a previously configured process model. The process model includes functionality which is common to a plurality of different test sequences, wherein the functionality is for testing one or more UUTs. As discussed above, the process model is a separate user configurable module, e.g., is modularly separate from the test sequence file. More specifically, the process model is modularly separate from the test executive engine, the operator interfaces, the test sequences, and the test code. The process model preferably comprises a sequence file and is user editable as a sequence file. The process model comprises a plurality of steps which call code modules, wherein the code modules can be written in a variety of different programming languages. The process model includes one or more of pre-test operations, post-test operations, variables, parameters, types and code modules. The process model is also independent of language and construction of the operator interface program. Finally, the user can configure the process model to provide one or more of: customized report generation, database logging, UUT identification, and UUT status notification, among others.

Configuration of the process model includes one or more of: configuring pre-test operations and/or post-test operations in the process model; configuring one or more entry points in the process model; changing the order of calls to callback functions; adding/deleting calls to callback functions; adding new callback functions in response to new calls added to the process model; overriding callback functions called by the process model; modifying existing callback functions in the process model; and configuring variables, parameters, types, steps and/or code modules.

The user then creates a test sequence file, also called a client file, for testing the unit under test. The test sequence file includes the test sequence for the desired UUT, which is called MainSequence. The MainSequence file is called by the process model file and typically includes a number of sub-sequences which call into other sequence files. The user may include one or more client callbacks in the test sequence file which operate to override or replace callbacks in the process model.

The process model is comprised in a process model sequence file. The process model sequence file is a file that has multiple sequences that can be of types. entry point sequence, callback sequence or normal sequence. A normal sequence is typically a utility subsequence. The entry point sequence is a place where the user can begin execution within the process model sequence file. The callback sequence is a sequence which typically performs test process functionality and is called by a call in the process model. The callback sequence in the process model sequence file is the default callback for the call, and is replaceable or overrideable by callback sequences inserted into the client file.

The process model and the test sequence file are then executed to test the unit under test. In the preferred embodiment, the user invokes execution of the process model, and during execution of the process model the process model operates to call the test sequence file. The user preferably begins execution of the process model through a graphical user interface, such as through a menu. The user preferably selects a desired execution entry point to begin execution within the process model sequence file. The test sequence file or client file can operate with any of the execution entry points, i.e., the test sequence file is not customized for a particular entry point in the process model. This way, for a single client file, the user can choose different ways of ruining the respective client file.

According to the present invention, the operator interface program automatically updates in response to user configuration of one or more entry points. When the user defines one or more entry points in the process model, the operator interface program queries the test executive engine to determine the one or more entry points defined by the user in the process model. The operator interface program then displays the one or more entry points in response to the query. Thus the one or more entry points configured by the user in the process model automatically appear in the operator interface program. Stated another way, changes to the process model which affect the appearance of the operator interface do not require manual changes to the operator interface, but rather the operator interface automatically updates itself.

Automatic Result Collection

The TestStand test executive system of the present invention performs automatic result collection to automatically collect the results of each step. The user can enable or disable result collection for a particular sequence or for the entire test station.

In the preferred embodiment, each sequence has a local array that stores the results of each step. The contents in the results for each can vary depending on the step type. When TestStand stores the results for a step into the array, it adds information such as the name of the step and its position in the sequence. For a step that calls a sequence, TestStand also adds the result array from the subsequence.

The automatic result collection of the present invention preferably operates as follows. First, the user creates a test sequence file for testing the unit under test, wherein the test sequence file includes at least one sequence comprising a plurality of steps. The user then configures the results to be collected. This, for example, includes defining one or more properties to be collected for one or more of the steps in the sequence. Where one or more step types are included in the test sequence file, the user preferably configures results for the step types.

The user then enables automatic result collection. In one embodiment, automatic result collection may be the default result collection technique. Also, the user can enable or disable automatic result collection for particular sequence(s) or for the entire test station. The test sequence file is then executed to test the unit under test. Execution of the test sequence file includes executing each of the plurality of steps in the sequence.

The TestStand Engine operates to automatically collect the results of each step in the sequence during execution. If the user enabled automatic result collection, then the automatic collection is performed in response to this, enabling, and for the specified sequences. During execution, the user can also dynamically configure the results to be collected, as desired.

The automatic collection includes collecting standard result information, wherein the standard result information is automatically collected regardless of the user input configuring the results to be collected. The standard result information includes one or more of: a name of the step and a position of the step in the sequence.

Where the test sequence file includes a step type and the user has configured results for the step type, the method automatically collects results depending on the step type of the steps in the sequence. For example, when the steps in the test sequence file include a first step having a first step type and a second step having a second step type, the automatic collection operates to collect first results for the first step according to the first step type and operates to collect second results for the second step according to the second step type.

In the preferred embodiment, the sequence includes a local array that stores the results of each step in the sequence, and the automatic collection includes storing the results of each step in the local array of the sequence. The local array is preferably a local variable of the sequence, wherein the local array is accessible from within the sequence and from other code modules.

When a step in a sequence of the test sequence file calls a sub-sequence, the automatic collection includes storing a result array from the sub-sequence as the result for the first step. Further, when a first step calls a sub-sequence, and the sub-sequence includes a step which in turn calls another-subsequence, the result for the first step includes a chronology and hierarchy of step execution made in response to the first step.

Where the first step calls a sub-sequence, and the sub-sequence executes asynchronously, the automatic collection includes allocating an array element for the result when the first step calls the sub-sequence and storing the result in the array element after completion of the sub-sequence.

BRIEF DESCRIPTION OF THE DRAWINGS

A better understanding of the present invention can be obtained when the following detailed description of the preferred embodiment is considered in conjunction with the following drawings, in which:

FIG. 4 is a screen shot illustrating the Test UUTs entry point sequence in the default process model;

FIG. 5 is a screen shot illustrating a list of all of the sequences in the TestStand process model file;

FIG. 48 illustrates a list of all the sequences in the default TestStand process model;

FIG. 50 illustrates the result of a Numeric Limit Test step in expanded form on the Execution window Context tab.

DETAILED DESCRIPTION OF THE PREFERRED EMBODIMENTS

Cross-Reference to Related Applications

The following applications are related to the present application:

U.S. patent application Ser. No. 09/259,162 titled "Test Executive System and Method Including Step Types for Improved Configurability" and filed Feb. 26, 1999;

U.S. patent application Ser. No. 09/259,173 titled "Test Executive System and Method with Type Conflict Resolution" and filed Feb. 26, 1999; and U.S. patent application Ser. No. 09/259,165 titled "Test Executive System and Method Including Automatic Result Collection" and filed Feb. 26, 1999.

Incorporation by Reference

The TestStand user documentation, available from National Instruments Corporation, is hereby incorporated by reference as though fully and completely set forth herein.

U.S. Provisional Application Serial No. 60/097,391 titled "Test Executive System and Method with Improved Configurability" filed on Aug. 21, 1998, is hereby incorporated by reference as though fully and completely set forth herein.

Figure 1:
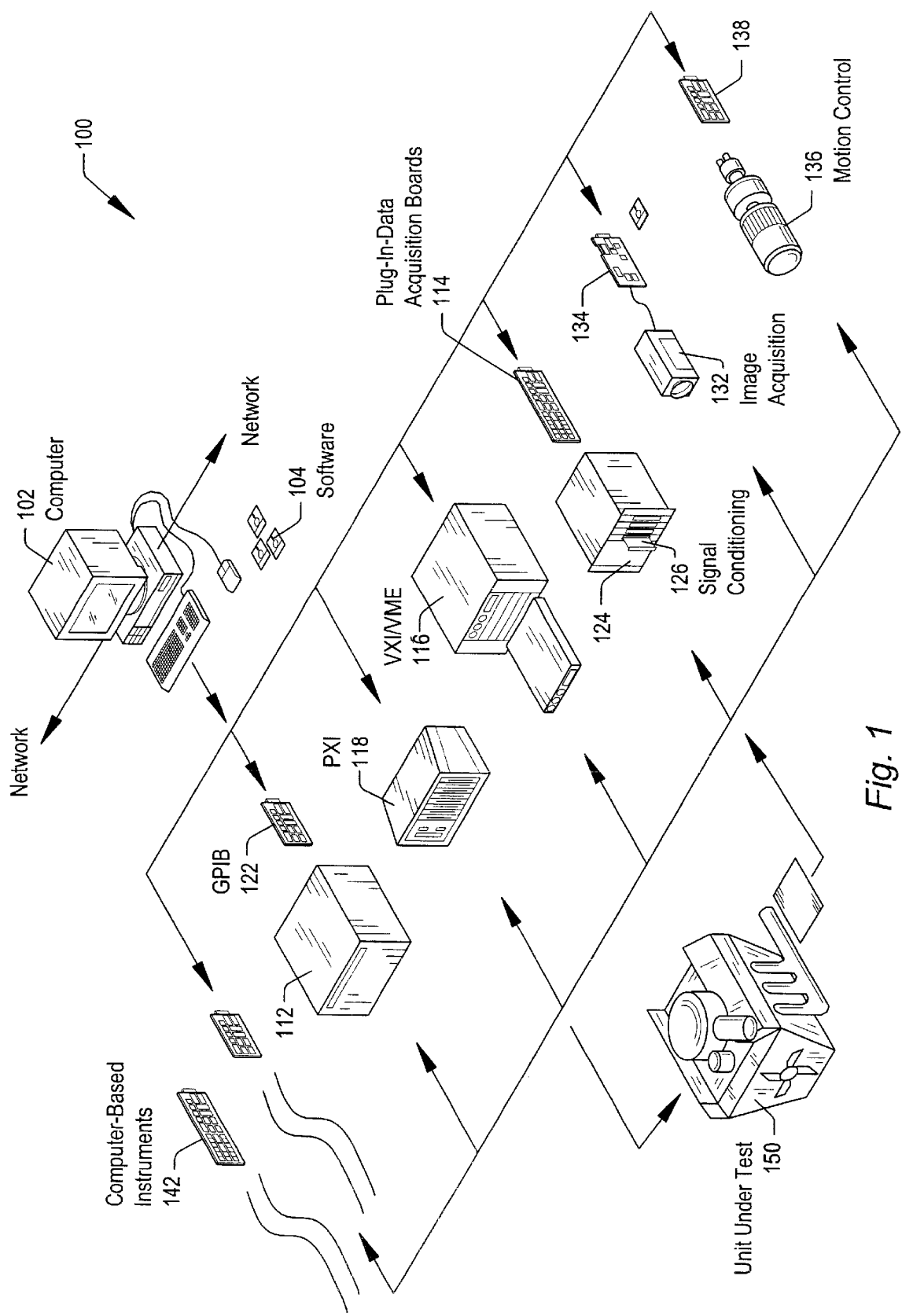
FIG. 1 illustrates an instrumentation control system according to one embodiment of the present invention.

FIG. 1—Instrumentation System

FIG. 1 illustrates an example instrumentation control system 100. FIG. 1 is exemplary only, and the present invention may be used in any of various systems, as desired.

The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via a GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 is coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments. The instruments are coupled to the unit under test (UUT) or process 150, or are coupled to receive field signals, typically generated by transducers. Other types of instruments or devices may be connected to the system, as desired. The system 100 may be used in a data acquisition and control application, in a test and measurement application, a process control application, an industrial automation application, or a man-machine interface application, among others.

The computer system 102 preferably includes a memory medium on which computer programs according to the present invention are stored. The term "memory medium" is intended to include an installation media, e.g., a CD-ROM, or floppy disks 104, a computer system memory such as DRAM, SRAM, EDO RAM, etc., or a non-volatile memory such as a magnetic medium, e.g., a hard drive, or optical storage. The memory medium preferably stores test executive software for creating and/or controlling an automated test system. The test executive software allows the user to create, configure, and/or control test sequence execution for various test applications, such as production and manufacturing test applications. The host computer CPU executing code and data from the memory medium comprises a means for creating and executing test programs according to the methods described below.

In the preferred embodiment, the present invention is comprised in the TestStand test executive software, available from National Instruments.

TestStand Architecture Overview

The TestStand test executive software of the present invention is a flexible, powerful test executive framework which provides a number of novel features. In particular, the test executive software of the present invention provides greatly improved configurability and modularity, thus simplifying the creation, modification and execution of test sequences. The test executive software provides numerous ways for the user to modify the out-of-the-box configuration and components or to add new components. These extensibility mechanisms enable the user to create the test executive that meets the user's particular requirements without modifying the TestStand test execution engine.

The test executive software expands on the traditional test executive concepts and introduces many new ones. The test executive software of the present invention- includes new concepts and features, including process models, step types, step properties, sequence variables, sequence parameters, module adapters, type conflict resolution and automatic result collection. In the present description, the test executive software of the present invention is referred to as the TestStand test executive software or simply as TestStand.

TestStand Software Components

Figure 2:
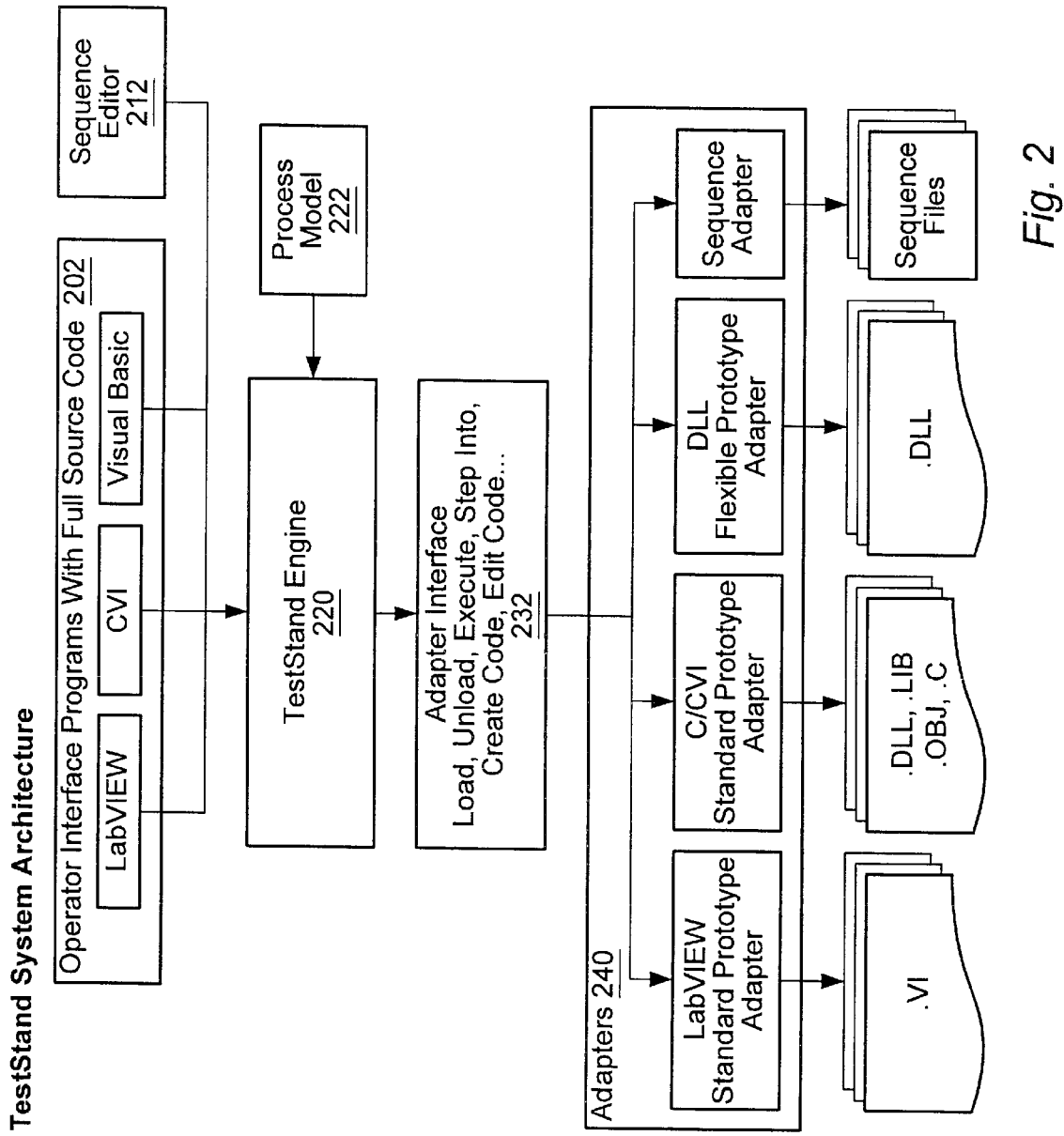
FIG. 2 illustrates the architecture of the test executive software according to the preferred embodiment of the present invention.

FIG. 2 shows the high-level relationships between elements of the TestStand system architecture. As shown, the TestStand test executive software includes operator interface programs 202 for interfacing to various software programs. The operator interface programs 202 shown in FIG. 2 are for interfacing to the LabVIEW, LabWindows CVI, and Visual Basic programs. However, additional operator interface programs 202 may be included for interfacing to other programs.

The TestStand test executive software also includes a sequence editor 212 for editing sequences. The sequence editor 212 and the operator interface programs 202 interface to the test executive engine 220, referred to as the TestStand Engine. One or more process models 222 couple to the TestStand Engine 220. The TestStand Engine 220 interfaces through an adapter interface 232 to one or more adapters 240. The adapters shown in FIG. 2 include the LabVIEW standard prototype adapter, the C/CVI prototype adapter, the DLL flexible prototype adapter, and the sequence adapter. The LabVIEW standard prototype adapter interfaces to programs having a VI extension, i.e., LabVIEW programs. The C/CVI prototype adapter interfaces to programs having a .dll, .lib, .obj, or .c extension. The DLL flexible prototype adapter interfaces to programs having a .dll extension. The sequence adapter interfaces to sequence file programs.

As shown in FIG. 2, the TestStand Engine 220 plays a pivotal role in the TestStand architecture. The TestStand Engine 220 runs sequences. Sequences contain steps that can call external code modules. By using module adapters 240 that have the standard adapter interface 232, the TestStand Engine 220 can load and execute different types of code modules. TestStand sequences can call subsequences through the common adapter interface 232. TestStand uses a special type of sequence called a process model to direct the high-level sequence flow. The TestStand Engine 220 exports an ActiveX Automation API used by the TestStand sequence editor 212 and run-time operator interfaces 202.

TestStand Sequence Editor

The TestStand sequence editor 212 is an application program in which the user creates, modifies, and debugs sequences. The sequence editor 212 provides the user easy access to all of the powerful TestStand features, such as step types and process models. The sequence editor 212 includes debugging tools found in application development environments such as LabVIEW, LabWindows/CVI, and Microsoft Visual C/C++. These include breakpoints, single stepping, stepping into or over function calls, tracing, a variable display, and a watch window.

In the TestStand sequence editor 212, the user can start multiple concurrent executions. Multiple instances of the same sequence can be executed, and different sequences can be executed at the same time. Each execution instance has its own execution window. In trace mode, the execution window displays the steps in the currently executing sequence. When execution .is suspended, the execution window displays the next step to execute and provides single-stepping options.

TestStand Run-Time Operator Interfaces

TestStand preferably includes three run-time operator interfaces 202 provided to the end user in both source and executable form. Each run-time operator interface 202 is preferably a separate application program. The operator interfaces 202 differ primarily based on the language and ADE in which each is developed. As shown in FIG. 2, in the currently implemented embodiment, TestStand includes run-time operator interfaces developed in LabVIEW, LabWindows/CVI and Visual Basic.

Although the user can use the TestStand sequence editor 212 at a production station, the TestStand run-time operator interfaces 202 are simpler and are fully customizable. Like the sequence editor 212, the run-time operator interfaces 202 allow the user to start multiple concurrent executions, set breakpoints, and single step. Unlike, the sequence editor 212, however, in the present embodiment the run-time operator interfaces 202 do not allow the user to modify sequences, and they do not display sequence variables, sequence parameters, step properties, and so on.

The user can customize one of the run-time operator interfaces 202 by modifying the source code for the program and the source documents for the manual. If the user desires to write his/her own run-time operator interface 202, the source code of one of the run-time operator interfaces 202 is used as a starting point.

TestStand Test Executive Engine

The TestStand Test Executive Engine 220 is used for creating, editing, executing, and debugging sequences. In the preferred embodiment, the TestStand Test Executive Engine 220 comprises a set of DLLs that export an object-based or component-based API, preferably an ActiveX Automation API. The TestStand sequence editor 212 and run-time operator interfaces 202 use the TestStand Test Executive Engine API (Engine API). The user can call the Engine API from any programming environment that supports access to ActiveX Automation servers. Thus, the user can call the Engine API from test modules, including test modules that are written in LabVIEW and LabWindows/CVI.

The TestStand Test Executive Engine 220 implements numerous features of the present invention including process models, step types, type conflict resolution and automatic result collection.

Module Adapters

Most steps in a TestStand sequence invoke code in another sequence or in a code module. When invoking code in a code module, TestStand must know the type of the code module, how to call it, and how to pass parameters to it. The different types of code modules include LabVIEW VIs, C functions in DLLs, and C functions in source, object, or library modules that are created in LabWindows/CVI or other compilers. TestStand also must know the list of parameters that the code module requires.

In the preferred embodiment, TestStand uses module adapters 240 to obtain this knowledge. In the currently implemented embodiment, TestStand provides the following module adapters:

DLL Flexible Prototype Adapter—Allows the user to call C functions in a DLL with a variety of parameter types.

LabVIEW Standard Prototype Adapter—Allows the user to call any LabVIEW VI that has the TestStand standard G parameter list.

C/CVI Standard Prototype Adapter—Allows the user to call any C function that has the TestStand standard C parameter list. The function can be in an object file, library file, or DLL. The C function can also be in a source file that is in the project that the user is currently using in the LabWindows/CVI development environment.

Sequence Adapter—Allows the user to call subsequences with parameters.

The module adapters 240 contain other important information besides the calling convention and parameter lists. If the module adapter 240 is specific to an application development environment (ADE), the adapter knows how to bring up the ADE, how to create source code for a new code module in the ADE, and how to display the source for an existing code module in the ADE. The DLL Flexible Prototype Adapter can query a DLL type library for the parameter list information and display it to the sequence developer.

TestStand Building Blocks

This section provides an overview of the TestStand features and building blocks that are used to create test sequences and entire test systems.

Variables and Properties

TestStand provides the user various places, referred to as variables and properties, in which data values can be stored. Variables are properties that the user can freely create in certain contexts. Variables can be global to a sequence file or local to a particular sequence. The values of station global variables are persistent across different executions and even across different invocations of the sequence editor 212 or run-time operator interfaces 202. The TestStand Engine maintains the value of station global variables in a file on the run-time computer.

Each step in a sequence can have properties. For example, a step might have an integer error code property. The type of a step determines the set of properties which are included in the step. Step Types are discussed in greater detail below.

TestStand variables are used to share data among tests that are written in different programming languages, even if they do not have compatible data representations. Values that are stored in variables and properties can be passed to code modules. The TestStand ActiveX API is useable to access variable and property values directly from code modules. When executing sequences, TestStand maintains a "sequence context" that contains references to all global variables and all local variables and step properties in active sequences. The contents of the sequence context change depending on the currently executing sequence and step. If the user passes a sequence context object reference to the code module, the TestStand ActiveX API can be used to access the variables and properties in the sequence context.

1. Expressions

In TestStand, the values of variables and properties can be used in numerous ways, such as passing a variable to a code module or using a property value to determine whether to execute a step. Sometimes the user desires to use an expression, which is a formula that calculates a new value from the values of multiple variable or properties. An expression can be used anywhere a simple variable or property value is used. In expressions, the user can access all variables and properties in the sequence context that is active when TestStand evaluates the expression. The following is an example of an expression:

Locals.MidBandFrequency=(Step.HighFrequency+Step.LowFrequency)/2

TestStand supports all applicable expression operators and syntax that are used in C, C++, Java, and Visual Basic. TestStand also provides an expression browser dialog box that the user can access, if the user is not familiar with expressions in these standard languages. The expression browser allows the user to interactively build an expression by selecting from lists of available variables, properties, and expression operators. The expression browser also lists a number of functions that the user can use in expressions. The expression browser has help text for each expression operator and function.

Categories of Properties

A property is a container of information. A property can contain a single value, an array of values of the same type, or no value at all. A property can also contain any number of sub-properties. Each property has a name.

A value is a number, a string, or a Boolean. TestStand stores numbers as 64-bit floating-point values in the IEEE 754 format. Values are not containers and thus cannot contain sub-properties. Arrays of values can have multiple dimensions.

The following are the major categories of properties according to the kinds of values they contain:

A "single-valued" property contains a single value. Because TestStand has three types of values, TestStand has three types of single-valued properties: Number properties, String properties, and Boolean properties.

An "array" property contains an array of values. TestStand has Number Array properties, String Array properties, and Boolean Array properties.

A "property-array" property contains a value that is an array of subproperties of a single type. In addition to the array of sub-properties, property-array properties can contain any number of subproperties of other types.

An "object" property contains no values. Typically, object properties contain multiple sub-properties. Object properties are analogous to structures in C/C++and to clusters in LabVIEW.

Standard and Custom Named Data Types

When the user creates a variable or property, the user specifies its data type. In some cases, a simple data type such as a number or a Boolean is used. In other cases, the user can define his/her own data type, by creating a named data type, in which sub-properties are added to create an arbitrarily complex data structure. When a named data type is created, the user can reuse the named data type for multiple variables or properties. Although each variable or property that the user creates with a named data type has the same data structure, the values they contain can differ.

TestStand defines certain standard named data types. The user can add sub-properties to the standard data types, but cannot delete any of their built-in sub-properties. The standard named data types are Path, Error, and CommonResults.

The user can define his/her own custom named data types. The user must choose a unique name for each of the custom data types. Sub-properties in each custom data type can be added or deleted without restriction. For example, the user might create a "Transmitter" data type that contains sub-properties such as "NumChannels" and "Power Level".

When the user creates a variable or property, the user can select from among the simple property types and the named data types.

Built-In and Custom Properties

TestStand defines a number of properties that are always present for objects such as steps and sequences. An example is the step run mode property. TestStand normally hides these properties in the sequence editor, although it allows the user to modify some of them through dialog boxes. Such properties are called built-in properties.

The user can define new properties in addition to the built-in properties. Examples are high and low limit properties in a step or local variables in a sequence. Such properties are called "custom" properties.

Steps

A sequence comprises a series of steps. In TestStand a step can do many things, such as initializing an instrument, performing a complex test, or making a decision that affects the flow of execution in a sequence. Steps can performs these actions through several types of mechanisms, including jumping to another step, executing an expression, calling a sub-sequence or calling an external code module. The term "step module" is used to refer to the code module that a step calls.

In TestStand, steps can have custom properties. For steps that call code modules, custom step properties are useful for storing parameters to pass to the code module for the step. They also serve as a place for the code module to store its results. The TestStand ActiveX API can be used to access the values of custom step properties from code modules.

Not all steps call code modules. Some steps perform standard actions that the user configures using a dialog box. In this case, custom-step properties are useful for storing the configuration settings that the user specifies.

Built-In Step Properties

TestStand steps have a number of built-in properties that the user can specify using the various tabs on the Step Properties dialog box. These built-in step properties include:

Preconditions allow the user to specify the conditions that must be true for TestStand to execute the step during the normal flow of execution in a sequence.

Load/Unload Options allow the user to control when TestStand loads and unloads the code modules or subsequences that each step invokes.

Run Mode allows the user to skip a step or to force it to pass or fail without executing the step module.

Record Results allow the user to specify whether TestStand stores the results of the step in a list. This is discussed further below with respect to Results Collection.

Step Failure Causes Sequence Failure allows the user to specify whether TestStand sets the status of the sequence to "Failed" when the status of the step is "Failed".

Ignore Run-Time Errors allows the user to specify whether TestStand continues execution normally after the step even though a run-time error occurs in the step.

Post Actions allows the user to execute callbacks or jump to other steps after executing the step, depending on the pass/fail status of the step or any custom condition.

Loop options allow the user to cause a single step to execute multiple times before executing the next step. The user can specify the conditions under which to terminate the loop. The user can also specify whether to collect results for each loop iteration, for the loop as a whole, or for both.

Pre Expressions allows the user to specify an expression to evaluate before executing the step module.

Post Expression allows the user to specify an expression to evaluate after executing the step module.

Status Expression allows the user to specify an expression to use to set the value of the "status" property of the step automatically.

Step Types

Each step has a step type in a similar manner to which each variable or property has a data type. A step type can contain any number of custom properties. Each step of that step type, also referred to as an instance of the step type, has the custom step properties in addition to the built-in step properties. All steps of the same type have the same properties, but the values of the properties can differ. The step type specifies the initial values of all the step properties. When the user creates the step in the sequence editor, TestStand sets the initial or default values of the step properties from the values that the step type specifies. The user can modify the values of the built-in step properties by using the Step Properties dialog box. Usually, the user can modify the values of custom step properties using a dialog box specific to the step type. If the step type does not have a dialog box for the custom properties, the user can view the custom properties by selecting "View Contents" from the context menu for the step. Although, step modules typically do not modify the values of the built-in step properties at run-time, they often modify and interrogate the values of the custom step properties.

A step type can also define standard behavior for each step of that type. The step type does this using a set of "substeps". Substeps are actions that the TestStand Engine performs for a step besides calling the step module. The substeps of a step type perform the same actions for every step of that type. The different types of substeps are as follows:

Edit substep
Pre-step substep
Post-step substep

The sequence developer invokes the edit substep by selecting a menu item in the context menu for the step or by clicking a button on the Step Properties dialog for the step. The step type specifies the name of the menu item and the caption of the button. The edit substep displays a dialog box in which the sequence developer edits the values of custom step properties. For example, an edit substep might display a dialog box in which the sequence developer specifies the high and low limits for a test. The edit substep might then store the high and low limit values as step properties.

The Engine 220 calls the pre-step substep before calling the step module. The user can specify an adapter and a module to invoke in the pre-step substep. For example, a pre-step substep might call a code module that retrieves measurement configuration parameters into step properties for use by the step module.

The Engine 220 calls the post-step substep after calling the step module. The user can specify an adapter and a module to invoke in the post-step substep. A post-step substep might call a code module that compares the values that the step module stored in step properties against limit values that the edit substep stored in other step properties.

TestStand contains a set of predefined step types. These include

Action
Numeric Limit Test
String Value Test
Pass/Fail Test
Label
Goto
Statement
Limit Loader
Message Popup
Call Executable
Call Sequence For a description of each of these step types, refer to the discussion of Built-in Step Types below. Although the user can create a test application using only the predefined step types, the user can also create his/her own step types. By creating his/her own step types, the user can define standard, reusable classes of steps that apply specifically to the user's application. For example, the user might define a Switch Matrix Configuration step or a Transmitter Adjacent Channel Power Test step.

The sequence developer creates a new step by selecting the "Insert Step" item in the context menu that appears when the user right click on a sequence window. The "Insert Step" item brings up a hierarchical submenu containing the step types available on the computer. When the user creates a new step type, the user specifies its name and position within the submenu.

Source Code Templates

When the user creates a step type, the user can also define source code templates for that step type. When the sequence developer creates a new step of that type, the developer can use a source code template to generate source code fork the step module. For a particular step type, the user can specify different source code templates for the different module adapters.

Sequences

In TestStand a sequence comprises:

Any number of local variables
Any number of parameters
A main group of steps
A group of setup steps
A group of cleanup steps
Built-in sequence properties

Sequence Parameters

Each sequence has its own list of parameters. The user can specify the number of parameters and the data type of each parameter. The user can also specify a default value for each parameter. When the sequence developer creates a step that calls one sequence from another, the developer can specify the values to pass for the parameters of the subsequence. If the developer does not specify the value of a parameter, the TestStand Engine 220 passes the default value. The user can use the TestStand ActiveX API to access sequence parameter values from code modules that steps in the sequence call.

Sequence Local Variables

The user can create an unlimited number of local variables in a sequence. The user can use local variables to store data relevant to the execution of the sequence. The user can use the TestStand ActiveX API to access local variables from code modules that steps in the sequence call. The user can also pass local variables by value or by reference to any step in the sequence that calls a subsequence or that calls a DLL using the Flexible DLL Prototype Adapter.

Lifetime of Locals Variables, Parameters, and Custom Step Properties

Multiple instances of a sequence can run at the same time. This can occur when the user calls a sequence recursively or when a sequence runs in multiple concurrent executions. Each instance of the sequence has it own copy of the sequence parameters, and local variables, and custom properties of each step. When a sequence completes, the TestStand Engine 220 discards the values of the parameters, local variables, and custom properties.

Step Groups

A sequence can contain the following groups of steps: Setup, Main, and Cleanup. When TestStand executes a sequence, the steps in the Setup group execute first. The steps in the Main group execute next. The steps in the Cleanup group execute last. Typically, the Setup group contains steps that initialize instruments, fixtures, or a UUT. The Main group usually contains the bulk of the steps in a sequence, including the steps that test the UUT. The Cleanup group contains steps that power down or de-initialize the instruments, fixtures, and UUT.

One of the reasons for having separate step groups is to ensure that the steps in the Cleanup group execute regardless of whether the sequence completes successfully or a run-time error occurs in the sequence. If a Setup or Main step causes a run-time error to occur, the flow of execution jumps to the Cleanup step group. The Cleanup steps always run even if some of the Setup steps do not run. If a Cleanup step causes a run-time error, execution continues at the next Cleanup step.

If a run-time error occurs in a sequence, the TestStand Engine 220 reports the run-time error to the calling sequence. Execution in the calling sequence jumps to the Cleanup group in the calling sequence. This process continues up through the top-level sequence. Thus, when a run-time error occurs, the TestStand Engine 220 terminates execution after running all the Cleanup steps of the sequences that are active at the time of the run-time error.

Built-in Sequence Properties

Sequences have a few built-in properties that the user can specify using the Sequence Properties dialog. For example, the user can specify that the flow of execution jumps to the Cleanup step group whenever a step sets the status property of the sequence to "Failed".

Sequence Files

Sequence files can contain one or more sequences. Sequence files can also contain global variables. Sequence file global variables can be accessed by all sequences in the sequence file. Sequences files have a few built-in properties that the user can specify using the Sequence File Properties dialog. For example, the.user can specify Load and Unload Options that override the Load and Unload Options of all the steps in all the sequences in the file.

Sequences contain steps that conduct tests, set up instruments, or perform other actions necessary to test a UUT. Sequence files also contain the definitions for the data types and step types that are used by the sequences in the file. The sequence editor is used to create and edit sequence files. Sequences can be executed from the sequence editor or from any other TestStand operator interface program.

The various types of sequence files include normal sequence files, model sequence files, station callback sequence files, and front-end callback sequence files. Normal sequence files contain sequences that test UUTs, and these are the most common type. Model sequence files contain process model sequences. Station callback sequence files contain station callback sequences, and front-end callback sequence files contain front-end callback sequences.

Storage of Types in Files

Each sequence file contains the definitions of all the property and step types that the variables, parameters, and steps in the sequence file use. This is true for.all.TestStand files that use types.

In memory, the TestStand Engine 220 allows only one definition for each type. If the user loads a file that contains a type definition and a type definition of the same name already exists in memory, the TestStand Engine 220 verifies that the two type definitions are identical. If they are not identical, the TestStand Engine 220 informs the user of the conflict and/or automatically selects the appropriate type. The user can select one of the definitions to replace the other, or the user can rename one of them so that they can coexist. The operation of type conflict resolution is discussed below.

Process Models

Testing a Unit Under Test (UUT) requires more than just executing a set of tests. Typically, the test executive must perform a series of operations before and after it executes the sequence that performs the tests. Common operations include identifying the UUT, notifying the operator of pass/fail status, generating a test report, and logging results. These operations define the testing "process". The set of such operations and their flow of execution is called a "process model". Some traditional test executives implement their process model functionality internally and do not allow user modification. Other test executives do not define a process model at all. TestStand comes with a default process model that the user can easily modify or replace. The TestStand process model is a modular and user configurable entity.

The process model of the present invention provides tremendous savings in user development time. The process model enables the user to write different test sequences without repeating standard testing operations in each sequence. The process model is also user-modifiable. This is important because the testing process can vary based on the production line, the production site, or the systems and practices of the company in which the test executive is used.

TestStand provides a mechanism for defining a process model. A process model is in the form of a sequence file. The user can edit a process model just as he/she edits other sequences. TestStand ships with a fully functional default process model. The user can write his/her own process model, or the user can copy the default process model and then modify it.

Station Model

The user can select a process model file to use for all sequence files. This process model file is called the "station model" file. The TestStand installation program establishes "TestStandModel.seq" as the station model file. The user can use the Station Options dialog box to select a different station model. The user can also use the Station Options dialog box to allow individual sequence files to specify their own process model file, but typically this is not necessary.

Main Sequence and Client Sequence File

In TestStand, the sequence that initiates the tests on a UUT is called the "main sequence". The user preferably names each main sequence "MainSequence". When the user creates a new sequence file, TestStand automatically inserts a MainSequence sequence in the file. The process model invokes the main sequence as part of the overall testing process. The process model defines what is constant about the user's testing process, whereas main sequences define the steps that are unique to the different types of tests that are run.

An execution is typically begun from a main sequence in one of the user-created sequence files. TestStand determines which process model file to use with the main sequence. TestStand uses the station model file unless the sequence file specifies a different process model file and the Station Options is set to allow sequence files to override the user's station model setting.

After TestStand identifies the process model to use with a main sequence, the file that contains the main sequence becomes a "client sequence file," also referred to as a test sequence file, of the process model.

Model Callbacks

By default, each main sequence that is executed uses the process model selected by the user for the entire test station. TestStand has a mechanism called a model callback that allows the sequence developer to customize the behavior of a process model for each main sequence that uses it. By defining one or more model callbacks in a process model, the user specifies the set of process model operations that the sequence developer can customize.

The user defines a model callback by adding a sequence to the process model file, marking it as a callback, and calling it from the process model. The sequence developer can override the callback in the model sequence file by using the Sequence File Callbacks dialog to create a sequence of the same name in the client sequence file (test sequence file).

For example, the default TestStand process model defines a "TestReport" callback that generates the test report for each UUT. Normally, the TestReport callback in the default process model file is sufficient because it handles many types of test results. The sequence developer can, however, override the default TestReport callback by defining a different TestReport callback in a particular client sequence file.

Process models use callbacks to invoke the main sequence in the client sequence file. Each client sequence file must define a sequence by the name of "MainSequence". The process model contains a MainSequence callback that is merely a placeholder. The MainSequence in the client sequence file overrides the MainSequence placeholder in the model file.

To alter the behavior of the process model for all sequences, the user can modify the process model or replace it entirely. To redefine the set of customizable operations, the user can define new callbacks to, or delete existing callbacks from, the process model file.

Entry Points

A process model defines a set of "entry points". Each entry point is a sequence in the process model file. The user marks a sequence in the model file as an entry point in the Sequence Properties dialog box.

By defining multiple entry points in a process model, the test station operator has different ways to invoke a main sequence. For example, the default TestStand process model provides two entry points: "Test UUTs" and "Single Pass". The Test UUTs entry point initiates a loop that repeatedly identifies and tests UUTs. The Single Pass entry point tests a single UUT without identifying it. Such entry points are called "execution entry points". Execution entry points appear in the Execute menu of the sequence editor or operator interface when the active window contains a non-model sequence file that has a MainSequence callback.

Figure 3:
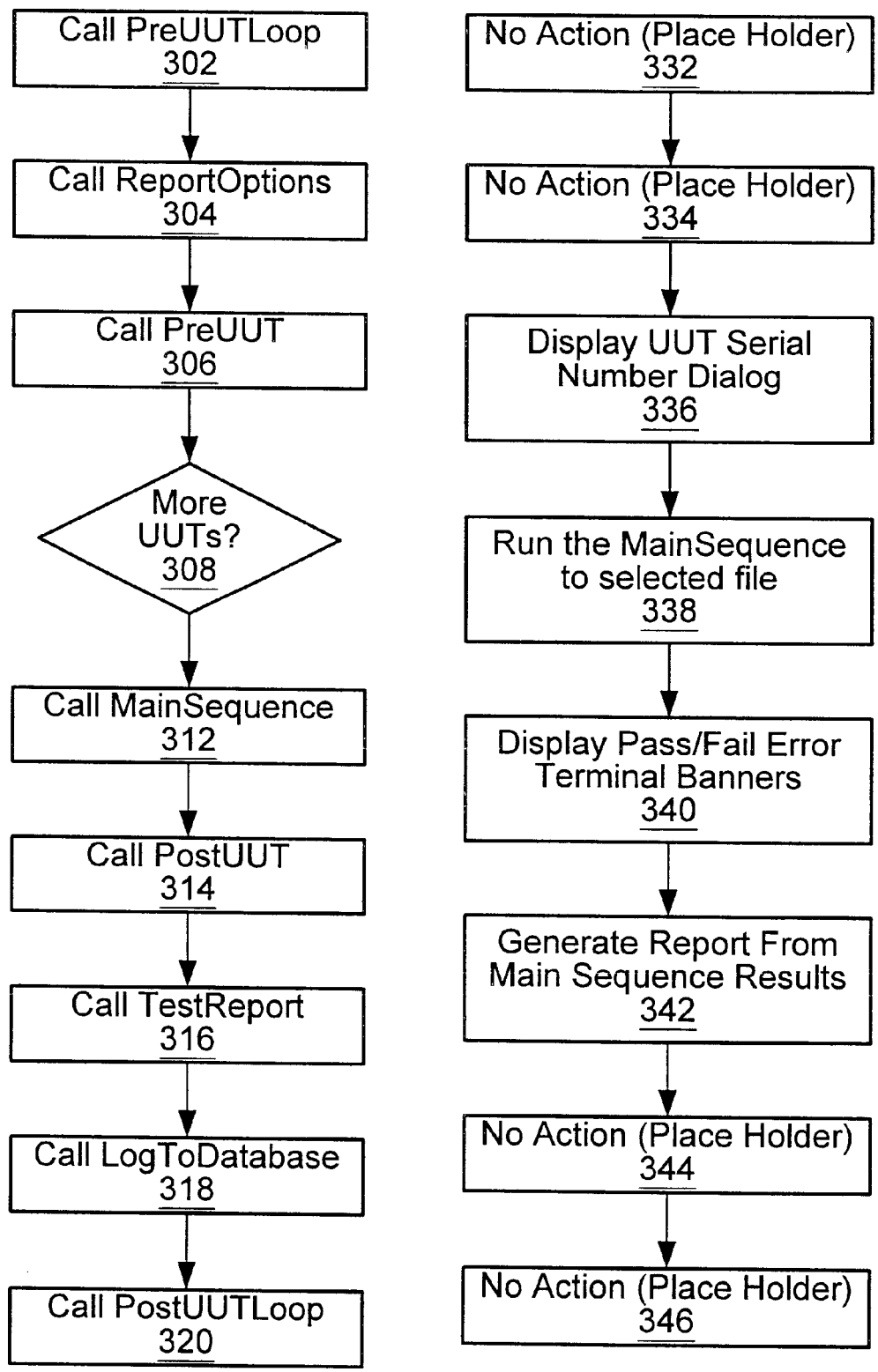
FIG. 3 is a flowchart illustrating the Test UUTs sequence in the default process model.

FIG. 3 is a flowchart of the major operations of the "Test UUTs" entry point sequence in the default process model. As shown, the sequence implements many of its operations as callbacks. The box on the left shows the flow of control. The box on the right shows the action that each callback in the default model performs if the user does not override it.

Like any other sequence, the sequence for a process model entry point can contain calls to DLLs, calls to subsequences, Goto steps, and so on. FIG. 4 shows the entire set of steps for the Test UUTs entry point in the default process model The user can execute a sequence without a process model by selecting the Run <Sequence Name> item in the "Execute" menu, where <Sequence Name> is the name of the sequence the user is currently viewing. This option is useful for debugging. It executes the sequence directly, skipping the process model operations such as UUT identification and test report generation. Any sequence can be executed this way, not just main sequences.

A process model can define other types of entry points, such as "configuration entry points". An example is the "Report Options" entry point, which appears as "Report Options" in the View menu of the sequence editor or run-time operator interface. Process model entry points are discussed further below.

FIG. 5 shows a list of all the sequences in the default TestStand process model. The first three sequences are entry points. The last sequence is a utility subsequence that the execution entry points call. The other sequences are callbacks that the user can override in a client sequence file.

Process models are discussed in greater detail below.

Automatic Result Collection

TestStand can automatically collect the results of each step. The user can enable or disable result collection for a particular sequence or for the entire test station.

Each sequence has a local array that stores the results of each step. The contents in the results for each can vary depending on the step type. When TestStand stores the results for a step into the array, it adds information such as the name of the step and its position in the sequence. For a step that calls a sequence, TestStand also adds the result array from the subsequence. TestStand result collection is discussed further below.

Callback Sequences

Callbacks are sequences that TestStand calls under specific circumstances. The user can create new callback sequences or replace existing callbacks to customize the operation of the test station. The Sequence File Callbacks dialog box is used to add a callback sequence to a sequence file.

TestStand defines three categories of callbacks. The categories are based on the entity that invokes the callback and the location in which the callback is defined. The following table titled "Callback Types" shows the different types of callbacks.

Callback Types

| Callback Type | Where the User Defines the Callback | Who Calls the Callback |
| --- | --- | --- |
| Model Callbacks | Process model file or client sequence file | Sequences in the process model file |
| Engine Callbacks | StationCallbacks.seq, the process model file, or a regular sequence file | Engine |
| Front-End Callbacks | FrontEndCallbacks.seq | Operator interface program |

The "Process Model" section above discusses model callbacks in detail. This section discusses engine callbacks and front-end callbacks.

Engine Callbacks

The TestStand Engine 220 defines a set of callbacks that it invokes at specific points during execution. These callbacks are called "engine callbacks". TestStand defines the name of each engine callback.

Engine callbacks are a way for the user to direct TestStand to call certain sequences before and after the execution of individual steps, before and after interactive executions, after loading a sequence file, and before unloading a sequence file. Because the TestStand Engine 220 controls the execution of steps and the loading and unloading of sequence files, TestStand defines the set of engine callbacks and their names.

The engine callbacks are in three general groups, based on the file in which the callback sequence appears. The user can define engine callbacks in sequence files, in process model files, and in the StationCallbacks.seq file.

Front-End Callbacks

Front-end callbacks are sequences in the "FrontEndCallbacks.seq" file that runtime operator interface programs call. Front-End callbacks allow multiple operator interfaces to share the same implementation for a specific operation. The version of FrontEndCallback.seq that TestStand installs contains one front-end callback sequence, "LoginLogout". The sequence editor and all operator interfaces that come with TestStand call LoginLogout.

When operations are implemented as front-end callbacks, the user writes them as sequences. Thus the user can modify a front-end callback without modifying the source code for the operator interfaces or rebuilding the executables for them. For example, to change how the various operator interfaces perform the login procedure, the user is only required to modify the LoginLogout sequence in FrontEndCallbacks.seq.

The user can create new front-end callbacks by adding sequences to FrontEndCallbacks.seq file. The user can then invoke this sequence from each of the operator interface programs used. The sequence is invoked using functions in the TestStand ActiveX API. In the preferred embodiment, the source code for the TestStand sequence editor cannot be edited. Thus, the user cannot make the sequence editor call new front-end callbacks that the user has created.

Sequence Executions

When a sequence is run or executed, TestStand creates an "execution" object. The execution object contains all the information that TestStand needs to run the user's sequence and the subsequences it calls. While an execution is active, the user can start another execution by running the same sequence again or by running a different one. TestStand does not limit the number of executions that can be run concurrently. Each execution runs in a different thread.

Typically, the TestStand sequence editor creates a new window for each execution. This window is called an "execution window". In the execution window, the user can view steps as they execute, the values of variables and properties, and the test report. Typically, run-time operator interface programs also have a view or window for each execution.

Normal and Interactive Executions

The user can start an execution in the sequence editor by selecting the Run <SequenceName> item or one of the process model entry points from the Execute menu. This is called a "normal execution".

The user can run steps in "interactive mode" by selecting one or more steps and choosing the "Run Selected Steps" or "Loop Selected Steps" items in the context menu. In interactive mode, only the selected steps in the sequence execute, regardless of any branching logic that the sequence contains. The selected steps run in the order in which they appear in the sequence.

The user can run steps in interactive mode from two different contexts. Steps are run interactively from a sequence file window. When this is done, the user creates a new execution. This is called a "root interactive execution". The user can set station options to control whether the Setup and Cleanup step groups of the sequence run as part of a root interactive execution. Root interactive executions do not invoke process models. Thus, by default, root interactive executions do not generate test reports.

The user can also run steps interactively from an existing execution window for a normal execution that is suspended at a breakpoint. Steps can only be run in the sequence and step group in which execution is suspended. When this is done, the selected steps run within the context of the normal execution. This is called a "nested interactive execution". The steps that the user runs interactively can access the variable values of the normal execution and add to its results. When the selected steps complete, the execution returns to the step at which it was suspended when the user chooses "Run Selected Steps" or "Loop Selected Steps".

Terminating and Aborting Executions

The menus in the sequence editor 212 and run-time operator interfaces 202 have commands that allow the user to stop execution before the execution has completed normally. The TestStand Engine API has corresponding methods that allow the user to stop execution from a code module. The user can stop one execution or all executions. The user can issue the stop request at any time, but it does not take effect in each execution until the currently executing code module returns control.

The user can stop executions in two ways. When the user "terminates" an execution, all the Cleanup step groups in the sequences on the call stack run before execution ends. Also, the process model can continue to run. Depending on the process model, it might continue testing with the next UUT or generate a test report.

When an execution is aborted, the Cleanup step groups do not run, and the process model cannot continue. In general, it is better to terminate execution so that the Cleanup step groups can return the.user's system to a known state. The user aborts an execution when he/she desires the execution to stop completely as soon as possible. Typically, the user aborts an execution only when debugging is being performed and the user is sure that it is safe to not run the cleanup steps for a sequence.

Types

The TestStand test executive system of the present invention includes various types, including step types, custom named data types, and standard named data types. The TestStand sequence editor contains four windows and views in which the user can create, modify, or examine data types and step types. These windows and views include the sequence file types view, the station globals types view, the user types view, and the type palette window. Each window or view displays the types that a corresponding file contains, including- step types, custom data types, and standard data types, among others.

Type Storage and Conflict Resolution

A type can be a data type or step type, or other kind of type. For each type that a file uses, the TestStand system stores the definition of the type in the file. The user can also specify that a file always saves the definition for a type, even if the file does not currently use the type. Because many files can use the same type, many files can contain definitions for the same type. For example, a user may have a number of sequence files that contain the definitions for the pass/fail test step type in the "CommonResults" standard data type.

In memory, the TestStand system allows only one definition for each type. Although the type can appear in multiple views, only one underlying definition of the type preferably exists in memory. If the user modifies the type in one view, the type is updated in all views. The "find type" command in the sequence editor "View" menu displays a dialog box containing a list of all types that are currently in memory. This command identifies the files and sequences that use the type.

Problems can arise if there is not a single definition of a type in the system. For example, when the user creates a step type and then the user stores an instance of the step type in the sequence file, the type definition of the step type is automatically stored in the file. If someone later changes the contents of the step type, an d then reloads the sequence which is based on the original step type, there will be a conflict. This conflict can also occur when the user moves a sequence file from a first computer to a second computer, wherein the second computer includes a different type definition for the respective type name.

If the user loads a file that contains a type definition, and another type definition of the same name already exists in memory, TestStand verifies that the two type definitions are identical. If the type definitions are not identical, TestStand informs the user of the conflict through the "Type Conflict In File" dialog box shown in FIG. 8. The conflict resolution method of the present invention detects this conflict and optionally presents selections which allows the user to select which step type to use, e.g., to select one of the step types or to rename one so that they are different.

Figure 6:
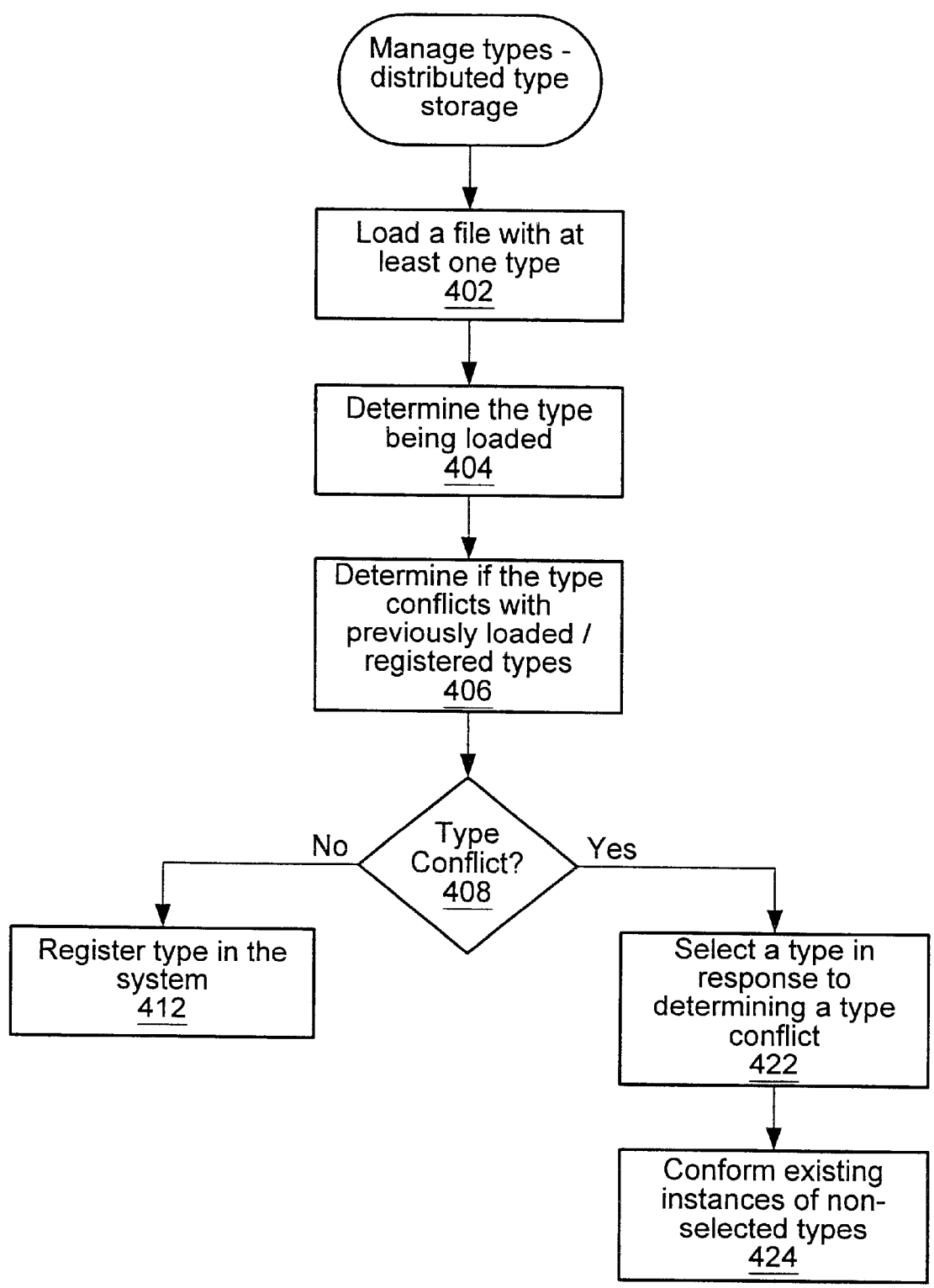
FIG. 6 is a flowchart illustrating a method for managing types in a test executive system.
Figure 7:
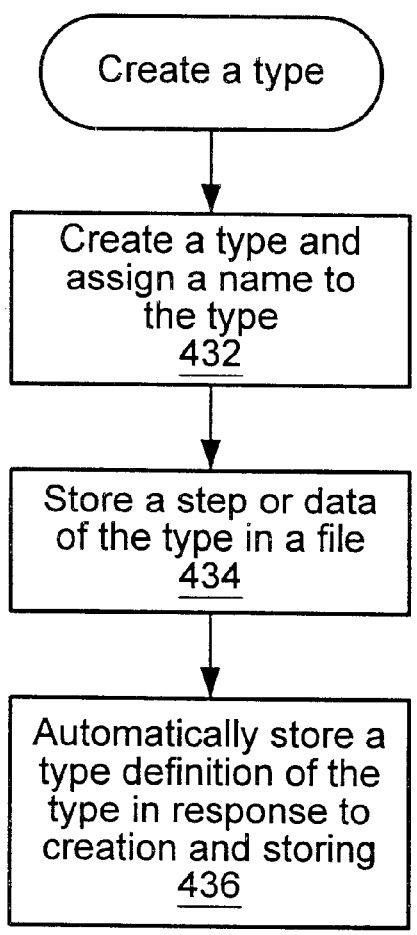
FIG. 7 is a flowchart illustrating a method for creating types in the test executive system.

FIGS. 6 and 7—Distributed Type Storage and Conflict Resolution Flowchart Diagrams FIGS. 6 and 7 are flowchart diagrams illustrating operation of distributed type storage and conflict resolution according to the preferred embodiment of the present invention.

In all of the flowcharts described herein, the user performing an action with respect to the computer, such as creating a type, configuring a step type, configuring a process model, etc., can also be stated as the computer performing the action in response to user input. Also, various of the steps may occur concurrently or in different orders than that shown.

FIG. 6 illustrates a method for managing types in a test executive system. In the preferred embodiment, the test executive system is used for creating test programs for testing one or more units under test (UUTs).

As shown, in step 402 the user loads a file with at least one type. In other words, the user provides input to the computer to load or store a file of a pre-defined type onto the computer. The file preferably stores a type definition of the loaded type, e.g., a data type or step type. As discussed below with respect to FIG. 7, when the user creates and/or stores a step or data of a first type in the file, the TestStand Engine 220 automatically stores a type definition of the first type in the file in response thereto. The type definition preferably includes version data.

In step 404 the TestStand Engine 220 determines the type being loaded in response to the user loading the file.

In step 406 the TestStand Engine 220 determines if the loaded type conflicts with one or more previously loaded/registered types. This determination includes comparing the type being loaded with the previously loaded/registered types in the system. In the preferred embodiment, the determination of a type conflict comprises determining if a name of the loaded type conflicts with a name of any of the previously loaded/registered types.

If the types do not conflict as determined in step 408, then in step 412 the TestStand Engine 220 registers the type in the system. Thus, since there is no type conflict, the type can be safely registered in the system.

If the types do conflict as determined in step 408, then in step 422 the TestStand Engine 220 selects a type in response to determining the type conflict. In the preferred embodiment, the TestStand Engine 220 selects the type based on version data. In the preferred embodiment, the version data comprises a version number, and the TestStand Engine 220 selects the type with a most recent version number. The version data may comprise any type of ordinal system, such as numbers or letters of an alphabet. The version data may also comprise date/time information.

In one embodiment, the TestStand Engine 220 requests user input regarding selection of a type in response to determining a type conflict, and this user input is used in selecting the type. In other words, when the TestStand Engine 220 detects a type conflict in step 408, the Engine 220 displays a dialog informing the user of the conflict and requesting the user to decide which type should be used. The dialog.may also display version data from the respective types to help the user to select the proper type. The user then selects the type to be used. This occurs, for example, when the version numbers of the types are the same.

Figure 8:
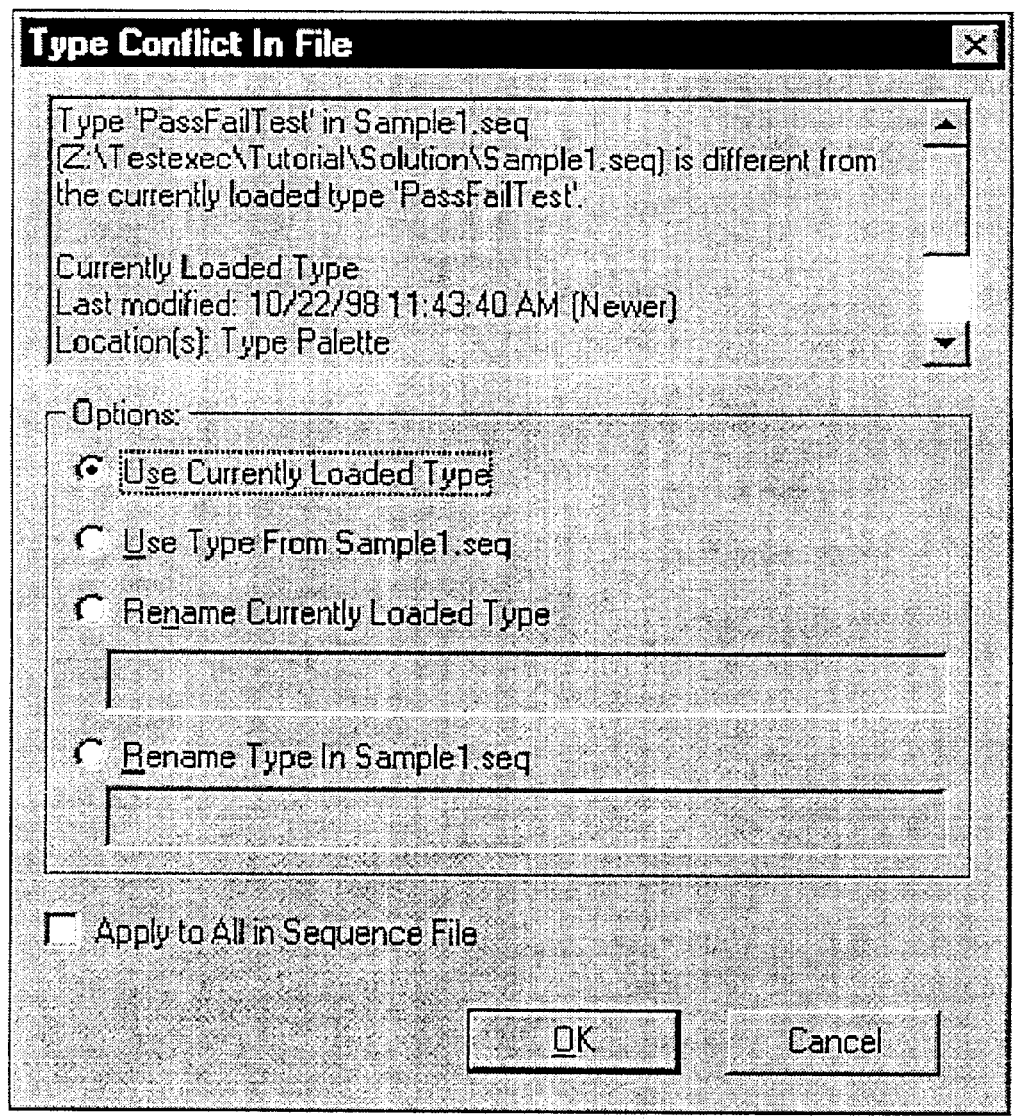
FIG. 8 is a screen shot illustrating the "Type Conflict In File" dialog box which is displayed in the preferred embodiment.

FIG. 8 illustrates the "Type Conflict In File" dialog box which is displayed in the preferred embodiment. As shown, the user can select one of the definitions to replace the other in the "Type Conflict In File" dialog box. The user can also rename one of them so they can coexist in memory. If the user enables the "Apply to All in Sequence File" checkbox, TestStand applies a selected option to all conflicts in the sequence file.

Thus step 422 comprises either the TestStand Engine 220 selecting the type or the user selecting the type. After step 422, in step 424 the TestStand Engine 220 conforms existing instances of one or more non-selected types with the selected type. The conforming is preferably performed by modifying the data structure of the one or more non-selected types to conform to the data structure of the selected type. This conforming preferably includes preserving at least a portion of the old data of the one or more non-selected types.

In the preferred embodiment, steps 404 and 406 are automatically performed, preferably by the TestStand Engine 220, in response to the user loading the file in step 402. The TestStand Engine 220 also preferably automatically performs either step 412 or steps 422 and 424 in response to the user loading the file in step 402.

FIG. 7—Creating a Type

FIG. 7 is a flowchart illustrating a method for creating types in the test executive system. As shown, in step 432 the user creates a type and assigns a name to the type. The user preferably creates the type using a graphical user interface (GUI). The user may also assign user-specified version data to the type. Alternatively, or in addition, the TestStand system automatically assigns time stamp information to-the type.

In step 434 the user stores a step or data of the at least one type in a file. In step 436 the TestStand Engine 220 automatically stores a type definition of the type in the file in response to the user creating and storing the type in steps 432 and 434.

When the user later loads a file which includes a stored type, the method described in FIG. 6 executes to perform conflict resolution. This is especially important, for example, where the user creates and stores the type in a first computer, and then later loads the file in a second computer. For example, the second computer may include a different type which includes the same name as the type created and stored in the first computer, thereby creating a conflict.

Step Types

As discussed above, a sequence comprises a series of steps, wherein a step is typically a test performed on a UUT. The present invention includes step types which allow more modular and configurable steps while minimizing user coding and effort.

A step type essentially comprises a custom set of properties and/or operations associated with a step. Stated another way, a step type defines common operations and/or data that are associated with a test module in a similar way that a process model defines functionality associated with calling the main sequence. A step type is also similar to a data type for a variable or property. The test module is hard coded, and the step type represents operations and/or properties associated with calling this test module. A step type is a modular, identifiable unit configured by the user, preferably through a graphical user interface, e.g., dialogs.

In a test sequence with a number of steps, in many instances the user will desire a number of steps that have some commonality of functionality and/or properties. A primary purpose of a step type is to define, in a single location, common properties and/or operations associated with a plurality of steps referred to as the step type, thereby eliminating the need for the user to define these common properties and/or operations with each of the respective steps. The user can thus incorporate this common functionality and/or properties in a step type, rather than requiring the user to hard code that functionality and/or properties in each step. The functionality and/or properties defined by a step type is generally peripheral or associated with the actual test or the step being performed.

For example, it may be desirable to handle the return data a certain way, and the user desires this return data handling functionality for a number of different steps. According to the present invention, the user has the ability to create a step type which defines this commonality, i.e., defines a standard way that that step type will handle the data. Therefore the step type makes it easier to reuse return data handling code for all the steps that will have that same common functionality of handling data. Thus steps (instances) of this type are easier to configure, since the common functionality does not need to be re-coded for each step. The user also may want to define properties around a class of steps to provide more configurability. This is done by creating or configuring a step type for the class of steps, wherein the step type defines the common properties.

As discussed above, step types define common functionality by defining an edit substep and pre and post substeps. The edit substep vs. the pre and post substeps are similar to the configuration entry point vs. execution entry point in the process model.

The edit substep allows the user to configure the peculiarities of a particular instance of a step type. For instance the edit substep can be configured to display or pop up a message to request user input regarding the number of buttons desired on a dialog. This message is displayed at configuration time, not run time.

Step types can contain custom properties in addition to built-in step properties. The step type specifies the initial values of the step properties. The step type can also define standard behavior for each step of the respective step type, preferably using sub-steps, e.g., an edit sub-step, pre-step sub-step and post-step sub-step.

In creating the steps in a sequence, the user may want to select existing step types which will be common for one or more steps he/she is using in his sequences or he/she may want to configure new step types for a certain type of step he/she will want to habitually use or use a plurality of times in a sequence.

A step type has similar functionality to a type definition, meaning that once the user has configured a step type and used it throughout different steps of the sequence, if the user later changes that step type, those changes propagate through all of the steps (instances) which are based on that step type.

In prior art test executives, the functionality performed by the step type of the present invention was hard coded in the test executive itself and was not easily changeable. Further, this functionality was not in a modular form which could be reused or applied to a plurality of steps. The step type of the present invention embodies this functionality, e.g., the pre and post operations in a typical test, and places this in a configurable and reusable form. Step types of the present invention are modular and user configurable and provide tremendous savings in developer effort.

There are basically three different types of step types: step types that call code modules through any module adapter like CVI or LabVIEW; step types that require a particular module adapter; and step types that do not call code modules.

Using Step Types

Figures 9, 10:
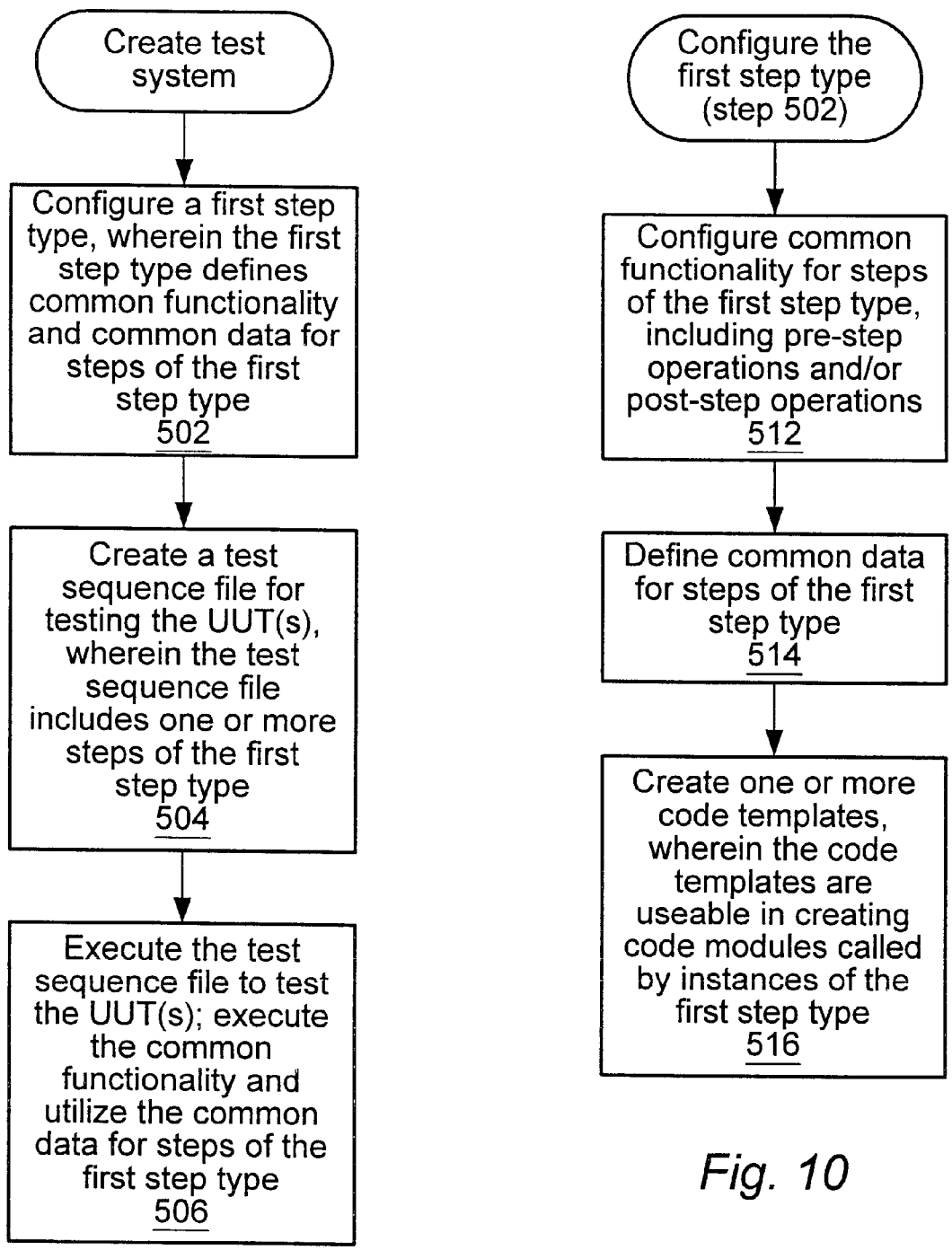
FIG. 9 is a flowchart illustrating a method for creating a test system for testing one or more units under test (UUTs), including creation of a step type and one or more instances of the step type.
FIG. 10 is a flowchart illustrating detail regarding configuration of a step type.

FIGS. 9 and 10 are flowchart diagrams which illustrate the operation or use of step types within the test executive system according to the preferred embodiment of the present invention.

FIG. 9 illustrates a method for creating a test system for testing one or more units under test (UUTs), wherein the test system includes at least one step type. As shown, in step 502 the user configures a first step type, i.e., the user provides input to the computer to configure the first step type. As discussed above, the first step type defines common functionality and common data for steps (instances) of the first step type. The common functionality preferably includes one or more of a common editing interface, pre-step functionality and post-step functionality. The common data includes one or more property values organized in a user-defined hierarchy. Configuration of the first step type also optionally includes creating one or more code templates, wherein the code templates are useable in creating a code module called by instances of the first step type. Step 502 is discussed in greater detail with respect to the flowchart of FIG. 10.

In step 504 the user creates a test sequence file for testing the unit under test. The test sequence file includes at least one sequence comprising a plurality of steps, wherein one or more of the steps are of the first step type. Steps of the first step type are also referred to as instances of the first step type. It is noted that the test sequence file may include a plurality of steps (instances) of the first step type, wherein each of the plurality of steps of the first step type have the common data and the common functionality defined by the first step type. The test sequence file may also have instances of other step types, as desired.

In step 506 the test sequence file is executed to test the unit under test. Execution of the test sequence file includes executing each of the plurality of steps in the at least one sequence. When steps of the first step type are executed, execution includes executing the common functionality for the one or more of the steps which are of the first step type and also includes utilizing the common data for the one or more of the steps which are of the first step type. More specifically, for a step of the first step type, i.e., an instance of the first step type, execution of the step includes:

executing the pre-step functionality;
executing a code module referenced by the step after executing the pre-step functionality; and
executing the post-step functionality after executing the code module.

FIG. 10 is a flowchart illustrating more detail regarding configuration of a step type in step 502 of FIG. 9. As shown, in step 512 the user configures common functionality for steps of the first step type, including pre-step functionality and/or post-step functionality, as well as a common editing interface. The common functionality is preferably specified by the user as one or more sub-steps that call code modules written in one or more of a plurality of programming languages. Thus, the user configures the common functionality of a step type by creating steps, sub-steps of the step type, which call code modules. The code modules can be written in any programming language supported within the test executive system.

In step 514 the user defines common data for steps of the first type. The common data includes one or more properties organized in a user-defined hierarchy. The common data also preferably includes default values for the user-defined properties. The common data of the first step type preferably defines first data which is not replicated in instances of the first step type. The common data of the first step type may also define second data which is replicated in instances of the first step type. In this latter case, the first step type defines default values of the second data.

In step 516 the user creates one or more code templates, wherein the code templates are useable in creating a code module called by instances of the first step type. The code template(s) preferably embody functionality which is presumed to be common for code modules called by steps of the respective step type.

Using Step Types in the Preferred Embodiment

Step types are preferably used by inserting steps in the Main, Setup, and Cleanup tabs of an individual sequence view in the Sequence File window. The Insert Step item in the context menu displays a submenu that shows all the step types that are in the Type Palette window or the current sequence file. This includes step types that come with TestStand and custom step types the user creates.

Figure 11:
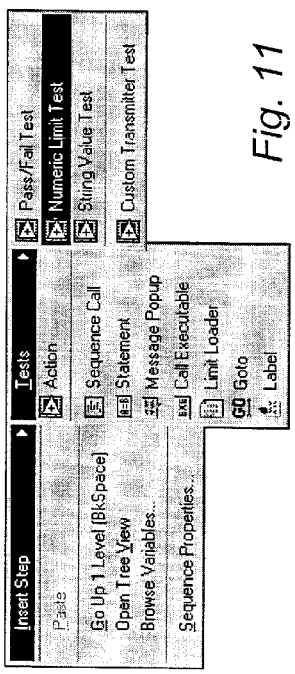
FIG. 11 illustrates the submenu for the Insert Step item.

FIG. 11 shows the submenu for the Insert Step item. The submenu includes one custom step type, Custom Transmitter Test. An icon appears to the left of each step type in the submenu. When the user selects a step type, TestStand displays the same icon next to the name of the new step in the list view. Many step types, such as the Pass/Fail Test and Action step types, can work with any module adapter. For these step types, the icon that appears in the submenu is the same as the icon for the module adapter that the user selects in the ring control on the tool bar. In FIG. 11, the LabVIEW Standard Prototype Adapter is the current adapter, and its icon appears next to several step types, including Pass/Fail Test and Action. If the user selects one of these step types, TestStand uses the LabVIEW Standard Prototype Adapter for the new step.

Some step types require a particular module adapter and always use the icon for that adapter. For example, the Sequence Call step type always uses the Sequence Adapter icon. Other step types, such as Statement and Goto, do not use module adapters and have their own icons.

When the user selects an entry in the submenu, TestStand creates a step using the step type and module adapter that the submenu entry indicates. After the user inserts the step, the Specify Module item in the context menu is used for the step to specify the code module or sequence, if any, that the step calls. The Specify Module command displays a dialog box that is different for each adapter. Generically, the dialog box is called the Specify Module dialog box. The following table titled "Adapter Dialog Box Names" shows the dialog boxes for each adapter.

| Table: Adapter Dialog Box Names | |
|---|---|
| Adapter | Dialog Box Title |
| DLL flexible Prototype Adapter | Edit DLL Call |
| LabVIEW Standard Prototype Adapter | Edit LabVIEW VI Call |
| C/CVI Standard Prototype Adapter | Edit C/CVI Module Call |
| Sequence Adapter | Edit Sequence Call |
| ActiveX Automation Adapter | Edit Automation Call |

For each step type, another item can appear in the context menu (not shown) above Specify Module. For example, the Edit Limits item appears in the context menu for Numeric Limit Test steps, and the Edit Pass/Fail Source item appears in the context menu for Pass/Fail Test steps. The menu item displays a dialog box in which the user modifies step properties that are specific to the step type. This dialog box is called the step-type-specific dialog box. The section below titled "Built-In Step Types" includes information on the menu item for each of the built-in step types.

To modify step properties that are common to all step types, the user uses the Properties command in the context menu, double-clicks on the step, or presses <Enter> with the step selected. The Step Properties dialog box contains command buttons to open the Specify Module dialog box and the step-type-specific dialog box.

Creating and Modifying Custom Step Types

If the user wants to change or enhance a TestStand built-in step type, the user preferably does not edit the built-in step type or any of its supporting source code modules. Instead, the user copies and renames a built-in step type and its supporting modules, and makes the changes to the new files. This ensures that the user's customizations are not lost when the user installs future versions of TestStand. It also makes it easier for the user to distribute customizations to other users.

The Step Types tab in the Type Palette window shows all the built-in step types. The Step Types tab in the Sequence File Types view of the Sequence File window shows only the step types that the steps in the sequence file use.

Figure 12:
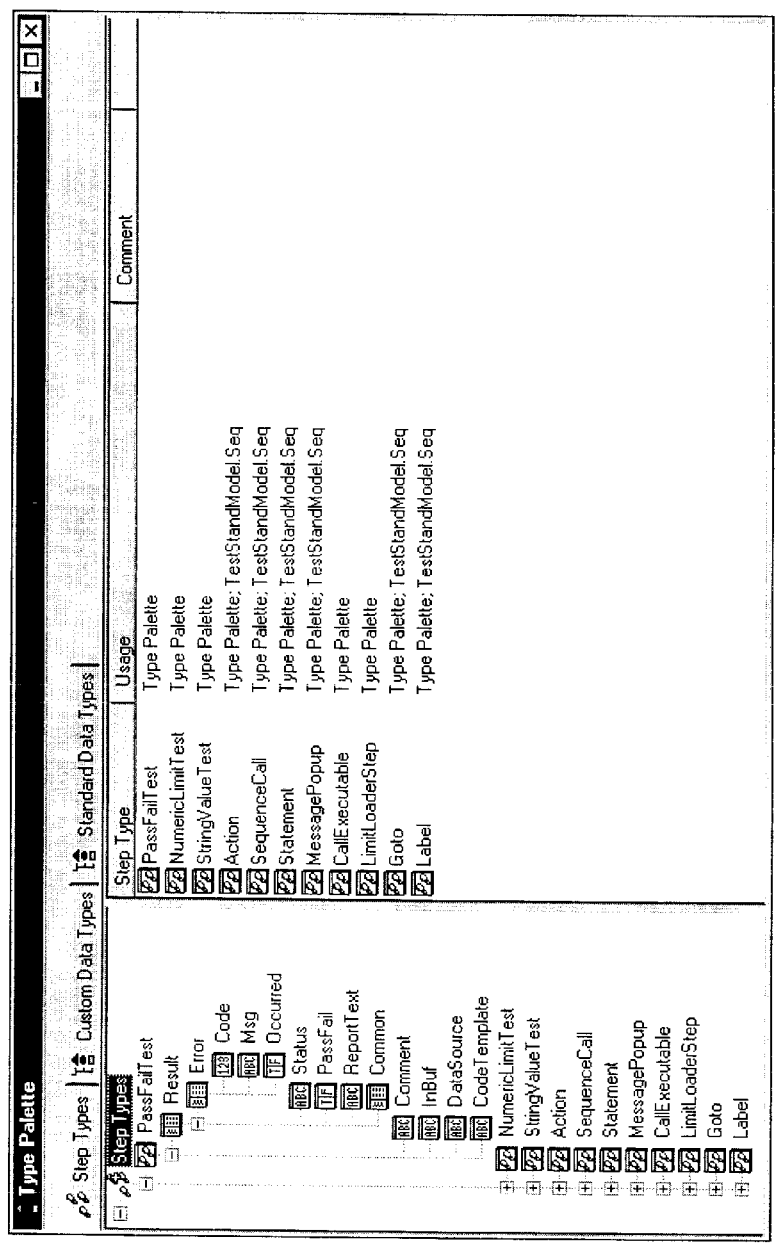
FIG. 12 illustrates the Step Types tab of the Type Palette window.

FIG. 12 shows the Step Types tab of the Type Palette window. The user can insert a new step type by right-clicking on the background of the list view and selecting Insert Step Type item from the context menu. The user can copy an existing step type by selecting the Copy and Paste items from the context menu of the step type.

Custom Step Type Properties

The user can define any number of custom properties in a step type. Each step the user creates with the step type has the custom properties the user defines.

The user can open the nodes in the tree view of the Step Types tab to show all step types and their custom properties. The user can display the custom properties of a step type in the list view by selecting the node for the step type in the tree view. The user can display the sub-properties of a custom property in the list view by selecting the node for the custom property in the tree view. From the list view, the user can display the contents of a step type or property by selecting the View Contents item from the context menu for the step type or property. To display the contents of the next highest level, the user presses <Backspace> in either the tree view or the list view, or selects the Go Up 1 Level item from the context menu in the list view background.

Figure 13:
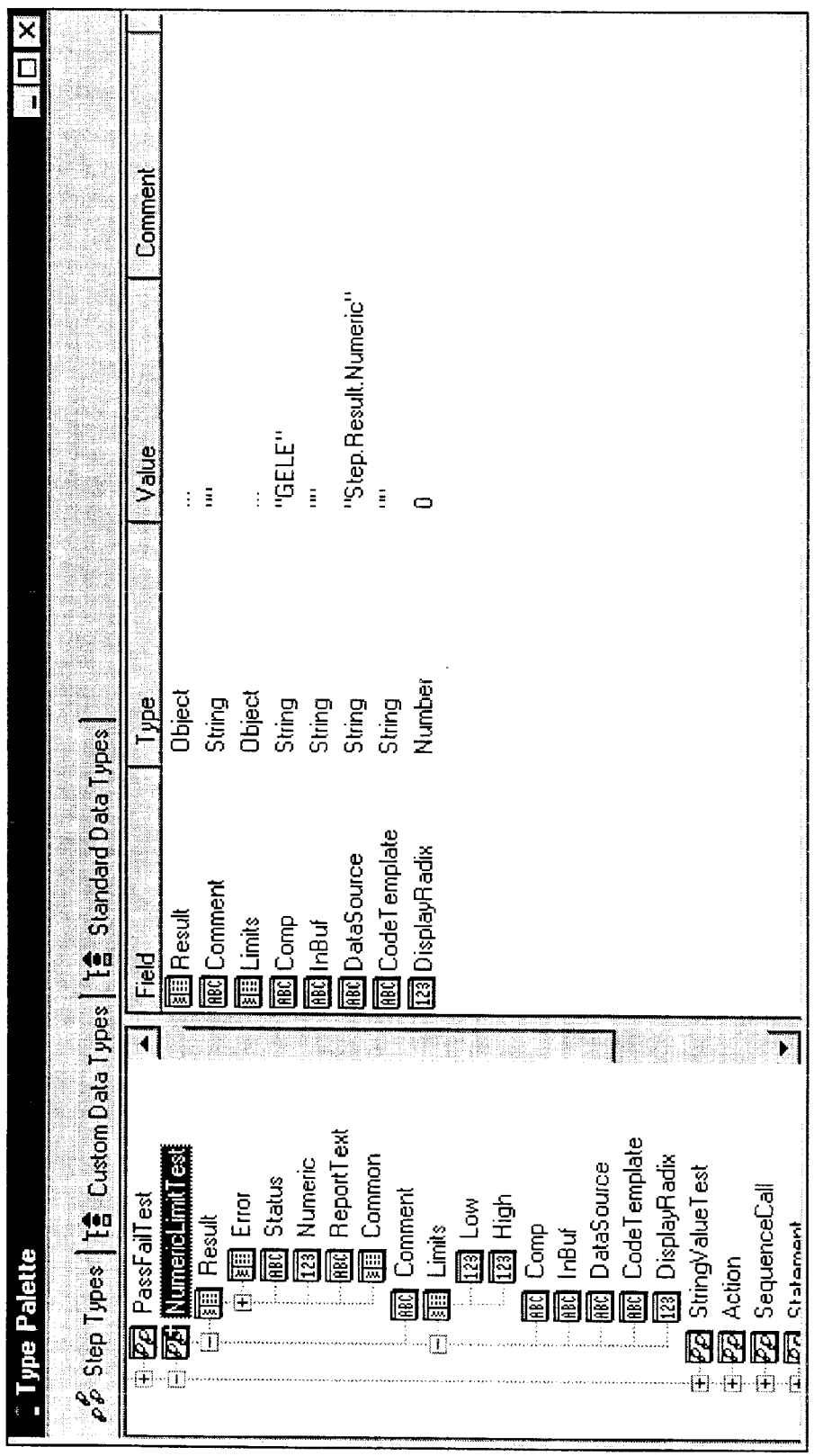
FIG. 13 illustrates the custom properties for the Numeric Limits step type.

FIG. 13 shows the custom properties for the Numeric Limits step. The user can add custom properties to a step type in the same way the user adds fields to a data type.

Built-In Step Type Properties

TestStand defines many properties that are common to all step types. These are called the built-in step type properties. Some built-in step type properties exist only in the step type itself. These are called class step type properties. TestStand uses the class properties to define how the step type works for all step instances. Step instances do not contain their own copies of the class properties.

Other built-in step type properties exist in each step instance. These are called instance step type properties. Each step the user creates with the step type has its own copy of the instance properties. TestStand uses the value the user specifies for an instance property in the step type as the initial value of the property in each new step the user creates.

Normally, after the user creates a step, the user can change the values of its instance properties. Nevertheless, when the user creates a custom step type, the user can prevent users from changing the values of specific instance properties in the steps they create. For example, the user might use the Edit substep of a step type to set the Status Expression for the step. In that case, the user does not want the user to change the Status Expression value. TestStand uses this capability in some of the built-in step types, such as Numeric Limit Test and String Value Test.

The user can examine and modify the values of the built-in properties by selecting the Properties item from the context menu for a step type in the list view. The Step Type Properties dialog box contains the following tabs:

General
Menu
Substeps
Default Run Options
Default Post Actions
Default Loop Options
Default Expressions
Disable Properties
Code Templates The Default Run Options, Default Post Actions, Default Loop Options, and Default Expressions tabs display instance properties. These four tabs have the same appearance as the Run Options, Post Actions, Loop Options, and Expressions tabs of the Step Properties dialog box for a step instance.

Most of the properties in the other five tabs are class properties. This section discusses each of these five tabs in detail.

General Tab

The General tab is used to specify a name, description, and comment for the step type. The user also can specify an icon and a module adapter.

Figure 14:
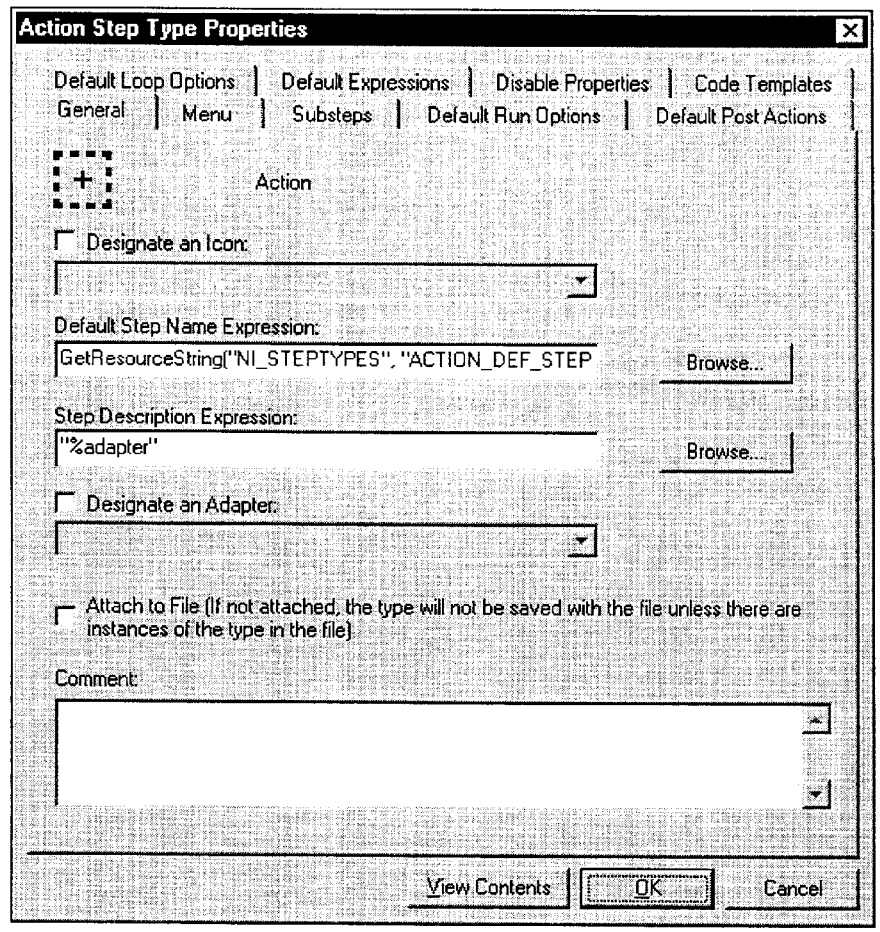
FIG. 14 illustrates the General tab of the Step Type Properties dialog box for the Action step type.

FIG. 14 shows the General tab of the Step Type Properties dialog box for the Action step type. The General tab of the Step Type properties dialog box contains the following controls:

Designate an Icon—Use this control to specify an icon for the step type. If the user enables the checkbox, the user can select from a list of icons that are in the TestStand/ Components/NI/Icons and TestStand/Components/User/ Icons directories. TestStand displays the icon next to the step names for all steps that use the step type. If the user disables the checkbox, TestStand displays the icon of the module adapter for each step. If the user can use any module adapter with the step type, it is best to disable the checkbox.

Default Step Name Expression—Use this control to specify a string expression that TestStand evaluates when the user creates a new step with the step type. TestStand uses the value of the expression as the name of the new step. If a step with the same name already exists in the sequence, TestStand appends $_{13}$ n to the name to make it unique. If the user wants to store the name in a string resource file, the user can use the GetResourceString expression function to retrieve the name from the file. Storing the name in a string resource file is useful if the user wants to display the name in different languages.

Step Description Expression—Use this control to specify a string expression that TestStand evaluates whenever it displays the Description field for a step. TestStand uses the value of the expression as the contents of the Description field for the step. If the user includes the %adapter macro in a string that the user surrounds with double quotes, TestStand replaces the %adapter macro with text that the module adapter provides to describe the code module that the step uses.

Designate an Adapter—Use this control to specify a single module adapter for the step type. If the user enables the checkbox, all steps the user creates with the step type use the module adapter the user designates, regardless of the module adapter the user selects in the sequence editor toolbar.

The user can choose from a list of all the TestStand module adapters. If the step type does not require a module adapter, select <None> from the adapter list. When the user designates a module adapter, a Specify Module button appears. Click on the Specify Module button if the user wants to specify the module call for all steps that the user creates with the step type.

If the user wants to prevent the sequence developer from modifying the call, he/she enables the Specify Module checkbox in the Disable Properties tab.

Attach to File—Use this control if the user wants TestStand to save the step type in the file regardless of whether the file contains any steps that use the step type. When the user creates a new step type or copy an existing step type from another window, TestStand automatically enables the Attach to File option for the user.

Disable the Attach to File checkbox if the user wants TestStand to save the step type only if the file contains a step that uses it. When the user copies a step that uses the step type into the sequence file and the sequence file does not already contain the step type, TestStand automatically disables the Attach to File option for the user. If the user later delete the step, TestStand also deletes the step type for the user.

Comment—Use this textbox to specify text that appears in the Comment field for the step type in the list view. TestStand copies the comment into each step the user creates with the step type. The user can change the comment for each step after the user creates it.

Menu Tab

Figure 15:
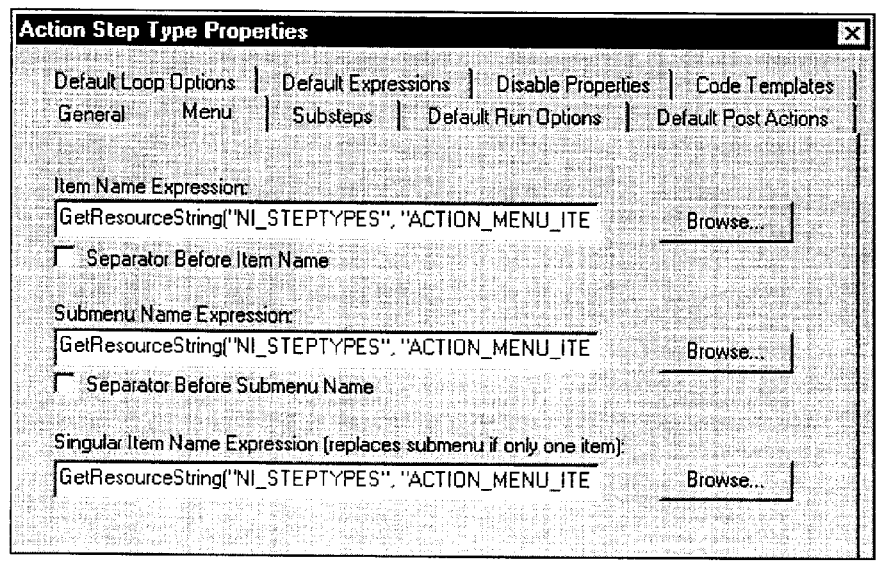
FIG. 15 illustrates the Menu tab of the Step Type Properties dialog box for the Action step type.

FIG. 15 shows the Menu tab of the Step Type Properties dialog box for the Action step type. The Menu tab is used to specify how the step type appears in the Insert Step submenu. The Insert Step submenu is in the context menu of individual sequence views in the Sequence File window. The user can specify that the step.type appears at the top-level of the Insert Step submenu or in a submenu the user nests within the Insert Step submenu.

The General tab of the Step Type properties dialog box contains the following controls:

Item Name Expression—This control is used to specify an expression for the step type name that appears in the Insert Step submenu or in a nested submenu. If the user wants a separator to appear in the submenu before the name, enable the Separator Before Item Name checkbox.

Submenu Name Expression—The user uses this control to nest the step type in a submenu within the Insert Step submenu. If the user leaves this control empty or specify an empty string, the step type name appears at the top level of the Insert Step submenu. If the user enters a nonempty expression for the submenu name, the submenu name appears at the top level of the Insert Step submenu, and the step type name appears in the nested submenu.

If the user wants a separator to appear above the submenu name, enable the Separator Before Submenu Name checkbox. TestStand inserts a separator above the submenu name if the user enables the option for at least one step type that uses the submenu name. When the user changes the value of the Separator Before Submenu Name checkbox, TestStand makes the same change in all step types that are currently in memory and use the same submenu name expression.

Singular Item Name Expression—Use this control if the user wants the step type to appear at the top level of the Insert Step submenu when it is the only step type that has the submenu name the user specifies. Specify the step type name that the user wants to appear in the top level. For example, the user might have a Telecom Tests submenu that contains Bit Error Rate Test, Transmitter Test, and Amplifier Test items. If the Amplifier Test is the only step type that is currently in memory, the user could specify that the Telecom Amplifier Test item appears in the top level of the Insert Step submenu.

Remember that if the user specifies a literal string in one of the Expression controls, the user must enclose it in double quotes. If the user wants to store a name in a string resource file, the user can use the GetResourceString expression function to retrieve the name from the file.

Substeps Tab

The user can use the Substeps tab to specify substeps for the step type. The user can use substeps to define standard actions, other than calling the step module, that TestStand performs for each step instance. The user implements a substep through a call to a code module. The code modules the user calls from substeps are called substep modules. The sequence developer cannot customize the substeps for a particular step. For each step that uses the step type, TestStand calls the same substep modules with the same arguments. The user can specify three substeps for a step type.

TestStand calls the Pre Step substep before calling the step module. The user might implement a Pre Step substep to retrieve and store measurement configuration parameters into custom step properties that the step module can access.

TestStand calls the Post Step substep after calling the step module. The user might implement a Post Step substep might to compare the values that the step module stores in custom step properties against limit values that the edit substep stores in other custom step properties.

The sequence developer can invoke the Edit substep by selecting a menu item that appears above the Specify Module item in the context menu for the step. Usually, the Edit substep displays a dialog box in which the sequence developer edits the values of custom step properties. For example, an Edit substep might display a dialog box in which the sequence developer specifies the high and low limits for a test. The Edit substep might then store the high- and low-limit values as step properties.

Figure 16:
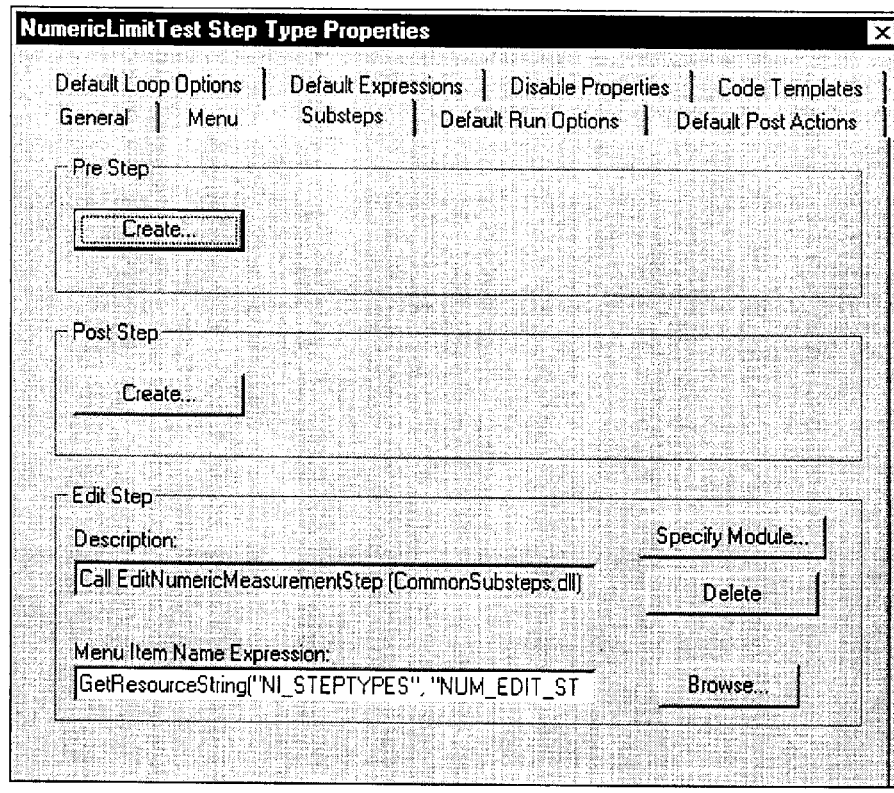
FIG. 16 illustrates the Substeps tab of the Step Type Properties dialog box for the Numeric Limit Test step type.

FIG. 16 shows the Substeps tab of the Step Type Properties dialog box for the Numeric Limit Test step type. The Substeps tab contains a separate section for each substep. If a substep currently has no code module, its section contains only a Create button. If the user clicks on the Create button, a dialog box appears in which the user selects the module adapter the user wants to use for the substep. The user does not have to use the same module adapter that is used for the step module.

After the user selects the module adapter, a Description string indicator, a Specify Module button, and a Delete button appear. The Specify Module button is used to specify the code module to call and the parameter values to pass.

The Description string indicator displays information about the code module for the substep. The Delete button disassociates the code module from the substep.

The section for an Edit substep also contains a Menu Item Name Expression control. The control is used to specify an expression for the item name that appears above the Specify Module item in the context menu for steps the user creates with the step type. The name also appears on a button on the Step Properties dialog box. If the user specifies a literal string for the menu item name, the user must enclose it in double quotes. If the user wants to store the name in a string resource file, the user can use the ResStr or GetResourceString expression functions to retrieve the name from the file.

C or C++ source code is available for each of the substep modules that the built-in step types use. The user can find the source code project files in the TestStand/Components/NI/StepTypes subdirectory. If the user wants to use these as starting points for the users own step types, copy the files into the TestStand/Components/User/StepTypes subdirectory. It is best to use different filenames for the copies.

Disable Properties Tab

The user can use the Disable Properties tab to prevent the sequence developer from modifying the settings of built-in instance properties in individual steps. In this way, the user can make the settings the user specifies in the Step Type Properties dialog box permanent for all step instances.

The tab contains a list of checkboxes. Each checkbox represents one built-in instance property or a group of built-in instance properties. When the user enables the checkbox, the user prevents the sequence developer from modifying the value of the corresponding property or group of properties.

Figure 17:
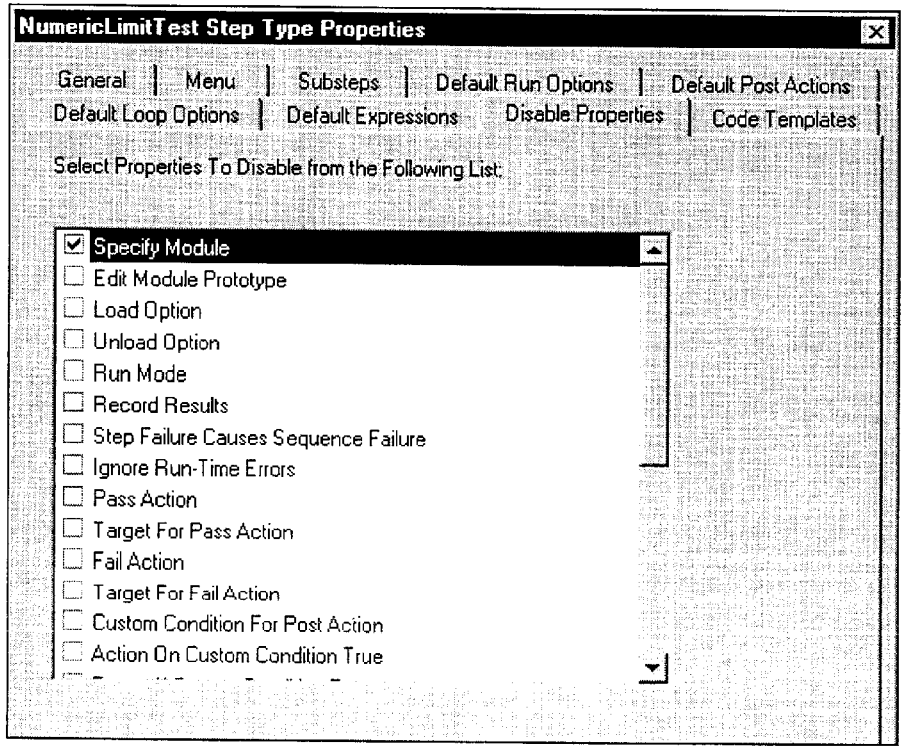
FIG. 17 illustrates the Disable Properties tab of the Step Type Properties dialog box for the Numeric Limit Test step type.

FIG. 17 shows the Disable Properties tab of the Step Type Properties dialog box for the Numeric Limit Test step type. Most of the checkboxes in the Disable Properties tab apply to a specific control in the Step Properties dialog box. The two exceptions are the Specify Module checkbox and the Preconditions checkbox.

Specify Module—If the user checks this checkbox, the sequence developer cannot display the Specify Module dialog box on any steps that-use the step type. Check the Specify Module checkbox for step types that always make the same module call.

If the user unchecks the Specify Module checkbox but check the Edit Module Prototype checkbox, the sequence developer can display the Specify Module dialog box but cannot modify any of the parameter information in it.

Precondition—If the user checks this checkbox, the sequence developer cannot create preconditions for steps that use the step type.

Code Templates Tab

The Code Template tab is used to associate one or more code templates with the step type. A code template,is a set of source files that contain skeleton code. The skeleton code serves as a starting point for the development of code modules for steps that use the step type. TestStand uses the code template when the sequence developer clicks on the Create Code button on the Source Code tab in the Specify Module dialog box for a step.

TestStand comes with a default code template that the user can use for any step type. The user can customize code templates for individual step types. For the Numeric Limit Test step type, for instance, the user might want to include example code to access the high- and low-limit properties in the step.

Templates Files for Different Adapters

Because different module adapters require different types of code modules, a code template normally consists of one or more source files for each module adapter. For the default code template, for example, TestStand comes with one .c file for the DLL Flexible Prototype Adapter, one .c file for the C/CVI Standard Prototype Adapter, and eight .vi files for the LabVIEW Standard Prototype Adapter. The multiple .vi files correspond to the different combinations of parameter options that the sequence developer can choose in the Edit LabVIEW VI Call dialog box.

TestStand uses the code template name as the name of a subdirectory in the TestStand/CodeTemplates/NI or TestStand/CodeTemplates/User directory. TestStand stores the source files for the different module adapters in the subdirectory. TestStand also stores a .ini file in each subdirectory. The .ini file contains a description string that TestStand displays for the code template. The subdirectory name for the default code template is Default_Template.

Code templates for the C/CVI Standard Prototype Adapter always specify two parameters: a pointer to tTestData structure and a pointer to a tTestError structure. When TestStand uses a C/CVI template module to create skeleton code, it validates the function prototype in the template module against this requirement. TestStand reports an error if the prototype is incorrect.

Code templates for the LabVIEW Standard Prototype Adapter always specify Test Data and error out clusters as parameters. The eight different .vi files for each LabVIEW Standard Prototype Adapter code template specify various combinations of the Input buffer, Invocation Information, and Sequence Context parameters. When TestStand uses a LabVIEW template VI to create skeleton code, it choose the correct .vi file to use based on the current settings in the Optional Parameters section of the Edit LabVIEW VI Call dialog box.

Code templates for the DLL Flexible Prototype Adapter can have any number of parameters that are compatible with the data types the user can specify in the Module tab of the Edit DLL Call dialog box.

When TestStand uses a DLL code template source file to create skeleton code, it compares the parameter list in the source file against the parameter information in the Module tab. If they do not agree, TestStand prompts the sequence developer to select which prototype to use for the skeleton code. If the sequence developer chooses to use the prototype from the template source file, the developer also can request that TestStand update the Module tab to match the source file. The template source file does not contain sufficient information for TestStand to update the Value controls for the parameters in the Module tab.

The user can specify entries for TestStand to put in the Value controls. TestStand stores this information in the .ini file in the template subdirectory.

Creating and Customizing Template Files

The user can create a new code template in the Code Templates tab. TestStand prompts the user to specify a subdirectory name and an existing code template as a starting point. TestStand copies the files for the existing template into the new subdirectory under the TestStand/CodeTemplates/User directory and changes the names. The user must then modify the template files to customize them. If the user does not intend to use a particular adapter, the user can delete the template files for it.

The user can customize the template files to include example code that helps the test developer learn how to access the important custom properties of the step. The method used to customize the source files for a code template can vary based on the module adapter. For example, to show how to obtain the high- and low-limit properties in a LabVIEW or CVI template for a Numeric Limit Test step, the user might include example calls to the GetValNumber method of the Property Class in the TestStand ActiveX API. Although the user can use the GetValNumber method in the template for the DLL Flexible Prototype Adapter too, the user might customize the prototype for the code module by specifying the high and low limits as value parameters.

As another example, the user might want to show how to return a measurement value from a code module. In a LabVIEW template, the user might show how to refer to the Numeric Measurement element of the Test Data cluster. In a CVI code module, the user might show how to refer to the measurement field in the tTestData structure. For the DLL Flexible Prototype Adapter, the user might customize the prototype in the template by specifying the measurement as a reference parameter.

Multiple Templates Per Step Type

The user can specify more than one code template for a step type. For example, the user might want to have code templates that contain example code for conducting the same type of tests with different types of instruments or data acquisition boards. If a step type has multiple code templates and the sequence developer clicks on the Create Code button in the Specify Module dialog box, TestStand prompts the sequence developer to choose from a list of templates.

Using the Code Templates Tab

Figure 18:
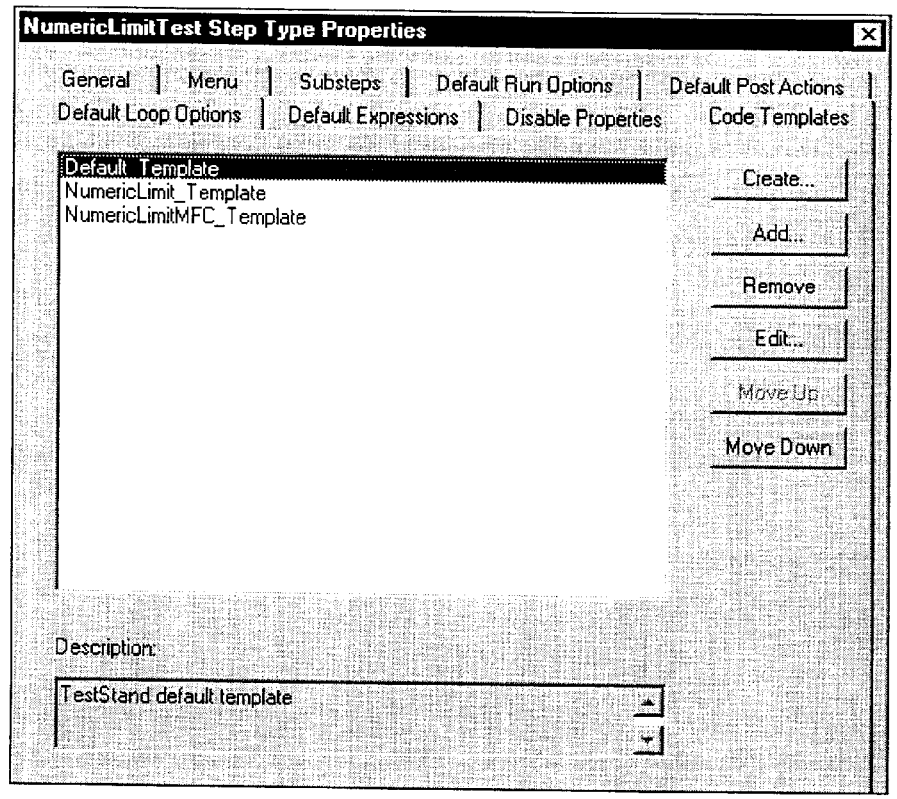
FIG. 18 illustrates the Code Templates tab of the Step Type Properties dialog box for the Numeric Limit Test step type.

FIG. 18 shows the Code Templates tab of the Step Type Properties dialog box for the Numeric Limit Test step type. The list box shows the code templates that are currently associated with the step type. The Description indicator displays the description string for the currently selected code template. The following command buttons appear to the right of the list box.

Create—Use this button to create a new code template. When the user clicks on the Create button, the Create Code Templates dialog box appears.

Figure 19:
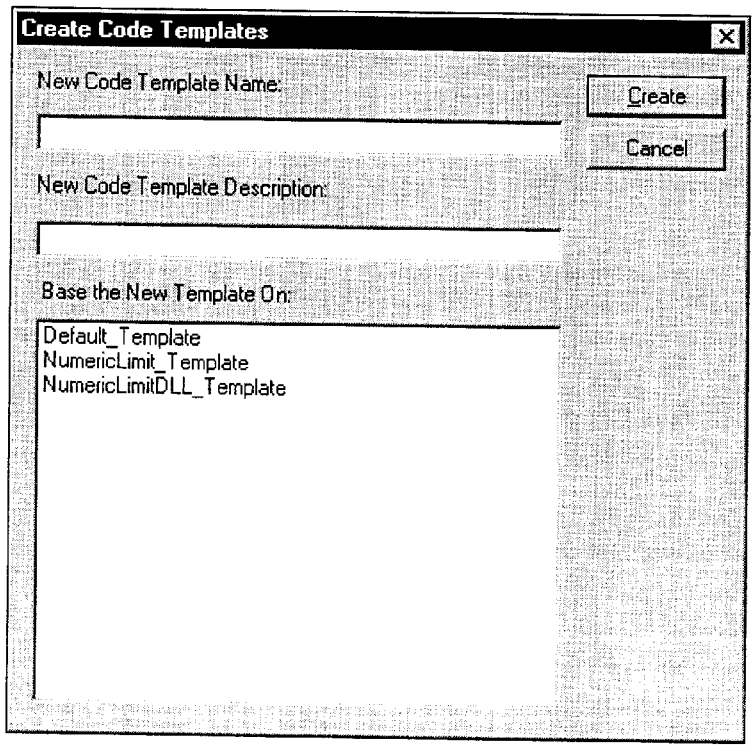
FIG. 19 illustrates the Create Code Templates dialog box.

FIG. 19 shows the Create Code Templates dialog box. The user specifies the subdirectory name for the code template in the New Code Template Name control. Specify a brief description for the code template in the New Code Template Description control. Use the Base the New Template On list box to choose an existing code template for TestStand to copy.

Add—Use this button to associate an existing code template with the step type. When the user clicks on the Add button, a dialog box appears in which the user can select from a list of code templates. TestStand generates the list from the set of subdirectories in the TestStand/CodeTemplates/NI and TestStand/CodeTemplates/User directories. If the user specifies a code template that is not in the list, the code template subdirectory must be in the TestStand search directory paths. The user can customize the TestStand search directory paths with the Search Directories command in the Configure menu of the sequence editor menu bar.

Remove—Use this button to disassociate the currently selected code template from the step type.

Edit—Use this button to modify properties of the currently selected code template. When the user clicks on the Create button, the Create Code Template dialog box appears.

Move Up and Move Down—Use these buttons to reorder the code template list. The order of the code templates in the list box is the order that TestStand uses when displaying the code templates in the Choose Code Template dialog box.

Figure 20:
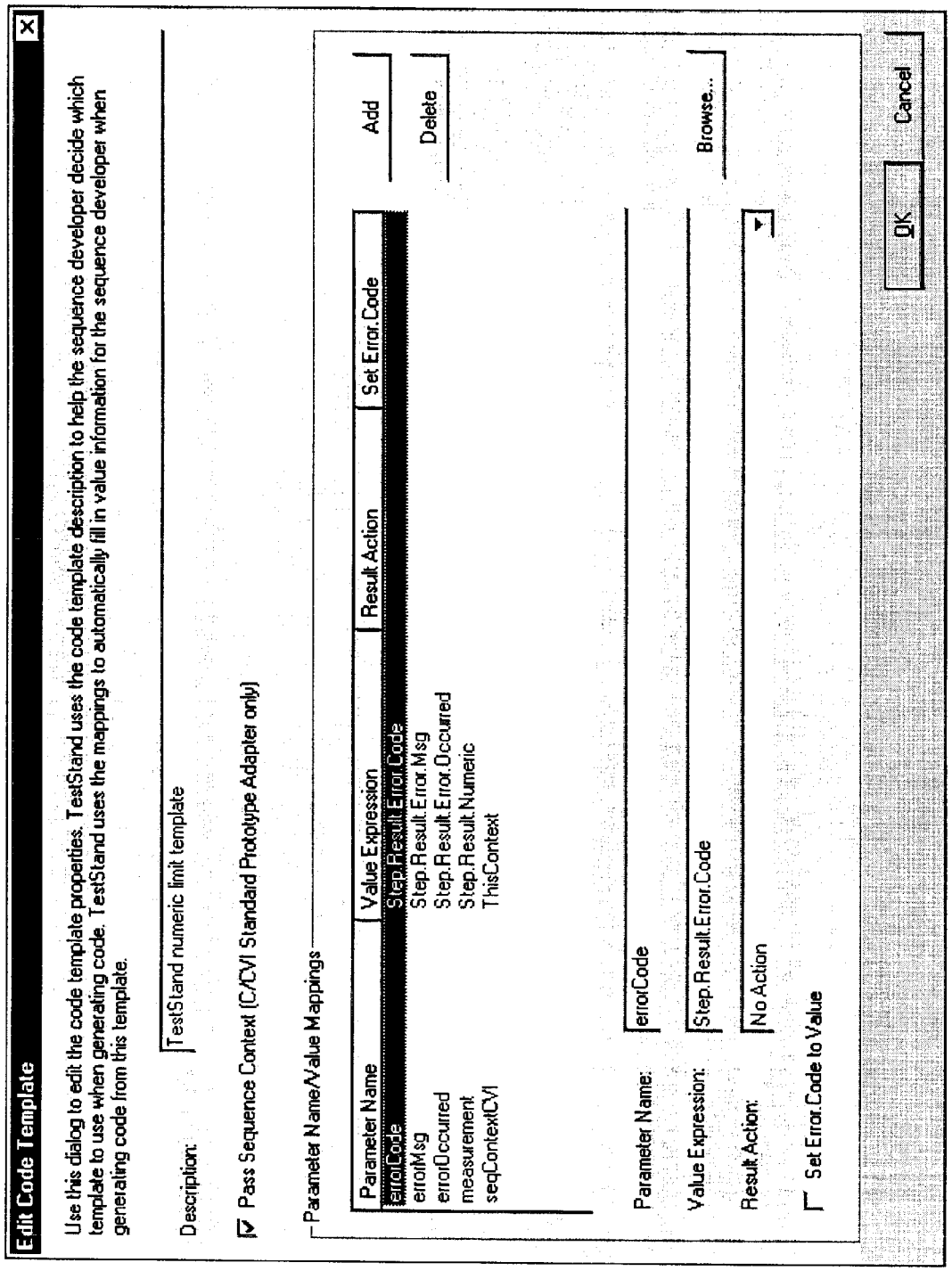
FIG. 20 illustrates the Edit Code Template dialog box.

FIG. 20 shows the Edit Code Template dialog box. The Edit Code Template dialog box contains the following controls:

Description—Use this control to modify the description string.

Pass Sequence Context—Use this control to specify a default value for the Pass Sequence Context checkbox in the Module tab of the Specify Module box for the C/CVI Standard Prototype Adapter. TestStand applies this default value when the sequence developer clicks on the Create Code button.

Parameter Name/Value Mappings—Use this section to specify default parameter values to use in the Module tab of the Specify Module dialog box for the DLL Flexible Prototype Adapter. TestStand applies the default parameter values when the sequence developer clicks on the Create Code button on the Source Code tab.

In a template code module for the DLL Flexible Prototype Adapter, the user can access step properties and sequence variables through the TestStand ActiveX API or as parameters to the code module. If the user accesses them as parameters, the sequence developer must specify the parameter values in the Module tab. The values that the sequence developer must specify are usually the same for most step instances. The user can specify default parameter values that TestStand inserts in the Module tab automatically when the sequence developer clicks on the Create Code button.

The following controls are available in the Parameter Name/Value Mappings section:

Add—This button inserts an empty entry at the end of the list box.

Delete—This button deletes the currently selected entry in the list box.

Parameter Name—Enter the name of a parameter exactly as it appears in the parameter list in the template code module. To specify the return value, use %ReturnValue.

Value Expression—Enter the expression the user wants TestStand to insert into the Value control for the parameter in the Module tab of the Specify Module dialog box.

Result Action—Select the value the user wants to appear in the Result Action ring control of the Module tab. The sequence developer uses the ring on the Module tab to cause TestStand to set the Error.Occurred step property to True automatically when the return value or parameter value after the call is greater than zero, less than zero, equal to zero, or not equal to zero.

Set Error.Code to Value—Enable this checkbox if the user wants TestStand to enable the Set Error.Code to Value checkbox for the parameter on the Module tab of the Specify Module dialog box. This checkbox appears on the Module tab for return values and reference parameters. The sequence developer can use the checkbox on the Module tab to cause TestStand to assign the return value or output value to the Error.Code step property automatically.

View Contents Button

The user can use the View Contents button on the Step Type Properties dialog box to dismiss the dialog box and show the custom properties of the step type in the list view. If the user has made changes in the Step Type Properties dialog box, another dialog box appears giving the user the chance to save the changes.

Type Palette Window

The Type Palette window is used to store the data types and step types that the user wants to be available to the user in the sequence editor at all times. When the user creates a new type in the Sequence File Types view of a Sequence File window, the type does not appear in the Insert Local, Insert Global, Insert Parameter, Insert Field, and Insert Step submenus in other Sequence File windows.

To use the type in other sequence files, the user can manually copy or drag the new type from one Sequence File window to another. A better approach is to copy or drag the new type to the Type Palette window or to create it there in the first place. Each type in the Type Palette window appears in the appropriate Insert submenus in all windows.

When the user saves the contents of the Types Palette window, TestStand writes the definitions of the types to the TypePalette.ini file in the TestStand/cfg directory.

The Type Palette window contains tabs for step types, custom data types, and standard data types. After the user installs TestStand, the Step Types tab has all the built-in step types, the Custom Data Types tab is empty, and the Standard Data Types tab has the three standard data types.

Built-In Step Types

The following describes the predefined step types that TestStand includes. The built-in step types fall into three categories: step types that can call code modules using any module adapter, step types that work with a specific module adapter, and step types that do not use module adapters at all.

Common-Custom Properties

Each step type defines its own set of custom properties. All steps that use the same step type have the same set of custom properties.

Figure 21:
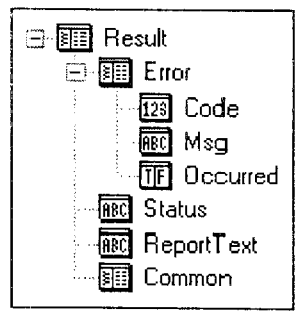
FIG. 21 illustrates the common custom step properties.

The built-in step types share some common custom properties. FIG. 21 shows the common custom step properties.

The common custom step properties are the following:

Step.Result.Error.Occurred is a Boolean flag that indicates whether a run-time error occurred in the step. This document refers to this property.as the error occurred flag.

Step.Result.Error.Code is a code that describes the error that occurred.

Step.Result.Error.Msg is a message string that describes the error that occurred.

Step.Result.Status specifies the status of the last execution of the step, such as Done, Passed, Failed, Skipped, or Error. This document refers to this property as the step status.

Step.Result.Common is a placeholder container that the user can customize. The user customizes it by modifying the CommonResults standard data type.

Step.Result.ReportText contains a message string that TestStand includes in the report. The user can set the value of the message string, directly in the code module. The C/CVI and LabVIEW module adapters allow code modules to set this property by modifying the corresponding member of the test data structure or cluster.

Step Status, Error Occurred Flag, and Run-Time Errors

A code module can report a run-time error condition by setting the error occurred flag to True. If an exception occurs in the code module or at any other time during step execution, the TestStand Engine sets the error occurred flag to True.

If the error occurred flag is True when a step finishes executing, TestStand does not evaluate the post and status expressions for the step. Instead TestStand sets the step status to Error. If the Ignore Run-time Errors step property is False, the TestStand Engine reports the run-time error to the sequence. If the Ignore Run-time Errors step property is True, execution continues normally after the step.

Before TestStand executes a step, it sets the step status to Running or Looping. If, after the step executes, the error occurred flag is False, and the step status is still Looping or Running, TestStand changes the step status to Done. The step status is Passed or Failed only after a code module, a module adapter, or a step type explicitly sets the step status to one of these two values.

Customizing Built-In Step Types

If the user wants to change or enhance a TestStand built-in step type, do not edit the built-in step type or any of its supporting source code modules. Instead, the user makes copies of the built-in step type and any supporting modules, and makes the changes to these copies. This ensures that the user does not lose changes when installing future versions of TestStand.

Source code is available for the code modules that the built-in step types use as substeps. The user can find the source code project files in the TestStand/Components/NI/StepTypes subdirectory. Make copies of these files in the TestStand/Components/User/StepTypes subdirectory and rename them.

Step Types That Can Be Used with Any Module Adapter

TestStand comes with four built-in step types that can be used with any module adapter: Action, Pass/Fail Test, Numeric Limit Test, and String Value Test. When the user inserts a step in a sequence, TestStand binds the step to the adapter that is currently selected in the ring on the sequence editor toolbar. The icon for the adapter appears as the icon for the step. The icons for the different adapters are as follows:

C/CVI Standard Prototype Adapter
LabVIEW Standard Prototype Adapter
DLL Flexible Prototype Adapter
Sequence Adapter
ActiveX Automation Adapter
<None>

If the user chooses <None> for adapter, the step does not call a code module.

The user specifies the code module that the step calls by selecting the Specify Module item from the step context menu or the Specify Module button on the Step Properties dialog box. Each module adapter displays a different Specify Module dialog box.

Action

Action steps are generally used to call code modules that do not perform tests but rather perform actions necessary for testing, such as initializing an instrument. By default, Action steps do not pass or fail. The step type does not modify the step status. Thus, the status for an Action step is Done or Error unless the user specifically sets the status in the code module for the step or the step calls a subsequence that fails. When an action uses the Sequence Adapter to call a subsequence and the subsequence fails, the sequence adapter sets the status of the step to Failed.

The Action step type does not define any additional step properties other than the custom properties that all steps contain.

Pass/Fail Test

A Pass/Fail Test step is generally used to call a code module that makes its own pass/fail determination.

After the code module executes, the Pass/Fail Test step type evaluates the Step.Result.PassFail property. If Step.Result.PassFail is True, the step type sets the step status to Passed. Otherwise, it sets the step status to Failed.

The following are the different ways that a code module can set the value of Step.Result.PassFail:

The user can set the value of Step.Result.PassFail directly in a code module by using the TestStand ActiveX API.

The user can pass Step.Result.PassFail as a reference parameter to a subsequence or code module if the Sequence Adapter, the DLL Flexible Prototype Adapter, or the ActiveX Automation Adapter are used.

The C/CVI and LabVIEW module adapters update the value of Step.Result.PassFail automatically after calling the code module. The C/CVI module adapter updates the value of Step.Result.PassFail based on the value of the result field of the tTestData parameter that it passes to the C function. The LabVIEW module adapter updates the value of Step.Result.PassFail based on the value of Pass/Fail Flag in the TestData cluster that it passes to the VI.

Figure 22:
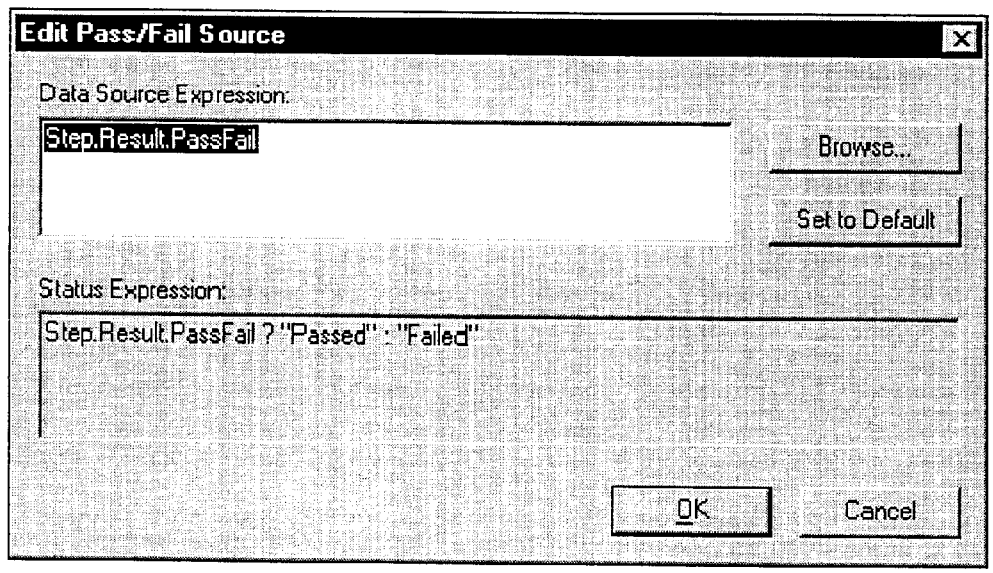
FIG. 22 illustrates the Edit Pass/Fail Source dialog box.

By default, the step type uses the value of the Step.Result.PassFail Boolean property to determine whether the step passes or fails. The user can customize the Boolean expression the step type uses by selecting the Edit Pass/Fail Source item in the context menu for the step or the Edit Pass/Fail Source button on the Step Properties dialog box. FIG. 22 shows the Edit Pass/Fail Source dialog box.

Figure 23:
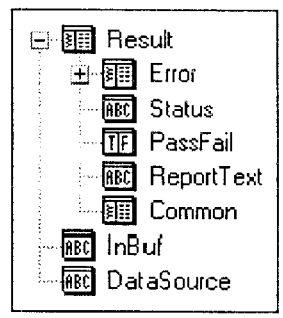
FIG. 23 illustrates the step properties for the Pass/Fail Test step type.

FIG. 23 shows the step properties for the Pass/Fail Test step type. The Pass/Fail Test step type defines the following step properties in addition to the common custom properties.

Step.Result.PassFail specifies the Boolean pass/fail flag. Pass is True, Fail is False. Usually, the user sets this value in the step module.

Step.InBuf specifies an arbitrary string that the C/CVI and LabVIEW module adapters pass to the test in the tTestData structure or TestData cluster automatically. This property exists to maintain compatibility with previous test executives. Usually, code modules the user develops for TestStand receive data as input parameters or access data as properties using the TestStand ActiveX API.

Step.DataSource specifies the Boolean expression that the step uses to set the value of Step.Result.PassFail. The default value of the expression is "Step.Result.PassFail", which has the effect of using the value that the code module sets. The user can customize this expression if the user does not want to set the value of Step.Result.PassFail in the code module. For example, the user can set the data source expression to refer to multiple variables and properties, such as, RunState.PreviousStep.Result.Numeric*Locals.Attenuation>12.

Numeric Limit Test

A Numeric Limit Test step is generally used to call a code module that returns a single measurement value. After the code module executes, the Numeric Limit Test step type compares the measurement value to predefined limits., If the measurement value is within the bounds of the limits, the step type sets the step status to Passed. Otherwise, it sets the step status to Failed.

The user can customize the type of comparison and limits that TestStand uses to set the step status. To do so, select the Edit Limits item from the step context menu or click on the Edit Limits button on the Step Properties dialog box.

Figure 24:
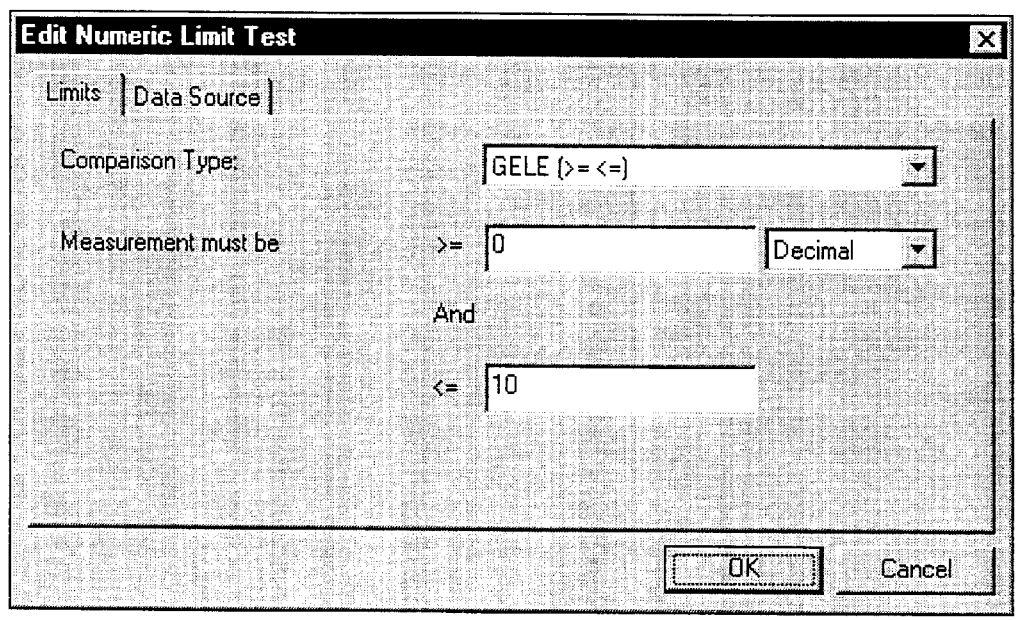
FIG. 24 illustrates the Limits tab on the Edit Numeric Limit Test dialog box.

FIG. 24 shows the Limits tab on the Edit Numeric Limit Test dialog box. The Comparison Type selection ring on the Limits tab specifies the type of comparison the step type performs, if any, to determine the step status. The Numeric Limit Test Comparison Types table lists the available comparison types.

Table: Numeric Limit Test Comparison Types

| Type | Description |
| --- | --- |
| EQ | Numeric Measurement = Low Limit |
| NE | Numeric Measurement != Low Limit |
| GT | Numeric Measurement > Low Limit |
| LT | Numeric Measurement < Low Limit |
| GE | Numeric Measurement >= Low Limit |
| LE | Numeric Measurement <= Low Limit |
| GTLT | Numeric Measurement > Low Limit and < High Limit |
| GE;E | Numeric Measurement >= Low Limit and High Limit |
| GELT | Numeric Measurement >= Low Limit and < High Limit |
| GTLE | Numeric Measurement > Low Limit and <= High Limit |
| No Comparison | TestStand makes no Pass/Fail determination, and sets the status to Passed automatically. |

Depending on the setting of the Comparison Type selection ring, the dialog box display additional controls in which the user enters high and low limits. The user can choose to display the limit values in decimal, hexadecimal, octal, or binary formats.

A Numeric Limit Test step always uses the Step.Result.Numeric property to store the measurement value. A code module can set the value of Step.Result.Numeric in the following ways:

The user can set the value of Step.Result.Numeric directly in a code module by using the TestStand ActiveX API.

The user can pass Step.Result.Numeric as a reference parameter to a subsequence if the Sequence Adapter, the DLL Flexible Prototype Adapter, or the ActiveX Automation Adapter.

The C/CVI and LabVIEW module adapters update the value of Step.Result.Numeric automatically after calling the code module. The C/CVI module adapter updates the value of Step.Result.Numeric based on the value of the measurement field of the tTestData parameter that it passes to the C function. The LabVIEW module adapter updates the value of Step.Result.Numeric based on the value of Numeric Measurement in the TestData cluster that it passes to the VI.

Figure 25:
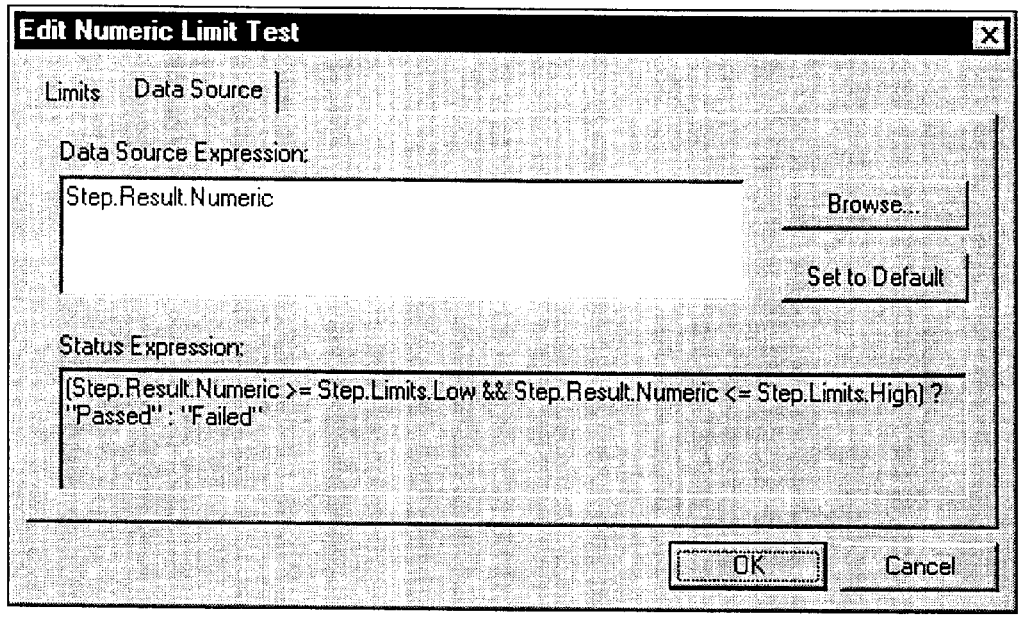
FIG. 25 illustrates the Data Source tab o f the Edit Numeric Limit Test dialog box.

By default, the step type uses the value of the Step.Result.Numeric property as the numeric measurement to compare the limits against. The user can customize the numeric expression by selecting the Data Source tab of the Edit Numeric Limit Test dialog box, as shown in FIG. 25.

Figure 26:
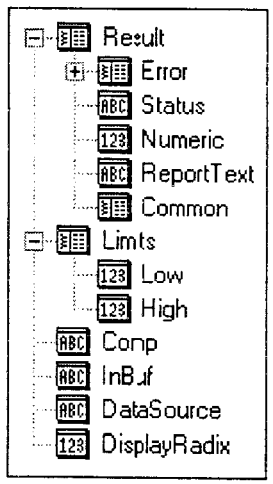
FIG. 26 illustrates the step properties for the Numeric Limit Test step type.

FIG. 26 shows the step properties for the Numeric Limit Test step type. The Numeric Limit Test step type defines the following step properties in addition to the common custom properties.

Step.Result.Numeric specifies the numeric measurement value. Usually, the user sets this value in the step module.

Step.Limits.High and Step.Limits.Low specify the limits for the comparison expression.

Step.Comp specifies the type of comparison, for example, EQ.

Step.InBuf specifies an arbitrary string that the C/CVI and LabVIEW module adapters pass to the test in the tTestData structure or TestData cluster automatically. This property exists to maintain compatibility with previous test executives. Usually, code modules that the user develops for TestStand receive data as input parameters or access data as properties using the TestStand ActiveX API.

Step.DataSource specifies a numeric expression that the step type uses to set value of Step.Result.Numeric. The default value of the expression is "Step.Result.Numeric", which has the effect of using the value that the code module sets. The user can customize this expression if the user does not want to set the value of Step.Result.Numeric in the code module.

Step.DisplayRadix specifies the display format for limit values.

A Numeric Limit Test can be used without a code module. This is useful if the user wants to limit-check a value that the user already has. To do this, select <None> as the module adapter before inserting the step in the sequence, and configure Step.DataSource to specify the value that the user already has.

String Value Test

A String Value Test step is usually used to call a code module that returns a string value. After the code module executes, the String Value Test step type compares the string that the step obtains to the string that the step expects to receive. If the string that the step obtains matches the string that it expects, the step type sets the step status to Passed. Otherwise, it sets the step status to Failed.

The user can customize the type of comparison that TestStand uses to set the step status. The user can also specify the string that the step expects to receive. To do so, select the Edit Expected String item in the context menu for the step or the Edit Expected String button in the Step Properties dialog box.

Figure 27:
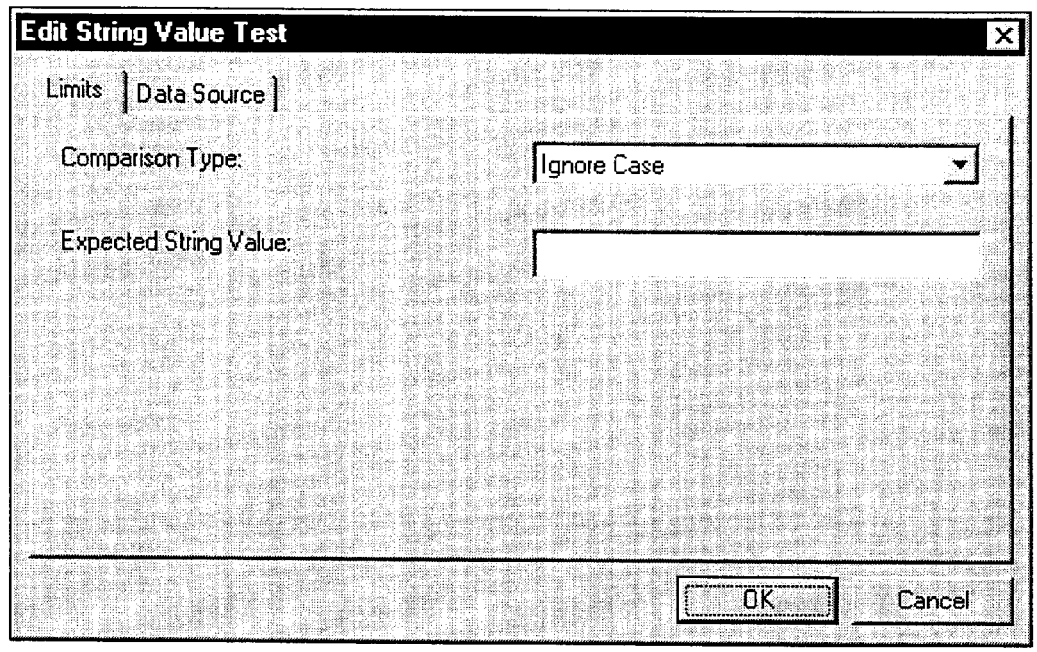
FIG. 27 illustrates the Limits tab on the Edit String Value Test dialog box.

FIG. 27 shows the Limits tab on the Edit String Value Test dialog box. On the Limits tab, the user can specify the expected string and whether the string comparison is case-sensitive.

A String Value Test step always uses the Step.Result.String property to store the string value. A code module can directly set the value of Step.Result.String in the following ways:

The user can set the value of Step.Result.String directly in a code module by using the TestStand ActiveX API.

The user can pass Step.Result.String as a reference parameter to a subsequence or code module if the Sequence Adapter, the DLL Flexible Prototype Adapter, or the ActiveX Automation Adapter are used.

A code module can directly modify the value Step.Result.String using the TestStand ActiveX API. The C/CVI and LabVIEW module adapters update the value of Step.Result.String automatically after calling the code module. The C/CVI module adapter updates the value of Step.Result.String based on the value of the stringMeasurement field of the tTestData parameter that it passes to the C function. The LabVIEW module adapter updates the value of Step.Result.String based on the value of String Measurement in the TestData cluster that it passes to the VI.

Figure 28:
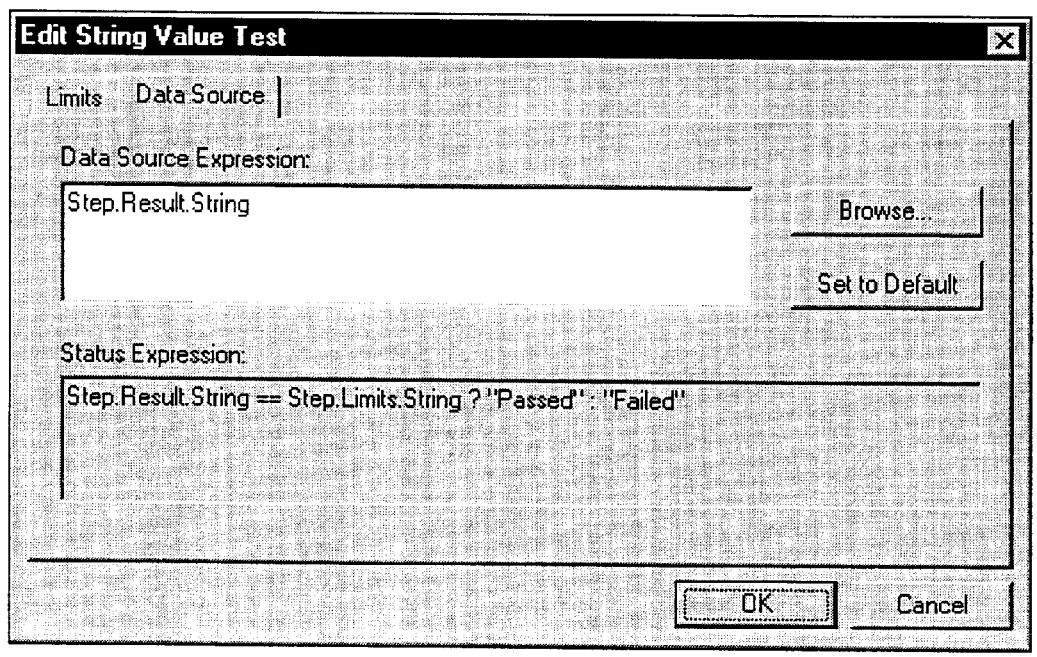
FIG. 28 illustrates the Data Source tab of the Edit String Value Test dialog box.

By default, the step type uses the value of the Step.Result.String property as the string value to compare the limits against. The user can customize the string expression by selecting the Data Source tab of the Edit String Value Test dialog box, as shown in FIG. 28.

The Data Source tab specifies a data source expression that TestStand evaluates to obtain the string it compares against the expected string.

Figure 29:
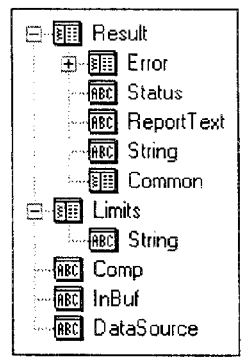
FIG. 29 illustrates the step properties for the String Value Test step type.

FIG. 29 shows the step properties for the String Value Test step type. The String Value Test step type defines the following step properties in addition to the common custom properties.

Step.Result.String specifies the string value. Usually, the user sets this value in the step module.

Step.Limits.String specifies the expected string for the string comparison.

Step.Comp specifies the type of comparison, such as Ignore Case.

Step.InBuf specifies an arbitrary string that the C/CVI and LabVIEW module adapters automatically pass to the test in the tTestData structure or TestData cluster. This property exists to maintain compatibility with previous test executives. Usually, code modules that the user develops for TestStand receive data as input parameters or access data as properties using the TestStand ActiveX API.

Step.DataSource specifies a string expression that the step type uses to set the value of Step.Result.String. The default value of the expression is Step.Result.String, which has the effect of using the value that the code module sets. The user can customize this expression if the user does not want to set the value of Step.Result.String in the code module.

A String Value Test step can be used without a code module. This is useful if the user wants to test a string that the user already has. To do this, the user selects <None> as the module adapter before inserting the step in the sequence, and the user configures Step.DataSource to specify the string he/she already has.

Step Types That Work With a Specific Module Adapter

This section describes step types that work with a specific module adapter.

Sequence Call

A Sequence Call step is used to call another sequence in the current sequence file or in another sequence file. A Sequence Call step always uses the Sequence Adapter.

The Sequence Adapter is used with other step types such as Pass/Fail Test or Numeric Limit Test. Using a Sequence Call step is the same as using an Action step with the Sequence Adapter, except that the step type sets the step status to Passed rather than Done when the subsequence succeeds. If the sequence fails, TestStand sets the step status to Failed. A subsequence fails when the status for a step in the subsequence is Failed and the Step Failure Causes Sequence Failure option for the step is enabled.

The user specifies the subsequence that the Sequence Call step executes by selecting the Specify Module item in the context menu for the step or clicking on the Specify Module button on the Step Properties dialog box.

Figure 30:
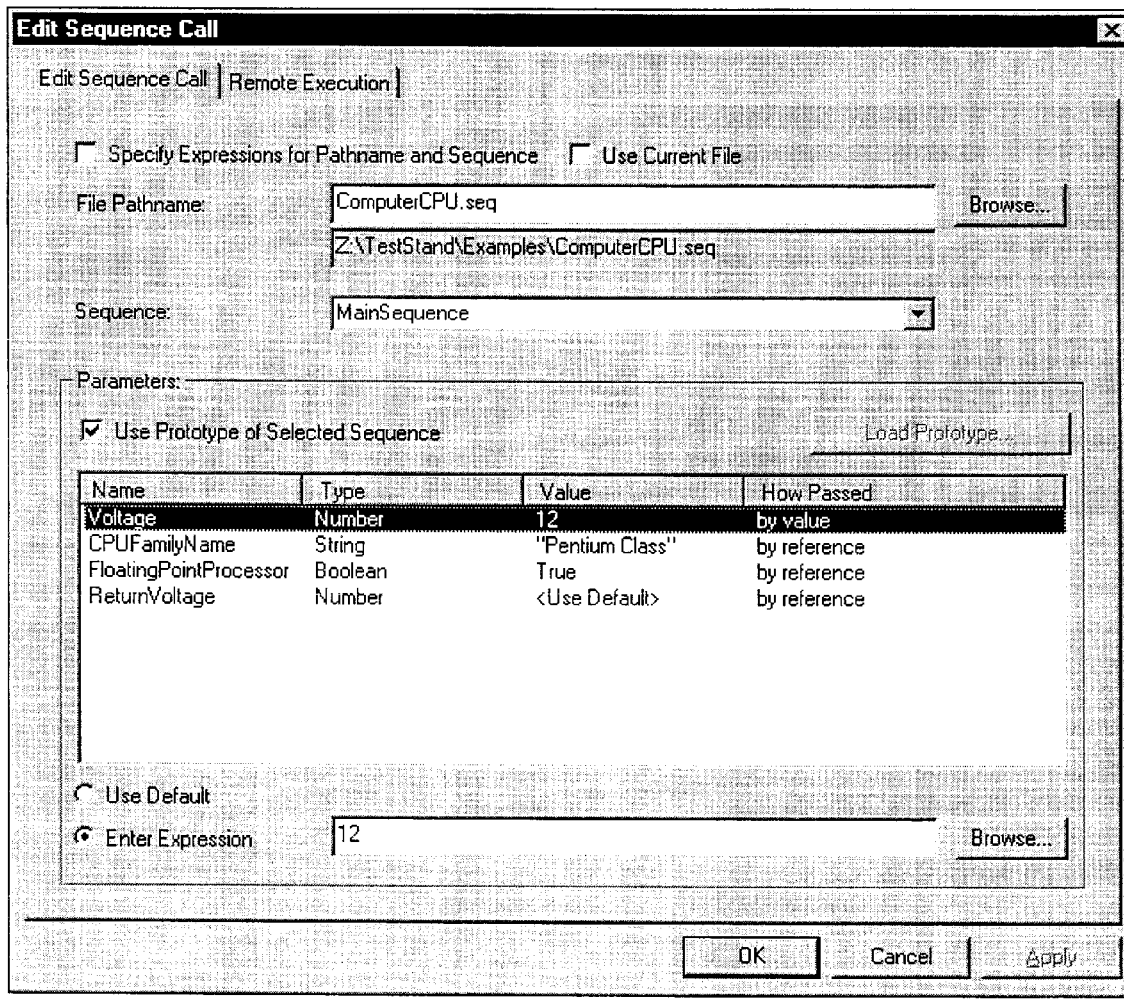
FIG. 30 illustrates the Specify Module dialog box for a Sequence Call step.

FIG. 30 shows the Specify Module dialog box for a Sequence Call step. The user can specify the sequence and the sequence file using literal strings or expressions that TestStand evaluates at run-time.

Using the Parameters section of the dialog box, the user can specify the values or expressions to pass for each parameter in the sequence call. For each parameter, the user can choose to use the default value for the parameter rather than specifying an explicit value. The user can pass parameters to the sequence by value or by reference.

After the sequence call executes, the Sequence Adapter can set the step status. If the subsequence fails, the adapter sets the step status to Failed. If a run-time error occurs in the subsequence, the adapter sets the step status to Error. If the subsequence succeeds, the adapter does not set the step status. Instead, the Sequence Call step sets the step status to Passed.

The Sequence Call step type does not define any additional step properties other than the custom properties that are common to all steps.

Step Types That Do Not Use Module Adapters

This section describes step types that do not use module adapters. When an instance of one of these step types is created, the user configures the step using a dialog box only. The user is not required to write a code module.

Statement

Statement steps are used to execute expressions. For example, a Statement step can be used to increment the value of a local variable in the sequence file.

Figure 31:
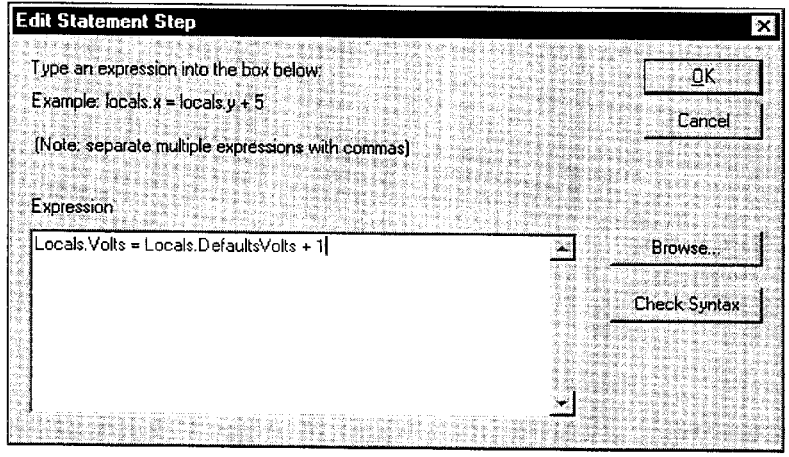
FIG. 31 illustrates the Edit Statement Step dialog box.

The user can specify the expression for a Statement step by selecting the Edit Expression item in the context menu for the step or clicking on the Edit Expression button in the Step Properties dialog box. FIG. 31 shows the Edit Statement Step dialog box.

By default, Statement steps do no t pass or fail. If the step cannot evaluate the expression or if the expression sets Step.Result.Error.Occurred to True, TestStand sets the step status to Error. Otherwise, it sets the step status to Done.

The Statement step type does not define any additional step properties other than the custom properties that are common to all steps.

Message Popup

Message Popup steps are used to display messages to the operator and to receive response strings from the operator. For example, the user can use a Message Popup step to warn the operator when a calibration routine fails.

The user specifies the expression for the Message Popup step by selecting the Edit Message Settings item in the step context menu for the step or clicking on the Edit Message Settings button in the Step Properties dialog box.

Figure 32:
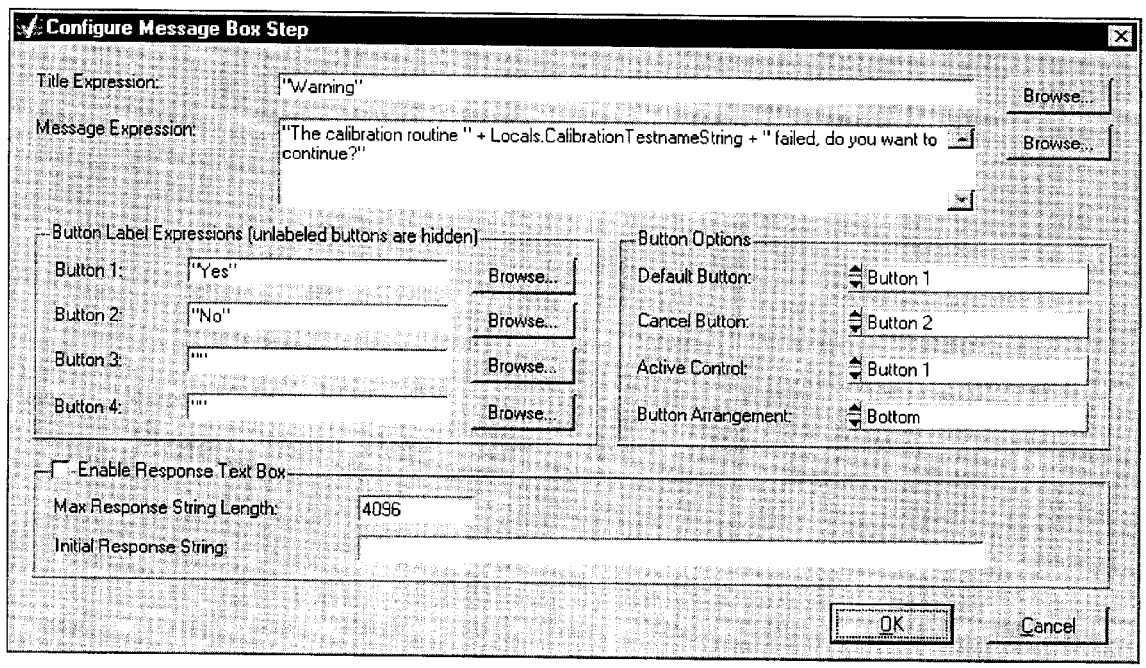
FIG. 32 illustrates the Configure Message Box Step dialog box.

FIG. 32 shows the Configure Message Box Step dialog box. The Title Expression and Message Expression controls specify the text that the step displays in the message popup. In these two controls, the user can specify literal strings or string expressions that TestStand evaluates at run-time. The user can also customize expressions for each button label, and the arrangement of the buttons. If the user does not specify a label for a button, the button does not appear on the popup. The Default Button selection ring control selects which button, if any, has <Enter> as its shortcut key. The Cancel Button selection ring control selects which button, if any, has <Esc> as its shortcut key. The Active Control selection ring control selects one of the four buttons or the input string as the initially active control.

The user can also prompt the operator for a response by enabling the Enable Response Text Box option. The user can specify the maximum response string length and an initial response string. If the user does not want to specify a maximum response string length, the user specifies −1 in the Max Response String Length control.

After the operator closes the message popup, the step sets the Step.Result.ButtonHit step property to the number of the button that the operator selects. The step copies the response string to Step.Result.Response.

By default, Message Popup steps do not pass or fail. After a step executes, TestStand sets the step status to Done or Error.

Figure 33:
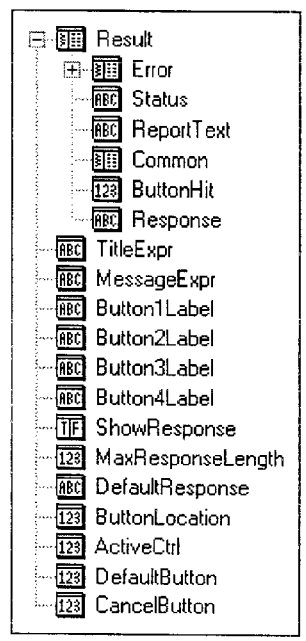
FIG. 33 illustrates the step properties for the Message Popup step type.

FIG. 33 shows the step properties for the Message Popup step type. The Message Popup step type defines the following step properties in addition to the common custom properties.

Step.Result.ButtonHit contains the number of the button that the operator selects.

Step.Result.Response contains the response text that the operator enters.

Step.TitleExpr contains the expression for the string that appears as the title of the message popup.

Step.MessageExpr contains the expression for the string that appears as the text message on the message popup.

Step.Button1Label, Button2Label, Button3Label, and Button4Label specify the expression for the label text for each button.

Step.ShowResponse enables the response text box control on the message popup.

Step.MaxResponseLength specifies the maximum number of characters that the operator can enter in the response text box.

Step.DefaultResponse contains the initial text string that the step displays in the response text box.

Step.ButtonLocation specifies whether to display the buttons on the bottom or side of the message popup.

Step.ActiveCtrl chooses one of the four buttons or the input string as the active control.

Step.DefaultButton specifies which button, if any, has <Enter> as its shortcut key.

Step.CancelButton specifies which button, if any, has <Esc> as its shortcut key.

Call Executable

Call Executable steps are used to launch an application or run a system command. For example, the user can use a Call Executable step to call a system command to copy files to a network drive.

The user can specify, the executable path, arguments, and options for the Call Executable step by selecting the Configure Call Executable item in the context menu for the step or the Configure Call Executable button on the Step Properties dialog box.

Figure 34:
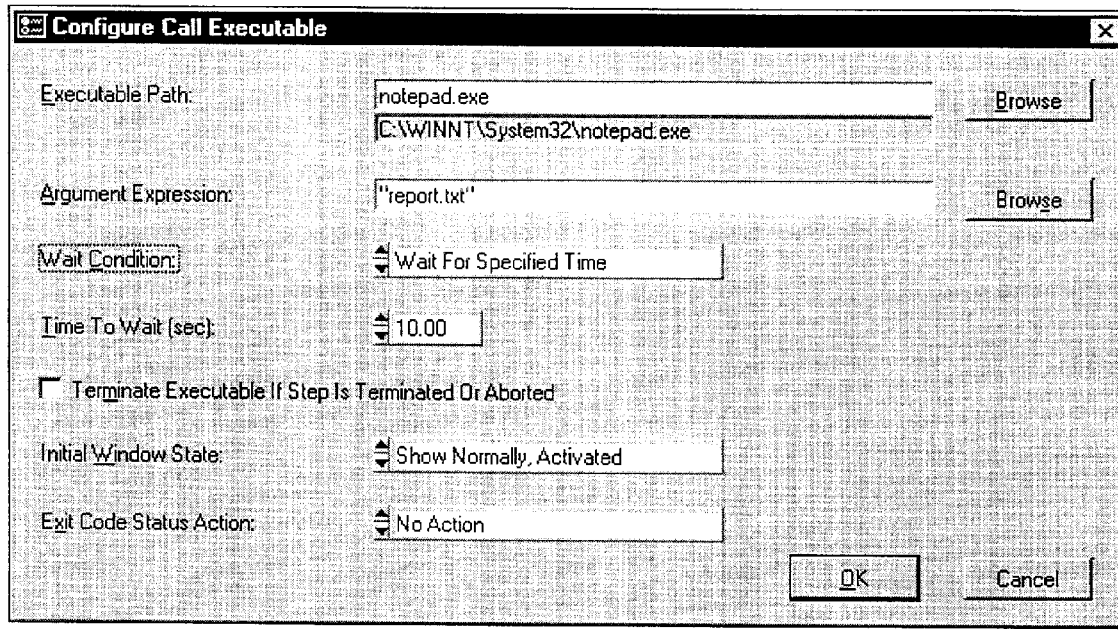
FIG. 34 illustrates the Configure Call Executable dialog box.

FIG. 34 shows the Configure Call Executable dialog box.

The Configure Call Executable dialog box contains the following controls:

Executable Path—Use this control to specify an absolute or relative pathname for the executable.

Argument Expression—Use this control to specify an argument to pass to the executable. The user can specify the argument as a literal string or as an expression that TestStand evaluates at run-time.

Wait Condition—Use this control to specify whether the step waits for the executable to exit. The possible values are No Wait, Wait for Exit, and Wait for Specified Time. If the user chooses Wait for Specified Time and the executable process does not exit before the user-specified time limit expires, the step type sets the Step.Result.Error.Occurred to indicate a run-time error.

Time to Wait—Use this control to specify the time the user desires the step to wait for the executable to exit before it indicates a run-time error.

Terminate Executable If Step Is Terminated Or Aborted—Use this control if the user does not want the executable process to continue running when the operator terminates or aborts the execution in TestStand. This option applies only when the wait condition is Wait For Exit or Wait For Specified Time.

Initial Window State—Use this control to specify whether the step launches the executable as a hidden, normal, minimized, or maximized application, and whether the application is active initially.

Exit Code Status Action—Use this control to specify whether the step type sets the step status based on the exit code that the executable returns. The user can choose to set the step status to Failed if the exit code is less than zero, greater than zero, equal to zero, or not equal to zero.

The final status of a Call Executable step depends on whether the step waits for the executable to exit. If the step does not wait for the executable to exit, the step type always sets the step status to Done. If a timeout occurs while the step is waiting for the executable to exit, the step type sets the status to Error. If the step waits for the executable to exit and a timeout does not occur, the step type sets the step status to Done, Passed, or Failed depending on the status action the user specifies in the Exit Code Status Action ring control. If the user sets the Exit Code Status Action control to the No Action option, the step type always sets the step status to Done. Otherwise, the user can choose to set the step status to Passed or Failed based on whether the exit code is equal to zero, not equal to zero, greater than zero, or less that zero.

Figure 35:
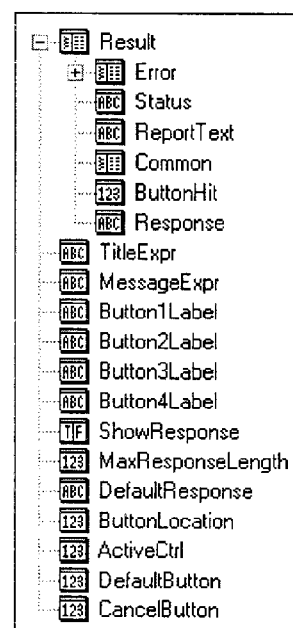
FIG. 35 illustrates the step properties for the Call Executable step type.

FIG. 35 shows the step properties for the Call Executable step type.

The Message Popup step type defines the following step properties in addition to the common custom properties.

Step.Result.ExitCode contains the exit code that the executable call returns.

Step.Executable specifies the pathname of the executable to launch.

Step.Arguments specifies the expression for the argument string that the step passes to the executable.

Step.WaitCondition specifies whether the step waits for the executable to exit before completing.

Step.TimeToWait specifies the number of seconds to wait for the executable to exit.

Step.ProcessHandle contains the Windows process handle for the executable.

Step.InitialWindowState specifies whether the executable is initially active, not active, hidden, normal, minimized, or maximized.

Step.TerminateOnAbort specifies whether to terminate the executable process when the execution terminates or aborts.

Step.ExitCodeStatusAction specifies whether to set the step status using the exit code that the executable returns.

Limit Loader

The user can use a Limit Loader step to update the limit properties of one or more steps in a sequence dynamically. For example, the user might want to develop a common sequence that can test two different models of a cellular phone, where each model requires unique limit values for each step. If step properties are used to hold the limit values, the user can include a Limit Loader step in the sequence to load the correct limit values into the step properties.

The Limit Loader step is usually inserted in the Setup step group of a sequence. In this way, the Limit Loader step initializes the limit values before the steps in the Main step group execute.

The source of the limit values can be a tab-delimited text file (.txt), a comma-delimited text file (.csv), or an. Excel file (.xls). The limit data is in a table format where the row names are step names and the column headings are the names of step properties that begin with Limits. Starting and ending data markers designate the bounds of the table. A limit file can contain more than one-block of data. The following is an example of a tab-delimited limits file with one data block.

| Start Marker | | | |
|---|---|---|---|
| | Limits.Low | Limits.High | Limits.String |
| Voltage at Pin A | 9.000000 | 11.000000 | |
| Voltage at Pin B | 8.500000 | 9.5000000 | |
| Self Test Output | | | "SYSTEM OK" |
| End Marker | | | |

Figure 36:
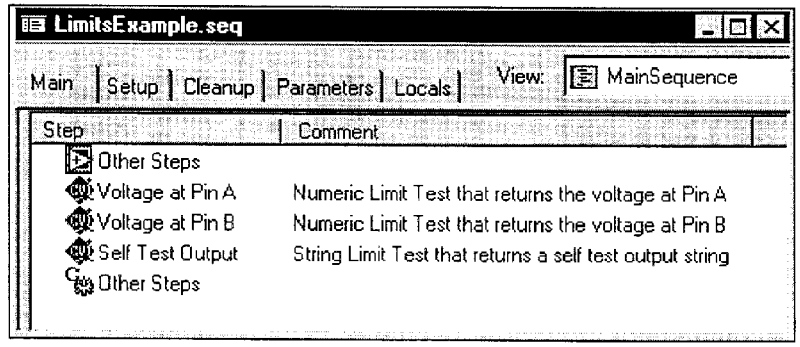
FIG. 36 illustrates an example sequence file that might use the limits file.

FIG. 36 shows an example sequence file that might use the limits file. The user can specify the pathname and layout of the limits file in a Limit Loader step by selecting the Select Limits File item in the context menu for the step or clicking on the Select Limits File button on the Step Properties dialog box.

Figure 37:
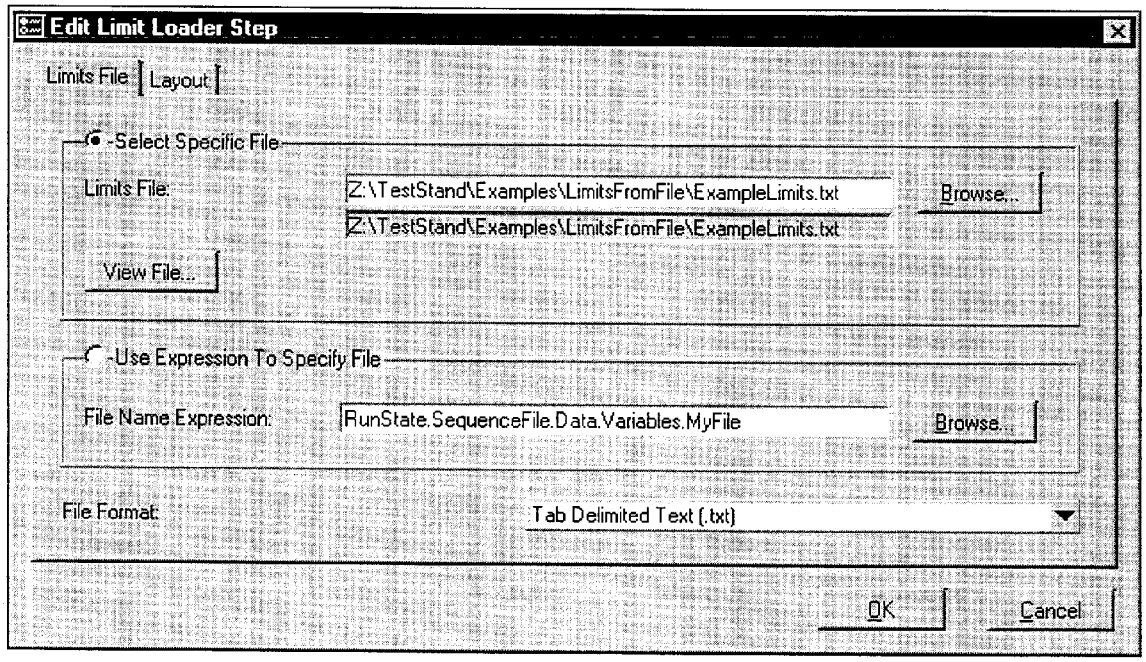
FIG. 37 illustrates the Limits File tab of the Edit Limit Loader Step dialog box.

FIG. 37 shows the Limits File tab of the Edit Limit Loader Step dialog box. On the Limits File tab, the user can select a specific limits file, or the user can specify a string expression that TestStand evaluates at run-time for the limits file pathname. The user must also select a file format for the limits file. Valid formats are tab-delimited text (.txt), comma-delimited text (.csv), and Excel file (.xls).

Figure 38:
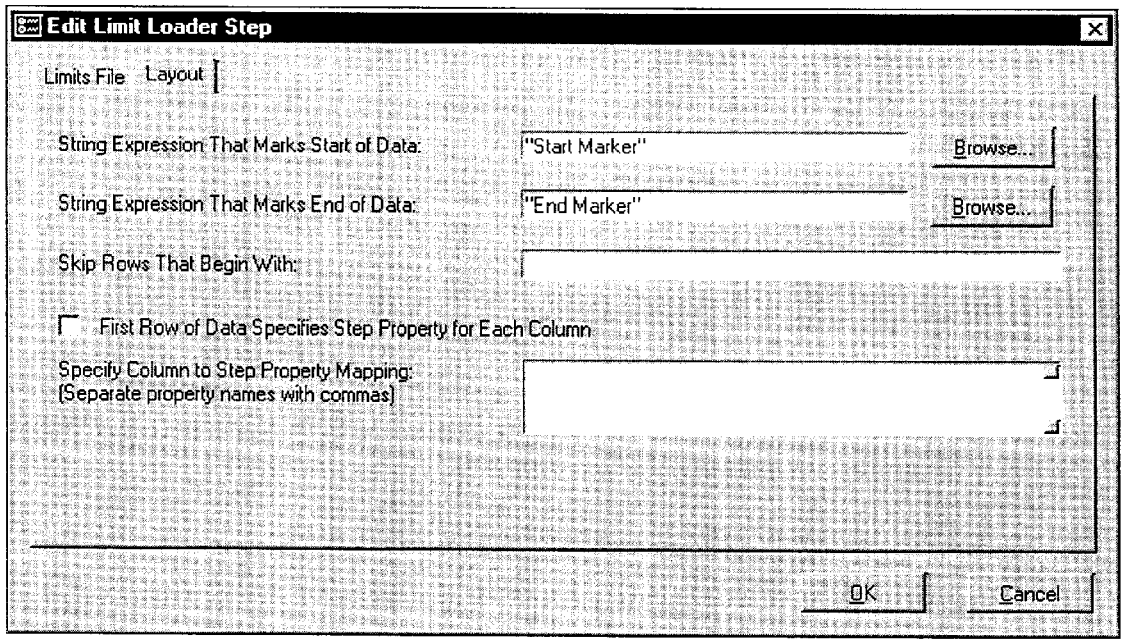
FIG. 38 illustrates the Layout tab of the Edit Limit Loader Step dialog box.

The Layout tab specifies the organization of the data in the limits file. FIG. 38 shows the Layout tab of the Edit Limit Loader Step dialog box.

The String Expression that Marks Start of Data control specifies the string that designates the beginning of a block of limit data. The String Expression that Marks End, lo of Data control specifies the string that designates the end of a block of limit data. The user can specify literal strings for the beginning and ending markers, or the user can specify string expressions that TestStand evaluates at run-time. The marker strings must appear in the first column of the file. If the user specifies an empty expression ('') for the start and end markers, the step type assumes that the file contains a single block of limit data.

A Limit Loader step ignores all rows that begin with the string the user specifies in the Skip Rows that Begin With control. This feature is useful if the limits file includes comment lines.

Figure 39:
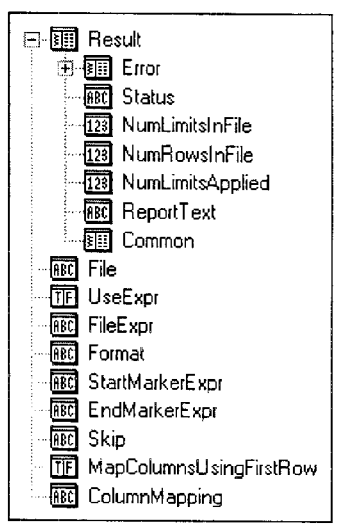
FIG. 39 illustrates the step properties for the Limit Loader step type.

The user disables the First Row of Data Specifies Step Property for Each Column option if he/she does not want to include the step property names for each column as the first row of each data block in the limits file. If the user disables this option, the user must use the Specify Column to Step Property Mapping text box to specify the list of property names. The property names should be separated with commas, as in the following example.
Limits.Low, Limits.High, Limits.String FIG. 39 shows the step properties for the Limit Loader step type. The Limit Loader step type defines the following step properties in addition to the common custom properties.

Step.Result.NumLimitsInFile indicates the total number of limit values in the data block that the step loaded from the file.

Step.Result.NumRowsInFile indicates the number of limit value rows in the data block that the step loaded from the file.

Step.Result.NumLimitsApplied contains the total number of limit values that the step assigned to limit properties in the sequence. If this number is less than Step.Result.NumLimitsInFile, the step was unable to find steps or properties in the sequence for all the step names and properties names in the file.

Step.File specifies a literal pathname for the limit file.

Step.FileExpr specifies a pathname expression that TestStand evaluates at run-time.

Step.UseExpr specifies whether to use Step.File or Step.FileExpr for the pathname of the limits file.

Step.Format specifies the layout of the file. The possible values are Tab, Comma, or Excel.

Step.StartMarkerExpr specifies the expression for the starting marker.

Step.EndMarkerExpr specifies the expression for the ending marker.

Step.Skip specifies the string that, when it appears at the beginning of a row, causes the Limit Loader step type to ignore the row.

Step.MapColumnsUsingFirstRow specifies whether the first row of each data block in the limit file contains the names of the step properties into which the Limit Loader step loads the limit values.

Step.ColumnMapping specifies the names of the properties into which the Limit Loader step loads the limit values if Step.MapColumnsUsingFirstRow is False.

Import/Export Limits Command in the Tools Menu

When the user edits a sequence file, the user can use the Import/Export Limits command in the Tools menu to import limit values into a sequence from a limits file or export limits from a sequence to a limits file.

Figure 40:
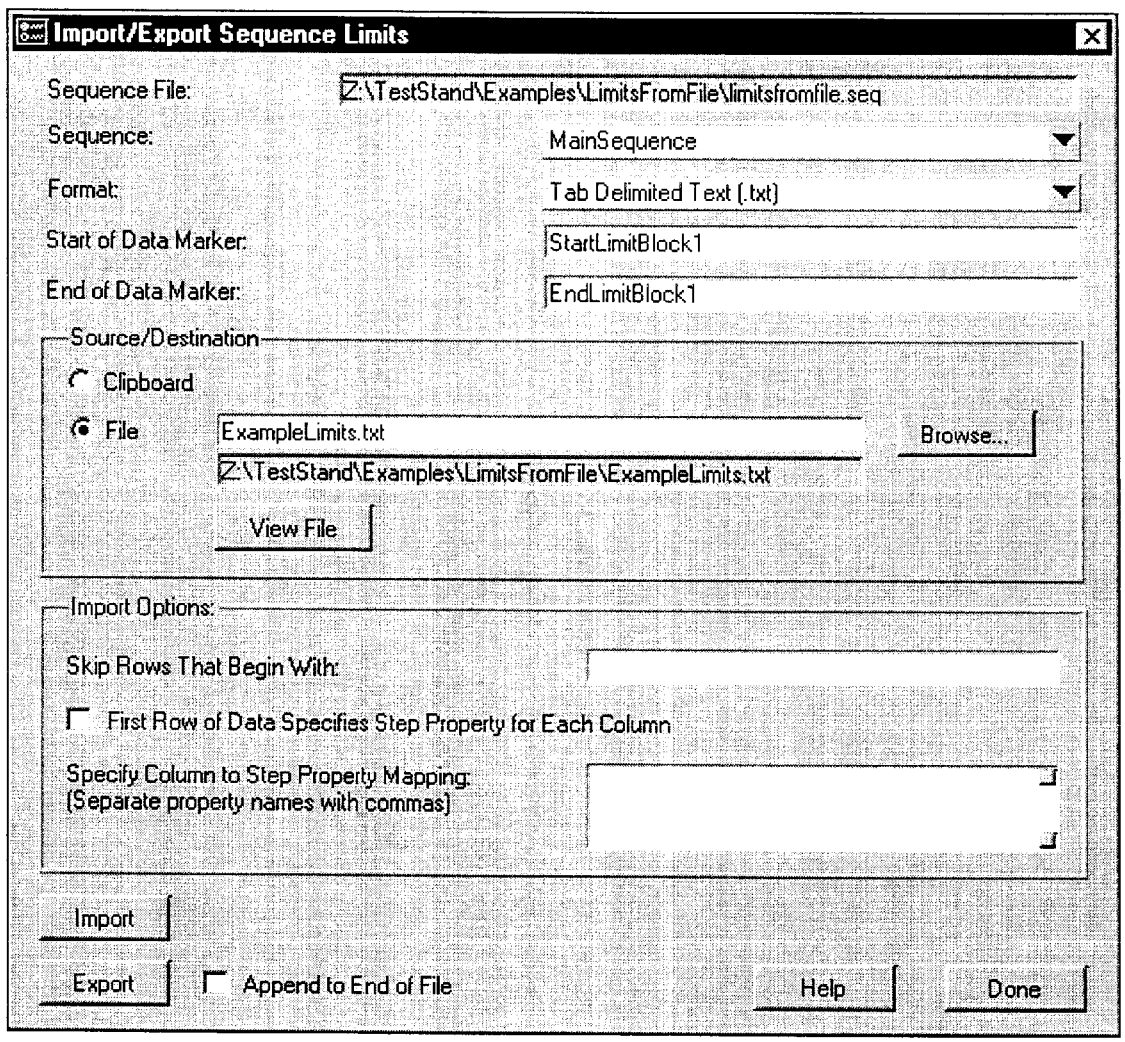
FIG. 40 illustrates the Import/Exports Sequence Limits dialog box.

The Import/Export Limits command displays the Import/ Exports Sequence Limits dialog box, as shown in FIG. 40. The Import/Export Sequence Limits dialog box contains the following options:

Sequence File—This indicator displays the name of the sequence file that the current invocation of the Import/ Export Limits command applies to.

Sequence—Use this control to select the sequence into which to import limit values or from which to export limit values.

Format—Use this control to specify the file format for the limits file. The file format can be tab-delimited text (.txt), comma-delimited text (.csv), and Excel file (.xls). The limit data is in table format where the row names are step names and the column headings are the names of step properties that begin with Limit. The following is an example tab-delimited limits file with one data block.

| StartLimitBlock | Limits.Low | Limits.High | Limits.String |
|---|---|---|---|
| Voltage at Pin A | 9.000000 | 11.000000 | |
| Voltage at Pin B | 8.500000 | 9.5000000 | |
| Self Test Output | | | "SYSTEM OK" |
| EndLimitBlock | | | |

Start of Data Marker—Use this control to specify a string that designates the beginning of a block of limit data. (The marker string must appear at the beginning of a row.)

End of Data Marker—This marker specifies the string that designates the end of a block of limit data. (The marker string must appear at the beginning of a row.)

Source/Destination—This section of the dialog box specifies the external location from which the user imports, or into which the user exports, the limit values in the sequence. The user can specify the system clipboard or a specific file.

Skip Rows That Begin With—This option ignores all rows that begin with the string that the user specifies in the Skip Rows that Begin With control. This feature is useful if the limits file includes comment lines.

First Row of Data Specifies Step Property for Each Column—The user disables this option if he/she does not want to include the step property names for each column as the first row of each data block in the limits file. If the user disables this option, the user must use the Specify Column to Step Property Mapping text box to specify the list of property names. The property names are separated with commas, as in the following.
Limits.Low, Limits.High, Limits.String Import—Click on this button to import limit values from a file or the system clipboard into a sequence. The source must contain a block of limit values starting and ending with the data markers the user specifies. The Import command displays the number of limit values it successfully imports, and lists any steps or step property names that it cannot find in the destination sequence.

Export—Click on this button to export limit values from a sequence to a file or the system clipboard. If the destination is a file that already exists and the Append to End of File option is disabled, a dialog box appears prompting the user to overwrite the file. The Export command writes a block of limit data with the starting and ending markers the user specifies to the file or clipboard.

Append to End of File—The user disables this option if he/she wants to overwrite the file when he/she exports a block of limit data. The user enables this option if he/she wants to append a block of data to a file that already exists.

Goto

Goto steps are used to set the next step that the TestStand Engine executes. A Label Step is generally used as the target of a Goto step. This allows the user to rearrange or delete other steps in a sequence without having to change the specification of targets in Goto steps.

Figure 41:
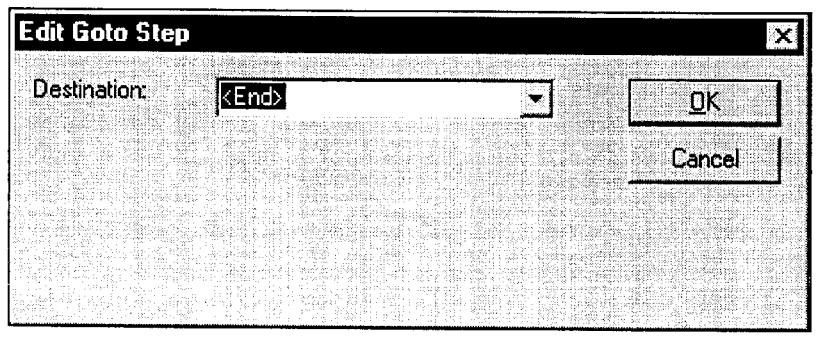
FIG. 41 illustrates the Edit Goto Step dialog box.

The user can specify the Goto step target by selecting the Edit Destination item from the step context menu or clicking on the Edit Destination button on the Step Properties dialog box. FIG. 41 shows the Edit Goto Step dialog box.

The Destination control contains a list of all steps in the step group. The Destination control lists two additional targets: <Cleanup> allows the user, to jump to the Cleanup step group, and <End> allows the user to jump directly to the end of the current step group.

By default, Goto steps do not pass or fail. After a Goto step executes, TestStand sets the step status to Done or Error.

The Goto step type does not define any additional step properties other than the custom properties common to all steps.

Label

The user usually uses a Label Step as the target for a Goto step. This allows the user to rearrange or delete other steps in a sequence without having to change the specification of targets in Goto steps.

Label steps do not pass or fail. After a Label step executes, the TestStand Engine sets the step status to Done or Error.

The Label steps type does not define any additional step properties other than the custom properties common to all steps.

PROCESS MODELS

As discussed earlier, a process model abstracts the higher level or common operations which are typically performed on most tests, such as UUT identification, operator notification, test report generation, and logging results. The process model thus includes functions that are typically performed pre-test and post-test that may apply to many different test sequences. Main sequence is the actual test sequence that performs the actual testing, and main sequence is called by the process model. The process model thus provides a modular, configurable framework for a test sequence Process models include three entities: entry points, callbacks and utility subsequences. For process model callbacks, the user can place his own callback in the test sequence file (client file) and hence modify the functionality of the process model without modifying the process model directly. The user is required to modify the process model directly to change entry points or subsequences.

One example of how process model callbacks are used is where an organization desires that a group of users only be able to modify certain functionality in a test system. The functionality which is desired to be modifiable is implemented by callbacks in the process model, whereas the non-modifiable functionality is implemented directly in the process model, which is specified as non-modifiable. Functionality which is not implemented by callbacks in the process model is not changeable except by changing the process model itself. Thus the user can create callbacks in the client file which will replace or override callbacks in the process model, thereby modifying functionality implemented in callbacks in the process model. The user cannot modify other functionality in the process model which is not implemented in callback functions—cannot modify the process file directly.

The system includes two types of callbacks, configuration callbacks and execution callbacks. Execution callbacks are primarily for actually executing tests. Configuration callbacks are for setting up options. The default process model includes an entry point sequence of its own. The default process model displays a dialog that allows the user to specify the report options. This operates in conjunction with the test report callback.

The process model differs from prior art operation in a number of respects. First, as noted above, the process model is a modular and user configurable entity which greatly simplifies creation and modification of test programs. As discussed above, the process model includes overrideable callbacks which allow user configuration of the process model. The process model may include one or more operable callbacks which can be overwritten by a callback in the client file, or the process model may include one or more empty callbacks, wherein the user can place an operable callback in the client file which is performed instead of the empty callback in the process model. In addition, the process model is presented as a sequence file just like all the other test sequences. The process model has the appearance of a test sequence file with a few minor differences. The process model is a separate entity that is presented as a separate entity and the user can modify the process model in the same manner in which the user modifies all other sequences.

The process model sequence is more easily edited or modified than a programming language. End users are able to create their own process models as well as use existing default process models.

Figure 42:
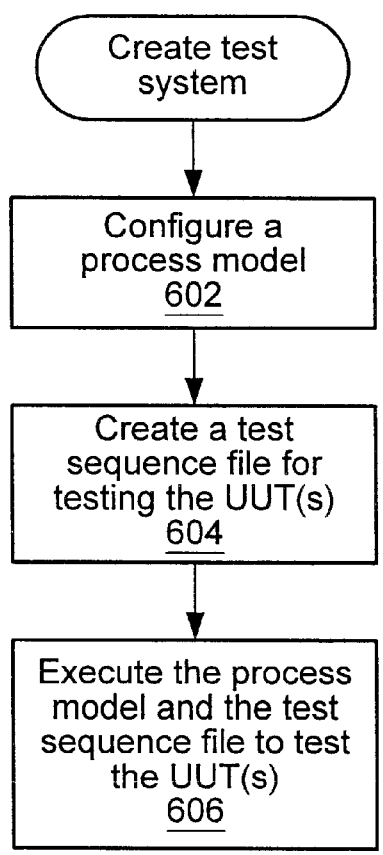
FIG. 42 is a flowchart illustrating configuration of a process model.
Figure 43:
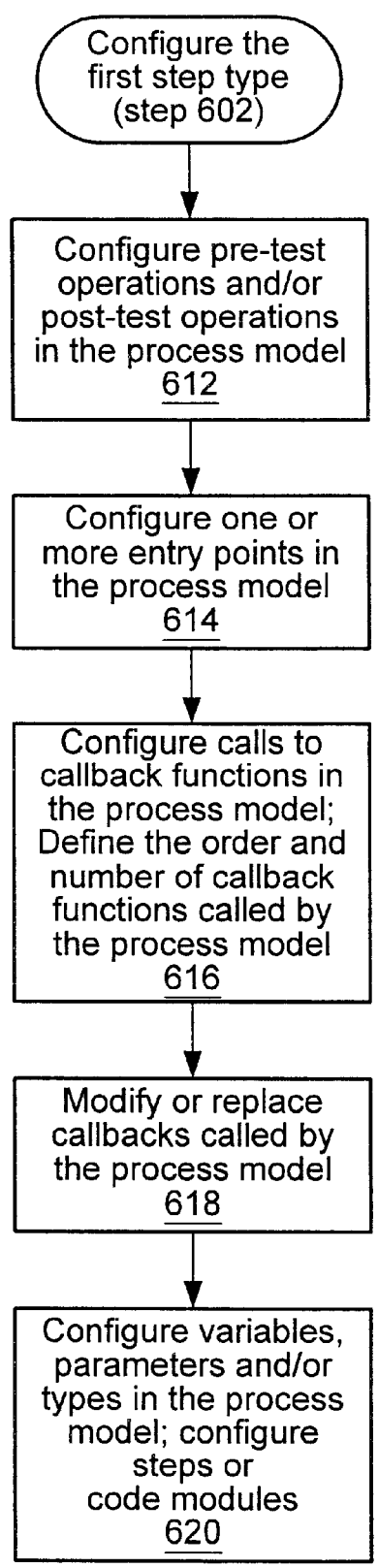
FIG. 43 is a flowchart illustrating automatic updating of the operator interface in response to user-specified entry points in the process model.
Figure 44:
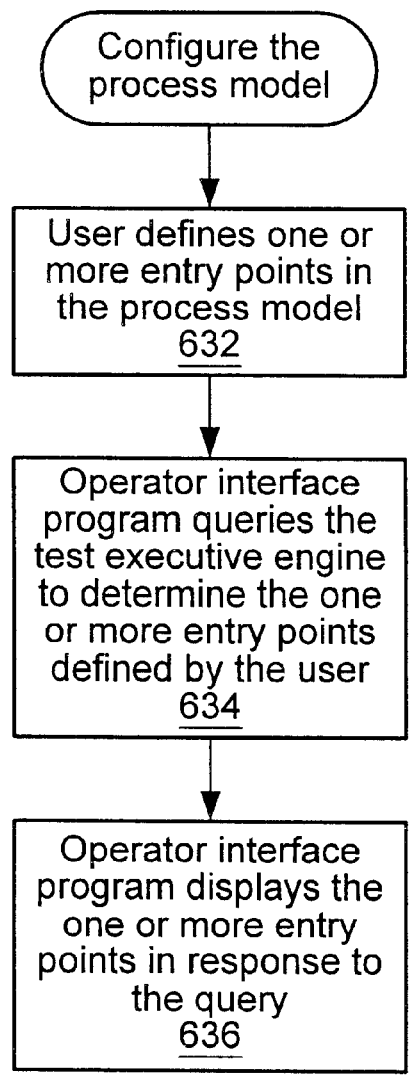
FIG. 44 is a flowchart illustrating automatic result collection of the present invention.

FIGS. 42–44 Process Model Operation

FIGS. 42–44 are flowchart diagrams illustrating the use and operation of process models according to the present invention.

FIG. 42 illustrates creation of a test system using a process model. In step 602 the user configures a process model, or alternatively selects a previously configured process model. The process model includes functionality which is common to a plurality of different test sequences, wherein the functionality is for testing one or more UUTs. As discussed above, the process model is a separate user configurable module, e.g., is modularly separate from the test sequence file. More specifically, the process model is modularly separate from the test executive engine 220, the one or more operator interfaces 202, the one or more test sequences, and the test code. The process model preferably comprises a sequence file and is user editable as a sequence file. The process model comprises a plurality of steps which call code modules, wherein the code modules can be written in a variety of different programming languages. The process model includes one or more of pre-test operations, post-test operations, variables, parameters, types and code modules. The process model is also independent of language and construction of the operator interface program. Finally, the user can configure the process model to provide one or more of: customized report generation, database logging, UUT identification, and UUT status notification, among others.

Configuration of the process model includes either modifying the process model itself, e.g., modifying calls in the process model or callbacks in the process model, or modifying the function of the process model without directly modifying the process model itself, e.g., overriding callbacks in the process model. Configuration of the process model includes one or more of: configuring pre-test operations and/or post-test operations in the process model; configuring one or more entry points in the process model; changing the order of calls to callback functions; adding/ deleting calls to callback functions; adding/deleting new callback functions in response to new calls added to the process model; overriding callback functions; modifying existing callback functions; and configuring variables, parameters, types (including data types and step types), steps and/or code modules. Step 602 is discussed in more detail in the flowchart of FIG. 43.

In step 604 the user creates a test sequence file, also called a client file, for testing the unit under test. The test sequence file includes the test sequence for the desired UUT, which is called MainSequence. The MainSequence file is called by the process model file and typically includes a number of sub-sequences which call into other sequence files. The user may include one or more client callbacks in the test sequence file which operate to override or replace callbacks in the process model. This operation is discussed with respect to step 618 of FIG. 43.

The process model is comprised in a process model sequence file. The process model sequence file is a file that has multiple sequences that can be of types entry point sequence, callback sequence or normal sequence. A normal sequence is typically a utility subsequence. The entry point sequence is a place where the user can begin execution within the process model sequence file. The callback sequence is a sequence which typically performs non-test functions such as reports, UUT identification, etc., and is replaceable by callback sequences inserted into the client file.

In step 606 the process model and the test sequence file are executed to test the unit under test. In the preferred embodiment, the user invokes execution of the process model, and during execution of the process model the process model operates to call the test sequence file. The user preferably begins execution of the process model through a graphical user interface, such as through a menu. The user preferably selects a desired execution entry point to begin execution within the process model sequence file. The test sequence file (client file) can operate with any of the execution entry points, i.e., the test sequence file is not customized for a particular entry point in the process model. This way, for a single client file, the user can choose different ways of running the respective client file.

FIG. 43 is a flowchart illustrating step 602 of FIG. 42. It is noted that configuration of the process model, may involve any one or more of steps 612–620.

As shown, in step 612 the user configures pre-test operations and/or post-test operations in the process model. This involves creating steps and code modules to implement the desired functionality of the pre-test operations and/or post-test operations.

In step 614 the user configures one or more entry points in the process model. This may involve defining the entry points in the process model as well as selecting an entry point within the process model from a plurality of different possible entry points. The process model begins execution at the selected entry point. For example, the can select a first entry point in the process model for testing a plurality of UUTs and can select a second different entry point for a single pass test of a single UUT.

In step 616 the user configures calls to callback functions in the process model, and also configures default callback functions which are called by the respective calls. The user preferably defines the number and order of execution of calls to callback functions called from within the process model. This may involve creating at least one new call to a new callback function in the process model, wherein the at least one new call is comprised in the process model, and creating the new callback which is the default callback for the new call, wherein the new callback also resides in the process model. The callback functions execute during execution of the process model and preferably comprise sequences.

In step 618 the user modifies or replaces callbacks called by the process model. For example, the user can modify callbacks in the process model as part of configuring the process model.

In the preferred embodiment, the user can also override or replace callbacks called by the process model. In order to replace a callback called by the process model, in the preferred embodiment the user creates a test sequence file or client file for execution, wherein the test sequence file includes the test sequence and includes callback functions which override the callbacks in the process model. Stated another way, the user can place callback functions in the test sequence file which operate to override the default callbacks in the process model, i.e., the callback functions placed in the test sequence file execute instead of the default callbacks in the process model. The new callback function placed in the test sequence file can either override a default callback function that exists in the process model or an empty callback function that exists in the process model. Step 618 is actually performed in step 604 of FIG. 42 during creation of the test sequence file. Thus, replacement or overriding of callbacks in this way does not actually modify the process model itself, but rather modifies the operation resulting from use of the process model.

In step 620 the user configures variables, parameters, and/or types (including data types and step types) in the process model, as well as steps or code modules.

It is noted that steps 612–620 are not exhaustive, and the process model can be configured in other ways, as desired.

FIG. 44 is a flowchart illustrating operation of the operator interface program 202 in response to user configuration of one or more entry points. As shown, in step 632 the user defines one or more entry points in the process model. In step 634 the operator interface program queries the test executive engine 220 to determine the one or more o entry points defined by the user in the process model in step 632. In step 636 the operator interface program displays the one or more entry points in response to the query performed in step 634. Thus the one or more entry points configured by the user in the process model automatically appear in the operator interface program. Stated another way, changes to the process model which affect the appearance of the operator interface do not require manual changes to the operator interface, but rather the operator interface automatically updates itself.

Default Process Model

This section discusses the default process model that TestStand includes. It also describes the directory structure that TestStand uses for process model files and the special capabilities that the TestStand sequence editor has for editing process model sequence files.

Directory Structure for Process Model Files

The TestStand installer places the files for the default process model files under the following directory.
TestStand/Components/NI/Models/TestStandModel The default process model comprises a process model sequence file and several supporting sequence files. The name of the process model sequence file is TestStandModel.seq If the user desires to modify the default process model, the user copies the process model sequence file and its supporting files to a different subdirectory, and renames the process model sequence file. If the user modifies these files directly, the installers for newer versions of TestStand might overwrite the user's customizations. Consequently, it is best to keep the files that the user creates or modifies separate from the files that TestStand installs. For this purpose, TestStand includes the subdirectories under TestStand/Components/User in its list of search paths. The TestStand installer creates a subdirectory tree under TestStand/Components/User for the user. Not only does the user use the subdirectories to protect the user's customized components, the user also uses them as the staging area for the components that the user includes in the users own run-time distribution of TestStand.

The user preferably places each process model under its own subdirectory under TestStand/Components/User/Models.

If the user customizes the default process model and desires to name it MyProcess, the user copies the default process model files to TestStand/Components/User/Models/MyProcess, and renames the process model sequence file MyProcess.seq. The user must also establish the user's custom process model as the process model for the station using the Model tab of the Station Options dialog box.

Special Editing Capabilities for Process Model Sequence Files

The TestStand sequence editor has specific features for creating or modifying process model sequence files.

If the user wants TestStand to treat a sequence file as a process model, the user must mark it as a process model file. To do so, select Sequence File Properties from the Edit menu. In the Sequence File Properties dialog box, select the Advanced tab. In the Advanced tab, select the Model entry in the Type ring control.

Figure 45:
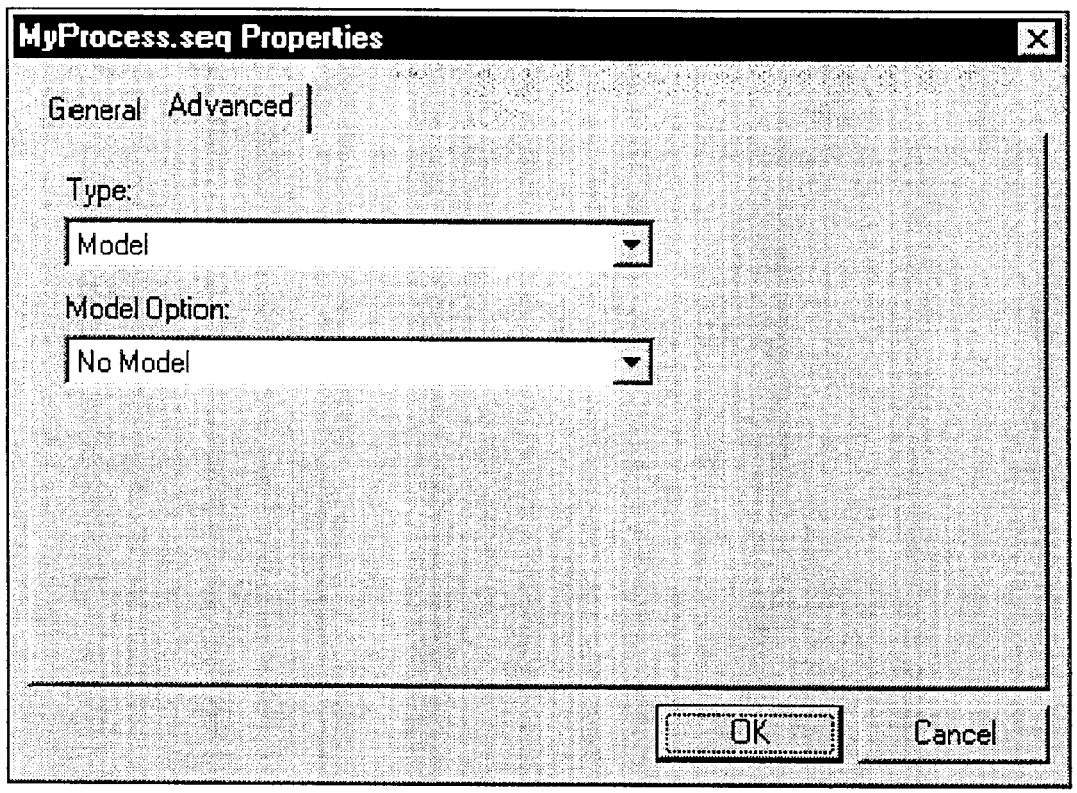
FIG. 45 illustrates the settings for a process model file in the Advanced tab of the Sequence File Properties dialog box.

FIG. 45 shows the settings for a process model file in the Advanced tab of the Sequence File Properties dialog box.

Although the user edits a process model sequence file in a regular Sequence File window, the file has special contents. In particular, some of the sequences in the files are model entry points, and some are model callbacks. TestStand maintains special properties for the entry point and callback sequences. The user can specify the values of these properties when the user edits the sequences in a process model file. When the user displays the Sequence Properties dialog box for any sequence in a model file, the dialog box contains a Model tab.

Sequence Properties Model Tab

The user can access the Sequence Properties dialog box by selecting the Sequence Properties item from the context menu in a step list of an individual sequence view or by selecting the Properties item from the context menu for a sequence in the All Sequences view. If the sequence file is a process model file, the dialog box contains a Model tab. The first control on the Model tab is the Type ring control.

Figure 46:
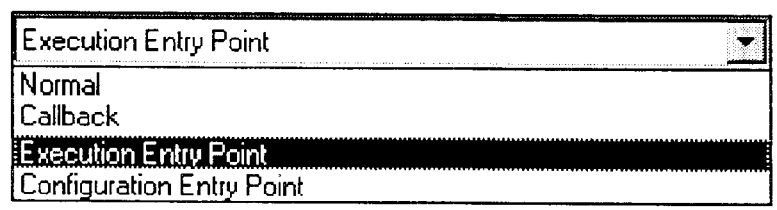
FIG. 46 illustrates the pull-down menu for the Type ring control.

FIG. 46 shows the pull-down menu for the Type ring control in the Sequence Properties Model Tab. The Type ring control lists the different types of sequences that a process model file can contain. The following sections describe the different types of sequences.

Normal Sequences

A normal sequence is any sequence other than a callback or entry point. In a process model file, normal sequences are used as utility subsequences that the entry points or callbacks call.

When the user selects the Normal entry in the Types ring, nothing else appears on the Model tab.

Callback Sequences

Model callbacks are sequences that entry point sequences call and that the client sequence file can override. By marking sequences in a process model file as callbacks, the user specifies the set of process model operations a sequence developer can customize. When editing the client file, the sequence developer can override the callback by selecting Edit>>Sequence File Callbacks.

Some model callbacks have full implementations. For example, the TestReport callback in the default process model is sufficient to handle most types of test results. Other model callbacks are merely placeholders that the user overrides with sequences in the client file. For example, the MainSequence callback in the model file is a placeholder for the MainSequence callback in the client file.

When the user selects the Callback entry in the Type ring, the Copy Steps and Locals when Creating an Overriding Sequence checkbox appears. This checkbox determines what TestStand does when the user clicks on the Add button in the Sequence File Callbacks dialog box to create an overriding sequence in the client file. If the user enables the checkbox, TestStand copies all the steps and local variables in the callback sequence in the model file to the callback sequence the user creates in the client file. TestStand always copies the sequence parameters regardless of the checkbox setting.

Entry Point Sequences

Entry point sequences are sequences the user can invoke from the menus in the TestStand sequence editor or from an operator interface program. The user can specify two different types of entry points:

Execution entry points—Use this entry point to run test programs. Execution entry points call the MainSequence callback in the client file. The default process model contains two execution entry points: Test UUTs and Single Pass. By default, execution entry points appear in the Execute menu. Execution entry points appear in the menu only when the active window contains a sequence file that has a MainSequence callback.

Configuration entry points—Use this entry point to configure a feature of the process model. Configuration entry points usually save the configuration information in a .ini file in the TestStand/cfg directory. By default, configuration entry points appear in the Configure menu. For example, the default process model contains the configuration entry point, Config Report Options. The Config Report Options entry point appears as Report Options in the Configure menu.

When the user selects Execution Entry Point or Configuration Entry Point from the Type ring, numerous controls appear on the Model tab. The contents of the Model tab are the same for all types of entry points.

Figure 47:
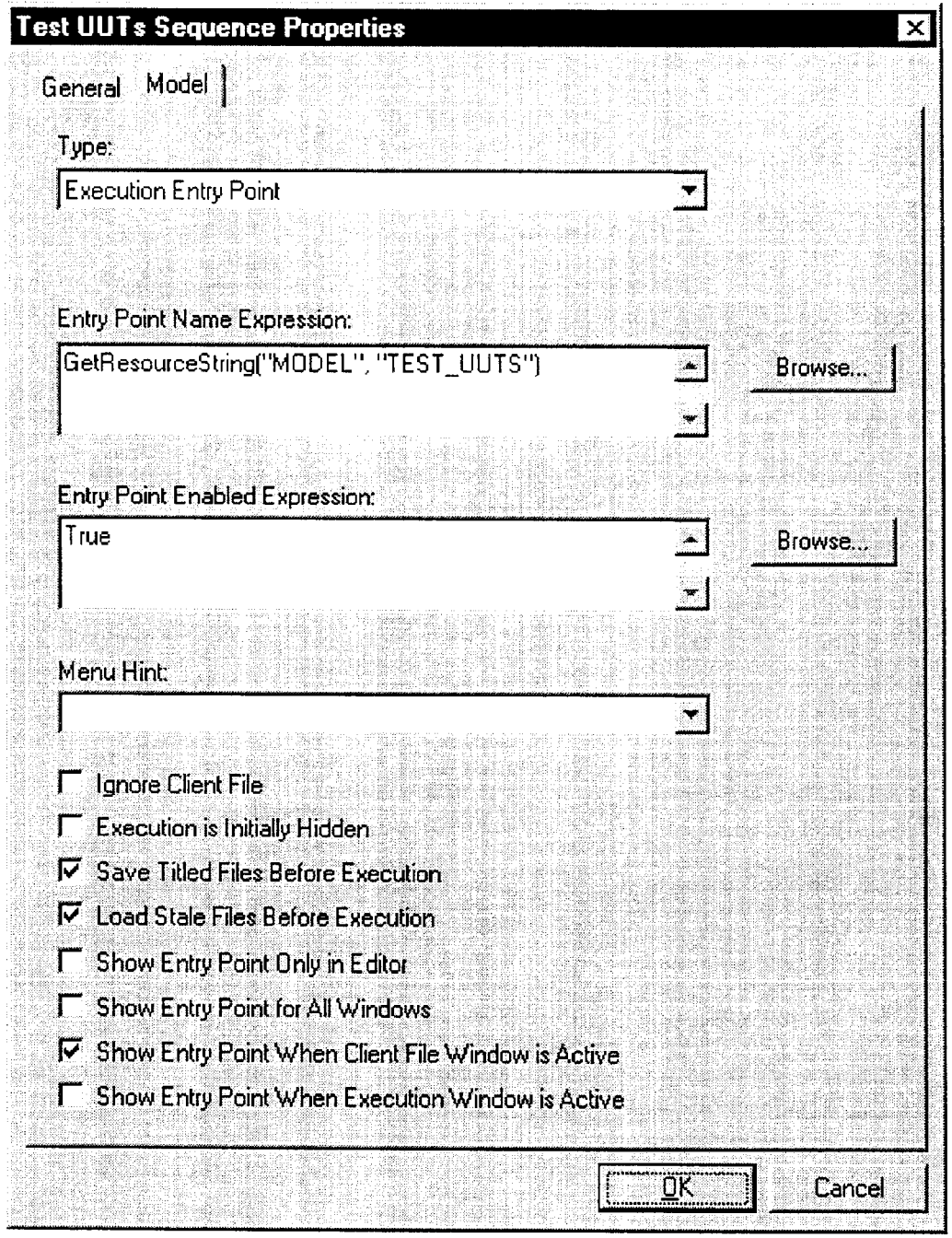
FIG. 47 illustrates the contents of the Model tab for the Test UUTs execution entry point.

FIG. 47 shows the contents of the Model tab for the Test UUTs execution entry point. The Model tab for an Execution Entry Point Sequence contains the following controls:

Entry Point Name Expression—Use this control to specify a string expression for the menu item name of the entry point. If the user specifies a literal string for the menu item name, the user must enclose it in double quotes. If the user wants to store the name in a string resource file, the user can use the GetResourceString expression function to retrieve the name from the file.

Entry Point Enabled Expression—Use this control to specify a Boolean expression that TestStand evaluates to determine whether to enable the menu item for the entry point. If the expression evaluates to False, TestStand dims the entry point in the menu. If the expression is empty, the entry point is enabled in the menu.

Menu Hint—Use this control to specify a menu for the entry point. If the user leaves the Menu Hint control empty, TestStand uses the default menu for the entry point type. Click on the arrow at the right edge of the control to pull down a menu that contains the following entries: File, Edit, View, Execute, Debug, Configure, Window, and Help.

The user can enter one or more names directly in the control. If the user specifies multiple names, the user must separate them with commas. TestStand uses the first menu name in the list that it can find in the operator interface. This is useful if multiple operator interfaces are used that have different menu names. If TestStand cannot find any menus in the operator interface with the names that the user lists in the control, it uses the default menu for the entry point type.

Entry Point Ignores Client File—Enable this option if the sequence does not call the client file and the user wants the sequence to run without preloading the client file. This option prevents TestStand from preloading the client sequence file when the user runs the entry point even if the client sequence file is set to preload when execution begins.

When the user runs the entry point, TestStand uses the callback implementations in the model file regardless of whether the client file overrides them. The Config Report Options entry point uses this option so that the user can select Configure>>Report Options even when TestStand is unable to preload the modules in the active sequence file.

Hide Entry Point Execution—Enable this option if the user does not want TestStand to display an Execution window for the execution of the entry point. If the user enables this option, the user does not see a window for the execution unless a run-time error or breakpoint occurs.

Save Modified Sequence Files Before Execution—Enable this option if the user wants TestStand to save the contents of windows to disk when the user invokes the entry point. If this option is enabled when the user runs the entry point, TestStand checks all windows that have pathnames. If one or more windows have changes that the user has not yet saved, TestStand prompts the user to save the users changes. If the user clicks on Yes, TestStand saves the files.

Load Stale Sequence Files Before Execution—Enable this option if the user wants TestStand to check the disk dates of files that are in memory when the user invokes the entry point. If the current disk date of a file differs from the disk date of when the user last loaded or saved it, TestStand gives the user the option to reload the file.

Show Entry Point Only in Editor—Enable this option if the user wants the entry point to appear only in the TestStand sequence editor and not in the run-time operator interfaces.

Show Entry Point for All Windows—Enable this option if the user wants the entry point to appear in the menu regardless of the type of window, if any, that is currently active. For example, the Configure Report Options entry point configures the report options for the model and has no client-specific effects. Thus, the user might want to access it from any window or even if no window is active. If the user enables this option, TestStand dims the remaining two checkboxes.

Show Entry Point When Client File Window is Active—Enable this option if the user wants the entry point to appear in the menu when a Sequence File window is the active window. For example, the execution entry points are in the Execute menu only when a sequence file is active.

Show Entry Point When Execution Window is Active—Enable this option if the user wants the entry point to appear in the menu when an Execution window is the active window.

Contents of the Default Process Model

FIG. 48 shows a list of all the sequences in the default TestStand process model.

The first three sequences are entry points. The last sequence is a utility subsequence that the execution entry points call. The other sequences are model callbacks that the user can override in a client sequence file.

The default TestStand process model file contains the following sequences:

Test UUTs—This sequence is an execution entry point that initiates a loop that repeatedly identifies and tests UUTs. When a window for a client sequence file is active, the Test UUTs item appears in the Execute menu.

Single Pass—This sequence is an execution entry point that tests a single UUT without identifying it. In essence, the Single Pass entry point performs a single iteration of the loop that the Test UUTs entry point performs. When a window for a client sequence file is active, the Single Pass item appears in the Execute menu.

Config Report Options—This sequence is a configuration entry point that displays a dialog box in which the user can specify the contents, format, and pathname of the test report. The settings the user makes in the dialog box apply to the test station as a whole. The entry point saves the station report options to disk. The entry point appears as Report Options in the Configure menu.

Configure Database Options—This sequence is a configuration entry point that displays a dialog box in which the user can specify the database logging options. This entry point is a placeholder for database functionality.

MainSequence—This sequence is a model callback that the Test UUTs entry point calls for each UUT. The MainSequence callback is empty in the process model file. The client file must contain a MainSequence callback that performs the tests on a UUT.

PreUUT—This sequence is a model callback that displays a dialog box in which the operator enters the UUT serial number. The Test UUTs entry point calls the PreUUT callback at the beginning of each iteration of the UUT loop. If the operator indicates through the dialog box that no more UUTs are available for testing, the UUT loop terminates.

PostUUT—This sequence is a model callback that displays a banner indicating the result of the test that the MainSequence callback in the client file performs on the UUT. The Test UUTs entry point calls the PostUUT callback at the end of each iteration of the UUT loop.

PreUUTLoop—This sequence is a model callback that the Test UUTs entry point calls before the UUT loop begins. The PreUUTLoop callback in the default process model file is empty.

PostUUTLoop—This sequence is a model callback that the Test UUTs entry point calls after the UUT loop terminates. The PostUUTLoop callback in the default process model file is empty.

ReportOptions—This sequence is a model callback that the execution entry points call through the GetReportOptions subsequence. After reading the test station report options from disk, GetReportOptions calls the ReportOptions callback to give the client sequence file a chance to modify the report options. For example, the user might want to force the report format to be ASCII text for a particular client sequence file. The ReportOptions callback in the default process model file is empty.

DatabaseOptions—This sequence is a model callback that the execution entry points call through GetDatabaseOptions subsequence. After reading the test station database options from disk, GetDatabaseOptions calls the DatabaseOptions callback to give the client sequence file a chance to modify the database options. The DatabaseOptions callback in the default process model file is empty. The DatabaseOptions callback is a placeholder for future database functionality.

TestReport—This sequence is a model callback that the execution entry points call to generate the contents of the test report for one UUT. The user can override the TestReport callback in the client file if the user wants to change its behavior entirely. The default process model defines a test report for a single UUT as consisting of a header, an entry for each step result, and a footer. If the user does not override the TestReport callback, the user can override the ModifyReportHeader, ModifyReportEntry, and ModifyReportFooter model callbacks to customize the test report.

The TestReport callback makes the determination as to whether the report body is built with sequences or a DLL based on a setting in the Configure Report Options dialog box. If the user selects the sequence report generation option, TestReport calls the AddReportBody sequence in either ReportGen_txt.seq or ReportGen_html.seq to build the report body. The sequence report generator uses a series of sequences with steps that recursively process the result list for the execution. If the user selects the DLL report generation option, TestReport calls a single function in modelsupport.dll to build the entire report body before returning. The project and source code for the LabWindows/CVI built DLL is available. If the user selects the DLL option, TestStand generates reports faster, but TestStand does not call ModifyReportEntry callbacks.

ModifyReportHeader—This sequence is a model callback that the TestReport model callback calls so that the client sequence file can modify the report header. ModifyReportHeader receives the following parameters: the UUT, the tentative report header text, and the report options. The ModifyReportHeader callback in the default process model file is empty.

ModifyReportEntry—This sequence is a model callback that the TestReport model callback calls so that the client sequence file can modify the entry for each step result. Through subsequences, TestReport calls ModifyReportEntry for each result in the result list for the UUT. ModifyReportEntry receives the following parameters: an entry from the result list, the UUT, the tentative report entry text, the report options, and a level number that indicates the call stack depth at the time the step executed. The ModifyReportEntry callback in the default process model file is empty.

The Report Options dialog box allows the user to select between producing the report body using sequences or a DLL. If the user selects the DLL option, TestStand generates reports faster, but TestStand does not call ModifyReportEntry callbacks.

ModifyReportFooter—This sequence is a model callback that the TestReport model callback calls so that the client sequence file can modify the report footer. ModifyReportFooter receives the following parameters: the UUT, the tentative report footer text, and the report options. The ModifyReportFooter callback in the default process model file is empty.

LogToDatabase—This sequence is a model callback that the execution entry points call after they write the test report for a UUT to disk. The user can use this callback to log the result information for a UUT to a database. LogToDatabase receives the following parameters: the UUT, the result list for the UUT, the report options, and the report text. The LogToDatabase callback in the default process model file is empty.

Get Report Options—This sequence is a utility sequence that the execution entry points call at the beginning of execution. GetReportOptions reads the report options and then calls the ReportOptions callback to give the user a chance to modify the report options in the client file.

Get Database Options—This sequence is a utility sequence that the execution entry points call at the beginning of execution. GetDatabaseOptions reads the database options and then calls the DatabaseOptions callback to give the user a chance to modify the database options in the client file.

Test UUTs Entry Point

The table titled Order of Actions in the Test UUTs Entry Point lists the more significant steps in the Test UUTs execution entry point.

Table: Order of Actions in the Test UUTs Entry Point

| Action Number | Description | Remarks |
| --- | --- | --- |
| 1 | Call PreUUTLoop model callback. | Callback in model file is empty. |
| 2 | Call GetReportOptions utility sequence | Reads station options from disk. Calls ReportOptions model callback to allow client to modify options. |
| 3 | Call GetDatabaseOptions utility sequence. | Reads station options from disk. Calls DatabaseOptions model callback to allow client to modify options |
| 4 | Increment the UUT index. | — |
| 5 | Call PreUUT model callback. | Gets the UUT serial number from the operator. |
| 6 | If no more UUTs, go to action 14. | — |
| 7 | Determine the report file pathname. | — |
| 8 | Clear results list. | — |
| 9 | Call MainSequence model callback | MainSequence callback in client performs the tests on the UUT. |
| 10 | Call PostUTT model callback. | Displays a pass, fail, error, or terminate banner. |
| 11 | Call TestReport model callback. | Generates test report for the UUT. |
| 12 | Write the UUT report to disk. | Can append to an existing file or create a new file. |
| 13 | Call LogToDatabase model callback. | Log test results to database for the UUT. |
| 14 | Loop back to action 3 | — |
| 15 | Call PostUTTLoop model callback. | Callback in model file is empty. |
| 16 | Call LogToDatabase model callback. | Log test results to database for the UUT. |

Single Pass Entry Point

The table titled Order of Actions in the Single Pass Entry Point lists the more significant steps in the Single Pass execution entry point.

Table: Order of Actions in the Single Pass Entry Point

| Action Number | Description | Remarks |
|---|---|---|
| 1 | Call GetReportOptions utility sequence. | Reads station options from disk. Calls ReportOptions model callback to allow client to modify options. |
| 2 | Call GetDatabaseOptions utility sequence. | Reads station options from disk. Calls DatabaseOptions model callback to allow client to modify options. |
| 3 | Determine the report file pathname. | |
| 4 | Clear results list for UUT. | |
| 5 | Call MainSequence model callback | MainSequence callback in client performs the tests on the UUT. |
| 6 | Call TestReport model callback. | Generates test report for the UUT. |
| 7 | Write the UUT report to disk. | Can append to an existing file or create a new file. |
| 8 | Call LogTo Database model callback. | Log test results to database for the UUT. |

Support Files for the Default Process Model

Many sequences in the default process model file call functions in DLLs and subsequences in other sequence files. TestStand installs these supporting files and the DLL source files in the same directory that it installs the process model sequence file.

The table titled Default Process Model Files lists the files that TestStand installs for the default process model in the TestStand/NI/Models/TestStandModels directory Table: Default Process Model Files

| File Name | Description |
|---|---|
| TestStandModel.seq | Entry point and model callback sequences for the default process model. |
| reportgen_html.seq | Subsequences that add the header, result entries, and footer for a UUT into an HTML test report. |
| reportgen_txt.seq | Subsequences that add the header, result entries, and footer for a UUT into an ASCII text test report. |
| modelsupport.dll | DLL containing C fuctions that the process model sequences call. Includes functions that display the Report Options dialog box, read and write the report options from disk, determine the report file pathname, obtain the UUT serial number from the operator, and display status banners. |
| modelsupport.prj | LabWindows/CVI project that builds model support.dll. |
| modelsupport.fp | LabWindows/CVI function panels for the functions in model support.dll. |
| modelsupport.h | C header file that contains declarations for the functions in modelsupport.dll. |
| modelsupport.lib | Import library in Visual C/C++ format for modelsupport.dll. |
| modelpanels.uir | LabWindows/CVI user interface resource file containing panels that the functions in model support.dll use. |
| modelpanels.uir | LabWindows/CVI user interface resource file containing panels that the functions in modelsupport.dll use. |
| modelpanels.h | C header file containing declarations for the panels in modelpanels.uir. |
| main.c | C source for utility functions. |
| banners.c | C source for functions that display status banners. |

-continued

Table: Default Process Model Files

| File Name | Description |
|---|---|
| report.c | C source for functions that display the Report Options dialog box, read and write the report options from disk, and determine the report file pathname. |
| uutdlg.c | C source for function that obtains the UUT serial number from the operator. |
| c_report.c | C source for generating HTML and ASCII reports for the DLL option on the Report Options dialog box. |

The user can view the contents of the reportgen_html.seq and reportgen_txt.seq sequence files in the sequence editor. Notice that each is a model sequence file and contains an empty ModifyReportEntry callback. Each file has a PutOneResultInReport sequence that calls ModifyReportEntry. The client sequence file can override the ModifyReportEntry callback. TestStand requires that all sequence files that contain direct calls to model callbacks must also contain a definition of the callback sequence and must be model files.

TestStandModel.seq also contains an empty ModifyReportEntry callback, even though no sequences in TestStandModel.seq call ModifyReportEntry directly. TestStandModel.seq contains a ModifyReportEntry callback so that ModifyReportEntry appears in the Sequence File Callbacks dialog box for the client sequence file.

Automatic Result Collection

As discussed above, the TestStand Engine 220 can automatically collect the results of each step. The user can enable or disable result collection for a particular sequence or for the entire test station.

Each sequence has a local array that stores the results of each step. The contents in the results for each can vary depending on the step type. When TestStand stores the results for a step into the array, it adds information such as the name of the step and its position in the sequence. For a step that calls a sequence, TestStand also adds the result array from the subsequence.

Figure 49:
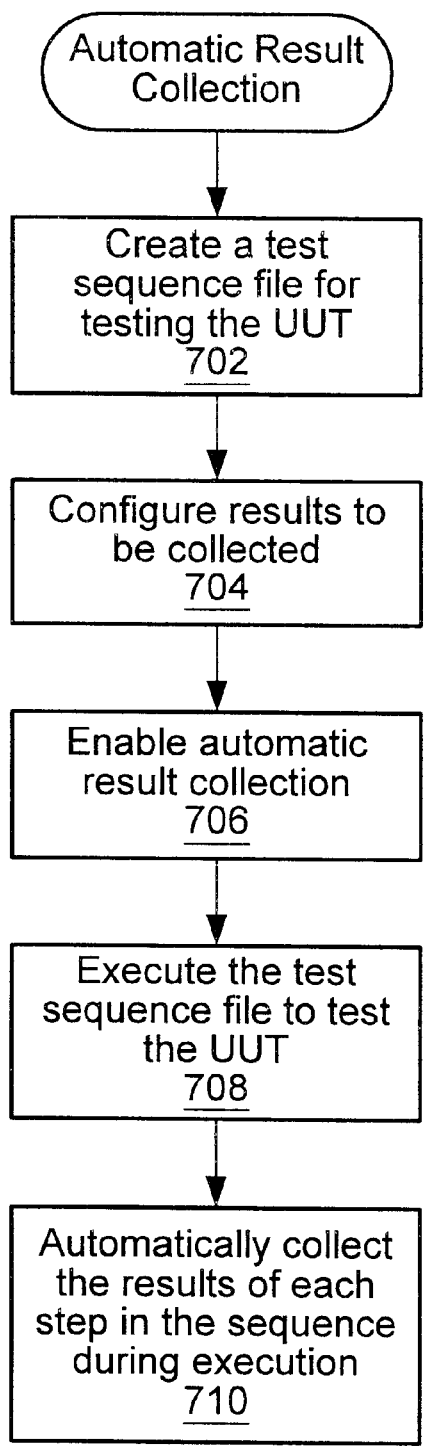
FIG. 49 is a flowchart illustrating creation of a test system, including configuration of a process model.

FIG. 49—Automatic Result Collection Flowchart

FIG. 49 is a flowchart diagram illustrating operation of the automatic result collection performed according to the present invention. The method of FIG. 49 operates in a test system for testing one or more units under test (UUTs).

As shown, in step 702 the user creates a test sequence file for testing the unit under test, wherein the test sequence file includes at least one sequence comprising a plurality of steps. Creation of a test sequence file is discussed above.

In step 704 the user configures the results to be collected. This, for example, includes defining one or more properties to be collected for one or more of the steps in the sequence. Where one or more step types are included in the test sequence file in step 702, in step 704 the user preferably configures results for the step types.

In step 706 the user enables automatic result collection. It is noted that step 706 is optional, e.g., automatic result collection may be the default result collection technique. Also, the user can enable or disable automatic result collection for particular steps, sequence(s) or for the entire test station.

In step 708 the test sequence file executes to test the unit under test. Execution of the test sequence file includes executing each of the plurality of steps in the sequence.

In step 710 the method, preferably the TestStand Engine 220, automatically collects the results of each step in the sequence during execution. If the user enabled automatic result collection in step 706, then the automatic collection in step 710 is performed in response to this enabling, and for the specified sequences. During execution, the user can also dynamically configure the results to be collected, as desired.

The automatic collection performed in step 710 includes collecting standard result information, wherein the standard result information is automatically collected regardless of the user input configuring the results to be collected in step 704. The standard result information includes one or more of: a name of the step and a position of the step in the sequence.

Where the test sequence file includes a step type and the user has configured results for the step type in step 704, in step 710 the method automatically collects results depending on the step type of the steps in the sequence. For example, when the steps in the test sequence file include a first step having a first step type and a second step having a second step type, the automatic collection operates to collect first results for the first step according to the first step type and operates to collect second results for the second step according to the second step type.

In the preferred embodiment, the sequence includes a local array that stores the results of each step in the sequence, and the automatic collection includes storing the results of each step in the local array of the sequence. The local array is preferably a local variable of the sequence, wherein the local array is accessible from within the sequence and from other code modules.

When a step in a sequence of the test sequence file calls a sub-sequence, the automatic collection includes storing a result array from the sub-sequence as the result for the first step. Further, when a first step calls a sub-sequence, and the sub-sequence includes a step which in turn calls another-subsequence, the result for the first step includes a chronology and hierarchy of step execution made in response to the first step.

Where the first step calls a sub-sequence, and the sub-sequence executes asynchronously, the automatic collection includes allocating an array element for the result when the first step calls the sub-sequence and storing the result in the array element after completion of the sub-sequence.

TestStand thus automatically collects the results of each step. The user can configure this for each step in the Run Options tab of the Step Properties dialog box. The user can disable result collection for an entire sequence in the Sequence Properties dialog box. The user can completely disable result collection on the users computer in the Station Options dialog box.

Each sequence has a ResultList local variable that is initially an empty array of container properties. TestStand appends a new container property to the end of the ResultList array before a step executes. This container property is called the step result. After the step executes, TestStand automatically copies the contents of the Result subproperty for the step into the step result.

Each step type can define different contents for its Result subproperty. TestStand can append step results that contain Result properties from different step types to the same ResultList array. When TestStand copies the Result property for a step to its step result, it also adds information such as the name of the step and its position in the sequence. For a step that calls a subsequence, TestStand also adds the ResultList array variable from the subsequence.

Figure 50:
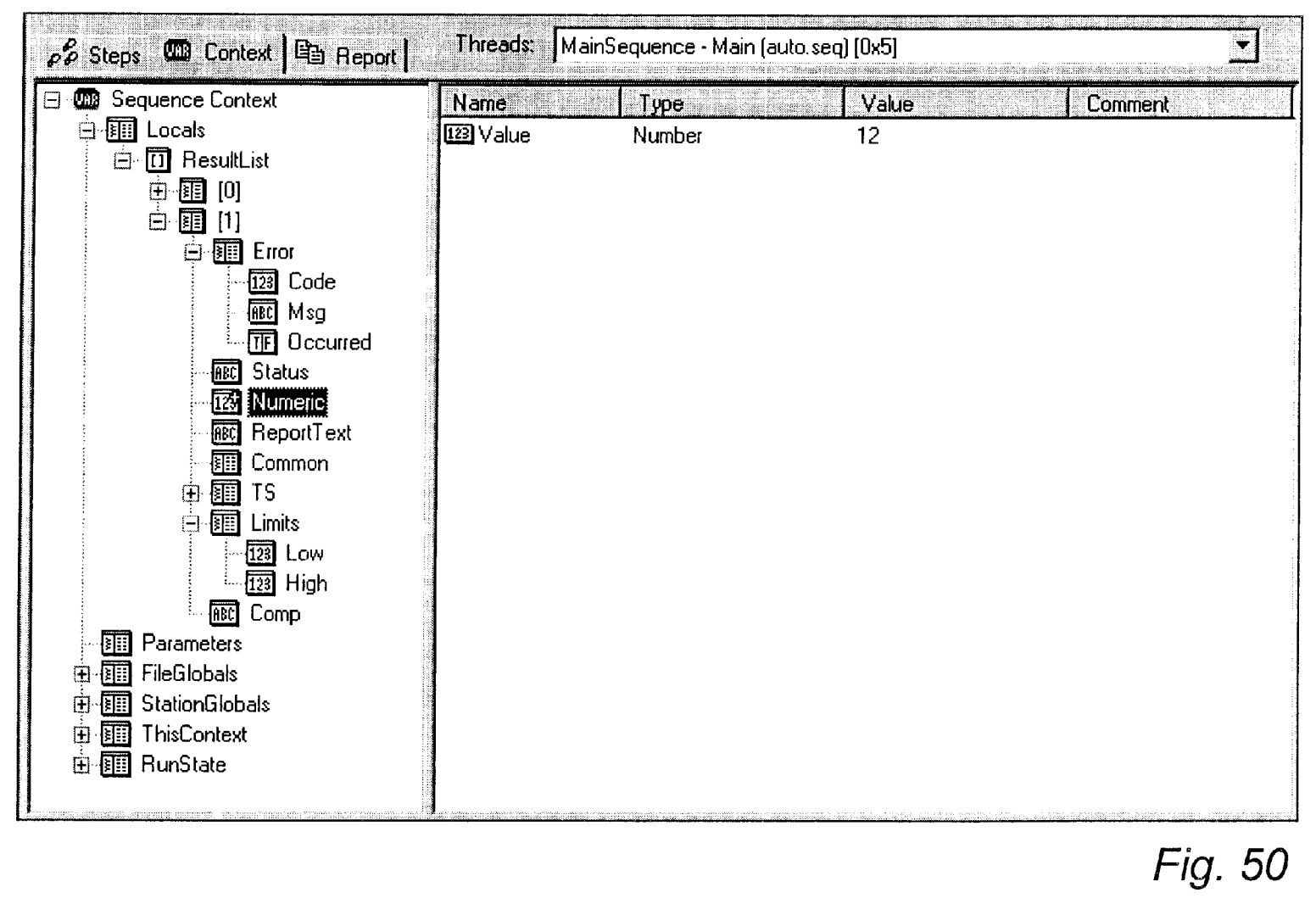

FIG. 50 illustrates the result of a Numeric Limit Test step in expanded form on the Execution window Context tab.

Through the TestStand ActiveX API, a code module can request that TestStand insert additional step properties in the step results for all steps automatically. A code module also can use the API to insert additional step result information for a particular step.

Custom Result Properties

Because each step type can have a different set of sub-properties under its Result property, the step result varies according to the step type. Table titled Custom Properties in the Step results for Steps That Use the Built-In Step Types lists the custom properties that the step result can contain for steps that use one of the built-in step types.

Table: Custom Properties in the Step results for Steps That Use the Built-In Step Types

| Custom Step Property | Step Types that Use the Property |
|---|---|
| Error.Code | All |
| Error.Msg | All |
| Error.Occurred | All |
| Status | All |
| Common | All |
| Numeric | NumericLimitTest |
| PassFail | PassFailTest |
| String | StringLimitTest |
| ButtonHit | MessagePopup |
| Response | MessagePopup |
| Exit Code | CallExecutable |
| NumLimitsInFile | LimitLoader |
| NumRowsInFile | LimitLoader |
| NumLimitsApplied | LimitLoader |
| ReportText | All |
| Limits.Low | NumericLimitTest |
| Limits.High | NumericLimitTest |
| Comp | NumericLimitTest |

The Common result subproperty uses the CommonResults custom data type. The Common property is a subproperty of the Result property for every built-in step type. Consequently, the user can add a subproperty to the result of every step type by adding a subproperty to the definition of the CommonResults type. The Limits.Low, Limits.High, and Comp properties are not subproperties of the Result property. Thus, TestStand does not include them in the step results automatically. Depending on options the user sets, the default process model uses the TestStand ActiveX API to include these properties in the step results for steps that contain them. Standard Result Properties In addition to copying custom step properties, TestStand also adds a set of standard properties to each step result. TestStand adds standard result properties to the step result as subproperties of the TS property. The table entitled Standard Step Result Properties lists the standard result properties.

Table: Standard Step Result Properties

| Standard Result Property | Description |
|---|---|
| TS.StartTime | Time at which the step began executing. The time is in terms of the number of seconds since the TestStand Engine initialized. |

-continued

Table: Standard Step Result Properties

| Standard Result Property | Description |
| --- | --- |
| TS.TotalTime | Number of seconds the step took to execute. This time includes the time for all step options including preconditions, expressions, post actions, module loading, and module execution. |
| TS.ModuleTime | Number of seconds the step module took to execute. |
| TX.Index | Zero-based position of the step in the step group. |
| TS.StepName | Name of the step. |
| TS.StepGroup | Step group that contains the step. The value is Main, Setup, or Cleanup |
| TS.Id | A number that TestStand assigns to the step result. The number is unique with respect to all other step results in the current TestStand session. |
| TS.InteractiveExeNum | A number that TestStand assigns to an interactive execution. The number is unique with respect to all other interactive executions in the current TestStand session. TestStand adds this property only if the step is run interactively. |
| TS.StepType | Name of the step type. |

Subsequence Results

If a step calls a subsequence or generates a call to a callback sequence, TestStand creates a special step result subproperty to store the result of the subsequence. The table titled Property Names for Subsequent Results lists the name of the subproperty for each type of subsequence call.

Table: Property Names for Subsequent Results

| Result Subproperty Name | Type of Subsequence Call |
| --- | --- |
| TS.SequenceCall | Sequence Call |
| TS.Post Action | Post Action Callback |
| TS.SequenceFilePreStep | SequenceFilePreStep Callback |
| TS.SequenceFilePostStep | SequenceFilePostStep Callback |
| TS.ProcessModelPreStep | ProcessModelPreStep Callback |
| TS.ProcessModelPostStep | ProcessModelPostStep Callback |
| TS.StationPreStep | StationPreStep Callback |
| TS.StationPostStep | StationPostStep Callback |
| TS.SequenceFilePreInteractive | SequenceFilePreInteractive Callback |
| TS.SequenceFilePostInteractive | SequenceFilePostInteractive Callback |
| TS.ProcessModelPreInteractive | ProcessModelPreInteractive Callback |
| TS.ProcessModelPostInteractive | ProcessModelPostInteractive Callback |
| TS.StationPreInteractive | StationPreInteractive Callback |
| TS.StationPostInteractive | StationPostInteractive Callback |

TestStand adds the following properties to the subproperty for each subsequence. SequenceFile—Absolute path of the sequence file that contains the subsequence. Sequence—Name of the subsequence that the step called. Status—Status of the subsequence that the step called. ResultList—Value of Locals.ResultList for the subsequence that the step called. This property contains the results for the steps in the subsequence. As an example, TestStand adds the following properties to the result of any step that calls another sequence:

TS.SequenceCall.SequenceFile
TS.SequenceCall.Sequence
TS.SequenceCall.Status
TS.SequenceCall.ResultList
Loop Results When the user configures a step to loop, the user can use the Record Result of Each Iteration option on the Loop tab of the Step Properties dialog box to specify that TestStand store a separate result for each loop iteration in the result list. In the result list, the results for the loop iterations come immediately after the result for the step as a whole.

TestStand adds a TS.LoopIndex numeric property to each loop iteration result to record the value of the loop index for that iteration. TestStand also adds the following special loop result properties to main result for the step. TS.EndingLoopIndex—Value of the loop index when looping completes. TS.NumLoops—Number of times the step loops. TS.NumPassed—Number of loops for which the step status is Passed or Done. TS.NumFailed—Number of loops for which the step status is Failed.

When the user runs a sequence using the TestUUTs or SinglePass execution entry points, the default process model generates the test report by traversing the results for the main sequence in the client sequence file and all of the subsequences it calls.

Although the system and method of the present invention has been described in connection with the preferred embodiment, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A method for creating a test system for testing one or more units under test (UUTs), the method comprising:

configuring a process model in response to user input, wherein the process model includes functionality which is common to a plurality of different test sequences, wherein the process model includes functionality for testing one or more UUTs, wherein the process model is user configurable, wherein said configuring the process model includes one or more of: configuring steps or configuring code modules, wherein said configuring the process model includes selecting the process model;

creating a test sequence file for testing the unit under test; and executing the process model and the test sequence file to test the unit under test.

2. The method of claim 1, wherein the process model is modularly separate from the test sequence file.

3. The method of claim 1, wherein the method operates in a system comprising a test executive engine, one or more operator interfaces, one or more test sequences, and test code;

wherein the process model is modularly separate from the test executive engine, the one or more operator interfaces, the one or more test sequences, and the test code.

4. The method of claim 1, wherein the process model includes one or more of pre-test operations and post-test operations.

5. The method of claim 1, wherein the process model includes a plurality of different entry points which are selectable by the user;

wherein said configuring the process model includes selecting an entry point within the process model in response to user input, wherein the process model begins execution at the selected entry point.

6. The method of claim 5, wherein the user selects a first entry point in the process model for testing a plurality of UUTs and wherein the user selects a second different entry point for a single pass test of a single UUT.

7. The method of claim 1, wherein the process model includes calls to callback functions, wherein the callback functions execute during execution of the process model;
wherein the calls are user definable in number and order of execution.

8. The method of claim 1, wherein the process model includes calls to callback functions, wherein the callback functions execute during execution of the process model;
wherein the callback functions comprise sequences.

9. The method of claim 8, wherein the test sequence file includes the callback functions;
wherein the callback functions are user configurable.

10. The method of claim 1, wherein the process model is configurable to include calls to callback functions, wherein the callback functions execute during execution of the process model;
wherein said configuring the process model includes creating at least one new call to a new callback function in the process model, wherein the at least one new call is comprised in the process model;
wherein said executing the process model and the test sequence file includes executing the new call in the process model to invoke the new callback function.

11. The method of claim 1, wherein the process model includes an existing call to a callback function, wherein the callback function executes during execution of the process model;
wherein said configuring the process model includes creating a new callback function which is called by said existing call in the process model;
wherein said executing the process model and the test sequence file includes executing the existing call in the process model to invoke the new callback function.

12. The method of claim 11,
wherein said creating the new callback function comprises including the new callback function in the test sequence file.

13. The method of claim 11, wherein the new callback function overrides one of: a default callback function that exists in the process model or an empty callback function that exists in the process model.

14. The method of claim 1,
wherein said configuring the process model includes one or more of: adding new entry points, changing the order of calls to callback functions, adding/deleting calls to callback functions, adding new callback functions in response to new calls to callback functions, overriding callback functions, or modifying existing callback functions.

15. The method of claim 1,
wherein said configuring the process model includes one or more of: configuring variables, configuring parameters, configuring data types, or configuring step types.

16. The method of claim 1, wherein the process model comprises a sequence file, wherein the process model is user editable as a sequence file.

17. The method of claim 16, wherein the process model comprises a plurality of steps;
wherein the steps call code modules in one of a plurality of different languages.

18. The method of claim 1, wherein the process model includes one or more variables, parameters, data types, step types, and code modules.

19. The method of claim 1, wherein the process model is independent of an operator interface program;
wherein the process model is independent of language and construction of the operator interface program.

20. The method of claim 19, wherein said configuring the process model includes defining one or more entry points in the process model in response to user input;
wherein the one or more entry points appear in the operator interface program.

21. The method of claim 20, further comprising:
the operator interface program querying a test executive engine to determine the one or more entry points defined in the process model;
the operator interface program displaying the one or more entry points in response to said querying.

22. The method of claim 19,
wherein the operator interface program presents an operator interface;
wherein changes to the process model which affect the appearance of the operator interface do not require changes to the operator interface.

23. The method of claim 1, wherein the method of creating the test program further includes configuring the process model in response to user input to provide one or more of: customized report generation, database logging, UUT identification, and UUT status notification.

24. The method of claim 1, wherein said executing the process model and the test sequence file comprises executing the process model, wherein during execution of the process model the process model operates to call the test sequence file; wherein the test sequence file executes to test the unit under test.

25. A memory medium comprising program instructions for creating a test system for testing one or more units under test (UUTs), wherein the program instructions are executable to implement:
selecting a process model;
configuring the process model in response to user input, wherein the process model includes functionality which is common to a plurality of different test sequences, wherein the process model includes functionality for testing one or more UUTs, wherein the process model is user configurable, wherein said configuring the process model includes one or more of: configuring steps or configuring code modules;
creating a test sequence file for testing the unit under test; and
executing the process model and the test sequence file to test the unit under test.

26. The memory medium of claim 25, wherein the process model is modularly separate from the test sequence file.

27. The memory medium of claim 25, wherein the memory medium operates in a system comprising a test executive engine, one or more operator interfaces, one or more test sequences, and test code;
wherein the process model is modularly separate from the test executive engine, the one or more operator interfaces, the one or more test sequences, and the test code.

28. The memory medium of claim 25, wherein the process model includes one or more of pre-test operations and post-test operations.

29. The memory medium of claim 25, wherein the process model includes a plurality of different entry points which are selectable by the user;

wherein said configuring the process model includes selecting an entry point within the process model in response to user input, wherein the process model begins execution at the selected entry point.

30. The memory medium of claim 25, wherein the process model includes calls to callback functions, wherein the callback functions execute during execution of the process model;

wherein the calls are user definable in number and order of execution.

31. The memory medium of claim 25, wherein the process model includes calls to callback functions, wherein the callback functions execute during execution of the process model;

wherein the callback functions comprise user-configurable sequences.

32. The memory medium of claim 25, wherein the process model is configurable to include calls to callback functions, wherein the callback functions execute during execution of the process model;

wherein said configuring the process model includes creating at least one new call to a new callback function in the process model, wherein the at least one new call is comprised in the process model;

wherein said executing the process model and the test sequence file includes executing the new call in the process model to invoke the new callback function.

33. The memory medium of claim 25, wherein the process model includes an existing call to a callback function, wherein the callback function executes during execution of the process model;

wherein said configuring the process model includes creating a new callback function which is called by said existing call in the process model;

wherein said executing the process model and the test sequence file includes executing the existing call in the process model to invoke the new callback function.

34. The memory medium of claim 33, wherein said creating the new callback function comprises including the new callback function in the test sequence file.

35. The memory medium of claim 33, wherein the new callback function overrides one of: a default callback function that exists in the process model or an empty callback function that exists in the process model.

36. The memory medium of claim 25, wherein said configuring the process model includes one or more of: adding new entry points, changing the order of calls to callback functions, adding/deleting calls to callback functions, adding new callback functions in response to new calls to callback functions, overriding callback functions, or modifying existing callback functions.

37. The memory medium of claim 25, wherein said configuring the process model includes one or more of: configuring variables, configuring parameters, configuring data types, or configuring step types.

38. The memory medium of claim 25, wherein the process model comprises a sequence file, wherein the process model is user editable as a sequence file.

39. The memory medium of claim 38, wherein the process model comprises a plurality of steps;

wherein the steps call code modules in one of a plurality of different languages.

40. The memory medium of claim 25, wherein the process model includes one or more variables, parameters, data types, step types, and code modules.

41. The memory medium of claim 25, wherein the process model is independent of an operator interface program;

wherein the process model is independent of language and construction of the operator interface program.

42. The memory medium of claim 41, wherein said configuring the process model includes defining one or more entry points in the process model in response to user input;

wherein the one or more entry points appear in the operator interface program.

43. The memory medium of claim 42, further comprising:

one or the operator interface program querying a test executive engine to determine the one or more entry points defined in the process model;

the operator interface program displaying the one or more entry points in response to said querying.

44. The memory medium of claim 41, wherein the operator interface program presents an operator interface;

wherein changes to the process model which affect the appearance of the operator interface do not require changes to the operator interface.

45. The memory medium of claim 25, wherein said configuring the process model is operable to provide one or more of: customized report generation, database logging, UUT identification, and UUT status notification.

46. The memory medium of claim 25, wherein said executing the process model and the test sequence file comprises executing the process model, wherein during execution of the process model the process model operates to call the test sequence file;

wherein the test sequence file executes to test the unit under test.

47. A memory medium comprising program instructions for creating a test system for testing one or more units under test (UUTs), wherein the program instructions comprise:

a process model which includes functionality which is common to a plurality of different test sequences, wherein the process model includes functionality for testing one or more UUTs, wherein the process model is user configurable, wherein the process model includes one or more of configured steps or configured code modules;

a test sequence file for testing the unit under test;

wherein the process model and the test sequence file are executable to test the unit under test;

wherein the process model includes a plurality of different entry points which are selectable by the user;

wherein the process model begins execution at a user-selected entry point.

48. The memory medium of claim 47, wherein the process model is modularly separate from the test sequence file.

49. The memory medium of claim 47, wherein the memory medium operates in a system comprising a test executive engine, one or more operator interfaces, one or more test sequences, and test code;

wherein the process model is modularly separate from the test executive engine, the one or more operator interfaces, the one or more test sequences, and the test code.

50. The memory medium of claim 47, wherein the process model includes one or more of pre-test operations and post-test operations.

51. The memory medium of claim 47, wherein the process model includes calls to callback functions, wherein the callback functions execute during execution of the process model;

wherein the calls are user definable in number and order of execution;

wherein the callback functions are user configurable.

52. The memory medium of claim 47, wherein said configuring the process model includes one or more of: adding new entry points, changing the order of calls to callback functions, adding/deleting calls to callback functions, adding new callback functions in response to new calls to callback functions, overriding callback functions, or modifying existing callback functions.

53. A method for creating a test system for testing one or more units under test (UUTs), the method comprising:

selecting a process model from a plurality of different process models, wherein each of the plurality of different process models includes functionality which is common to a plurality of different test sequences;

configuring the process model in response to user input, wherein the process model includes functionality which is common to a plurality of different test sequences, wherein the process model includes functionality for testing one or more UUTs, wherein the process model is user configurable;

creating a test sequence file for testing the unit under test, wherein the process model is modularly separate from the test sequence file; and executing the process model and the test sequence file to test the unit under test.

54. The method of claim 53, wherein the process model includes one or more of pre-test operations and post-test operations.

55. The method of claim 53, wherein said configuring the process model includes one or more of: configuring steps or configuring code modules.

56. The method of claim 53, wherein said configuring the process model includes one or more of: configuring variables, configuring parameters, configuring data types, or configuring step types.

57. The method of claim 53, wherein the process model comprises a sequence file.

58. The method of claim 53, wherein the test sequence file comprises a test sequence, wherein the test sequence comprises a plurality of steps.

59. The method of claim 53, wherein said configuring the process model includes configuring the process model to provide one or more of: customized report generation, database logging, UUT identification, and UUT status notification.

60. The method of claim 53, wherein the process model includes a plurality of steps.

61. A method for creating a test system for testing one or more units under test (UUTs), the method comprising:

configuring a process model in response to user input, wherein the process model includes functionality which is common to a plurality of different test sequences, wherein the process model includes functionality for testing one or more UUTs, wherein the process model is user configurable;

creating a test sequence file for testing the unit under test;

executing the process model and the test sequence file to test the unit under test;

wherein the process model includes a plurality of different entry points which are selectable by the user; and wherein said configuring the process model includes selecting an entry point within the process model in response to user input, wherein the process model begins execution at the selected entry point.

62. The method of claim 61, wherein the user selects a first entry point in the process model for testing a plurality of UUTs and wherein the user selects a second different entry point for a single pass test of a single UUT.

63. A method for creating a test system for testing one or more units under test (UUTs), the method comprising:

configuring a process model in response to user input, wherein the process model includes functionality which is common to a plurality of different test sequences, wherein the process model includes functionality for testing one or more UUTs, wherein the process model is user configurable, wherein said configuring the process model includes defining one or more entry points in the process model in response to user input, wherein the one or more entry points appear in an operator interface program;

creating a test sequence file for testing the unit under test; and executing the process model and the test sequence file to test the unit under test.

64. The method of claim 63, further comprising:

the operator interface program querying a test executive engine to determine the one or more entry points defined in the process model; and the operator interface program displaying the one or more entry points in response to said querying.

65. A method for creating a test system for testing one or more units under test (UUTs), the method comprising:

configuring a process model in response to user input, wherein the process model includes functionality which is common to a plurality of different test sequences, wherein the process model includes functionality for testing one or more UUTs, wherein the process model is user configurable, wherein said configuring the process model includes selecting the process model;

creating a test sequence file for testing the unit under test; and executing the process model and the test sequence file to test the unit under test.

66. A memory medium comprising program instructions for creating a test system for testing one or more units under test (UUTs), wherein the program instructions are executable to implement:

selecting a process model;

configuring the process model in response to user input, wherein the process model includes functionality which is common to a plurality of different test sequences, wherein the process model includes functionality for testing one or more UUTs, wherein the process model is user configurable;

creating a test sequence file for testing the unit under test, wherein the process model is modularly separate from the test sequence file; and executing the process model and the test sequence file to test the unit under test.

67. The memory medium of claim 66, wherein the process model includes one or more of pre-test operations and post-test operations.

68. The memory medium of claim 66,
wherein said configuring the process model includes one or more of: configuring steps or configuring code modules.

69. The memory medium of claim 66,
wherein said configuring the process model includes one or more of: configuring variables, configuring parameters, configuring data types, or configuring step types.

70. The memory medium of claim 66, wherein the process model comprises a sequence file.

71. The memory medium of claim 66, wherein said configuring the process model includes configuring the process model to provide one or more of: customized report generation, database logging, UUT identification, and UUT status notification.

72. The memory medium of claim 66, wherein the process model includes a plurality of steps.

73. A memory medium comprising program instructions for creating a test system for testing one or more units under test (UUTs), wherein the program instructions comprise:
   a process model which includes functionality which is common to a plurality of different test sequences, wherein the process model includes functionality for testing one or more UUTs, wherein the process model comprises a plurality of test steps, wherein the process model is selected from a plurality of possible process models;
   a test sequence for testing the unit under test; and
   wherein the process model and the test sequence are executable to test the unit under test.

74. A method for creating a test system for testing one or more units under test (UUTs), the method comprising:
   configuring a first test sequence in response to user input, wherein the first test sequence includes first functionality which is common to a plurality of different test sequences, wherein the first functionality is useable for testing the one or more UUTs, wherein said configuring the first test sequence includes selecting the first test sequence from a plurality of possible first test sequences;
   creating a second test sequence for testing the one or more UUTs;
   executing the first test sequence and the second test sequence to test the one or more UUTs.

75. The method of claim 74, wherein the first test sequence encapsulates functionality associated with the plurality of different test sequences.

76. The method of claim 74, wherein the first test sequence includes a first one or more common operations performed before each of the plurality of different test sequences.

77. The method of claim 74, wherein the first test sequence includes a first one or more common operations performed after each of the plurality of different test sequences.

78. The method of claim 74,
wherein said creating the second test sequence comprises creating the second test sequence to include second functionality, wherein the second functionality does not include the first functionality of the first test sequence;
wherein the second test sequence is designed to execute with the first test sequence.

79. The method of claim 74, wherein the first test sequence operates as a process model for each of the plurality of different test sequences.

80. The method of claim 74, further comprising:
   creating a third test sequence for testing a different one or more UUTs;
   executing the first test sequence and the third test sequence to test the different one or more UUTs.

81. The method of claim 74,
wherein the first test sequence is modularly separate from the second test sequence.

82. The method of claim 74,
wherein the first test sequence is modularly separate from each of the plurality of different test sequences.

83. The method of claim 74, wherein the method operates in a system comprising a test executive engine, one or more operator interfaces, one or more test sequences, and test code;
   wherein the first test sequence is modularly separate from the test executive engine, the one or more operator interfaces, the one or more test sequences, and the test code.

84. The method of claim 74, wherein the first test sequence includes a plurality of different entry points which are selectable by the user;
   wherein said configuring the first test sequence includes selecting an entry point within the first test sequence in response to user input, wherein the first test sequence begins execution at the selected entry point.

85. The method of claim 84, wherein the user selects a first entry point in the first test sequence for testing a plurality of UUTs and wherein the user selects a second different entry point in the first test sequence for a single pass test of a single UUT.

86. The method of claim 74, wherein the method of creating the test program further includes configuring the first test sequence in response to user input to provide one or more of: customized report generation, database logging, UUT identification, and UUT status notification.

87. The method of claim 74, wherein said executing the first test sequence and the second test sequence comprises the first test sequence calling the second test sequence;
   wherein the second test sequence executes to test the unit under test.

88. The method of claim 74, wherein said configuring the first test sequence includes selecting the first test sequence from a plurality of possible process models.

89. A memory medium comprising program instructions for creating a test system for testing one or more units under test (UUTs), wherein the program instructions are executable to implement:
   configuring a first test sequence in response to user input, wherein the first test sequence includes first functionality which is common to a plurality of different test sequences, wherein the first functionality is useable for testing the one or more UUTs, wherein said configuring the first test sequence includes selecting the first test sequence from a plurality of possible first test sequences;
   creating a second test sequence for testing the one or more UUTs;
   executing the first test sequence and the second test sequence to test the one or more UUTs.

90. A method for creating a test system for testing one or more units under test (UUTs), the method comprising:
   configuring a first test sequence in response to user input, wherein the first test sequence includes first functionality which is common to a plurality of different test sequences, wherein the first functionality is useable for testing the one or more UUTs;

wherein the first test sequence includes a plurality of different entry points which are selectable by the user;

wherein said configuring the first test sequence includes selecting an entry point within the first test sequence in response to user input, wherein the first test sequence begins execution at the selected entry point;

creating a second test sequence for testing the one or more UUTs;

executing the first test sequence and the second test sequence to test the one or more UUTs.

91. The method of claim 90, wherein the user selects a first entry point in the first test sequence for testing a plurality of UUTs and wherein the user selects a second different entry point in the first test sequence for a single pass test of a single UUT.

92. The method of claim 90, wherein the first test sequence encapsulates functionality associated with the plurality of different test sequences.

93. The method of claim 90, wherein the first test sequence includes a first one or more common operations performed before each of the plurality of different test sequences.

94. The method of claim 90, wherein the first test sequence includes a first one or more common operations performed after each of the plurality of different test sequences.

95. The method of claim 90, wherein said creating the second test sequence comprises creating the second test sequence to include second functionality, wherein the second functionality does not include the first functionality of the first test sequence;

wherein the second test sequence is designed to execute with the first test sequence.

96. The method of claim 90, wherein the first test sequence operates as a process model for each of the plurality of different test sequences.

97. The method of claim 90, further comprising:

creating a third test sequence for testing a different one or more UUTs;

executing the first test sequence and the third test sequence to test the different one or more UUTs.

98. The method of claim 90, wherein the first test sequence is modularly separate from the second test sequence.

99. The method of claim 90, wherein the first test sequence is modularly separate from each of the plurality of different test sequences.

100. The method of claim 90, wherein the method operates in a system comprising a test executive engine, one or more operator interfaces, one or more test sequences, and test code;

wherein the first test sequence is modularly separate from the test executive engine, the one or more operator interfaces, the one or more test sequences, and the test code.

101. The method of claim 90, wherein the method of creating the test program further includes configuring the first test sequence in response to user input to provide one or more of: customized report generation, database logging, UUT identification, and UUT status notification.

102. The method of claim 90, wherein said executing the first test sequence and the second test sequence comprises the first test sequence calling the second test sequence;

wherein the second test sequence executes to test the unit under test.

103. The method of claim 90, wherein said configuring the first test sequence includes selecting the first test sequence from a plurality of possible first test sequences.

* * * * *

UNITED STATES PATENT AND TRADEMARK OFFICE
CERTIFICATE OF CORRECTION

PATENT NO.      : 6,577,981 B1
DATED           : June 10, 2003
INVENTOR(S)     : James Grey and Erik Crank It is certified that error appears in the above-identified patent and that said Letters Patent is hereby corrected as shown below:

<u>Column 70,</u>
Line 14, please delete "one or" prior to "the operator interface".

Signed and Sealed this

Twenty-first Day of October, 2003

JAMES E. ROGAN
*Director of the United States Patent and Trademark Office*